United States Patent [19]
Futamura et al.

[11] Patent Number: 6,075,605
[45] Date of Patent: Jun. 13, 2000

[54] SHAPE MEASURING DEVICE

[75] Inventors: Ikuo Futamura; Manabu Okuda; Susumu Shibata, all of Komaki, Japan

[73] Assignees: CKD Corporation, Komaki; Kabushiki Kaisha Nextar, Nagoya, both of Japan

[21] Appl. No.: 09/149,138

[22] Filed: Sep. 8, 1998

[30] Foreign Application Priority Data

Sep. 9, 1997 [JP] Japan .................................. 9-243946
Jul. 7, 1998 [JP] Japan ................................ 10-192166

[51] Int. Cl.[7] .................................................. G01B 11/24
[52] U.S. Cl. ...................... 356/376; 382/286; 250/559.22
[58] Field of Search ................................. 356/375, 376, 356/374; 250/559.19, 559.22, 559.23, 559.24, 237 G; 382/203, 286; 348/132, 92

[56] References Cited

U.S. PATENT DOCUMENTS

| | | | |
|---|---|---|---|
| 4,657,394 | 4/1987 | Halioua | 356/376 |
| 5,104,227 | 4/1992 | Uesugi et al. | 356/376 |
| 5,450,204 | 9/1995 | Shigeyama et al. | 356/376 |
| 5,848,188 | 12/1998 | Shibata et al. | 382/203 |

FOREIGN PATENT DOCUMENTS

| | | |
|---|---|---|
| 4-278406 | 10/1992 | Japan . |
| 5-332737 | 12/1993 | Japan . |

*Primary Examiner*—Hoa Q. Pham
*Attorney, Agent, or Firm*—Finnegan, Henderson, Farabow, Garrett & Dunner, L.L.P.

[57] ABSTRACT

A shape measuring device includes a light source for generating slit light beam and a polygon mirror for scanning the light beam and illuminating an object to be measured. The device further includes space-coding light beam controlling means, phase-shifting light beam controlling means, and a CCD camera which picks up an optical image of an object to be measured obtained by illumination of the light beam. The space-coding light beam controlling means controls light beam whose distribution of integrated illumination has a stripe patter in accordance with a predetermined code and the phase-shifting light beam controlling means controls light beam whose distribution of integrated illumination has a sine-wave like pattern. The distribution of integrated illumination intensity is possessed by the light beam illuminating within a time period for picking up one frame. With the picked up image information, space-coding shape operating means calculates a rough shape of the object to be measured, phase-shifting shape operating means calculates a precise shape of the object be measured, and then shape combining/operating means combines and calculates the shape of the object to be measured. Because the device combines a rough shape measured with wide range and a precise shape measured with high resolving power, the device can measure shape with wide dynamic range and with high resolution power.

26 Claims, 35 Drawing Sheets

FIG.4

| | 7 | 6 | 5 | 4 | 3 | 2 | 1 | 0 |
|---|---|---|---|---|---|---|---|---|
| 255 | 1 | 0 | 0 | 0 | 0 | 0 | 0 | 0 |
| 8 | 0 | 0 | 0 | 0 | 1 | 1 | 0 | 0 |
| 7 | 0 | 0 | 0 | 0 | 0 | 1 | 0 | 0 |
| 6 | 0 | 0 | 0 | 0 | 0 | 1 | 0 | 1 |
| 5 | 0 | 0 | 0 | 0 | 0 | 1 | 1 | 1 |
| 4 | 0 | 0 | 0 | 0 | 0 | 1 | 1 | 0 |
| 3 | 0 | 0 | 0 | 0 | 0 | 0 | 1 | 0 |
| 2 | 0 | 0 | 0 | 0 | 0 | 0 | 1 | 1 |
| 1 | 0 | 0 | 0 | 0 | 0 | 0 | 0 | 1 |
| 0 | 0 | 0 | 0 | 0 | 0 | 0 | 0 | 0 |

MEMORY ADDRESS (rows) / MEMORY BIT (columns: 7 6 5 4 3 2 1 0)

Is = 0

Is = 1

Is = 2

Is = 13

Is = 17

Is = 18

Is = 19

Is = 20

Is = 13

FIG.10 (a)
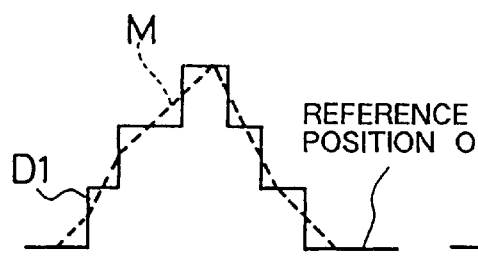
FIG.10 (b)
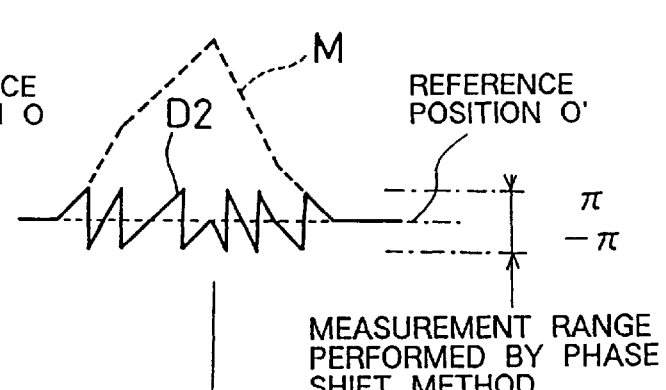
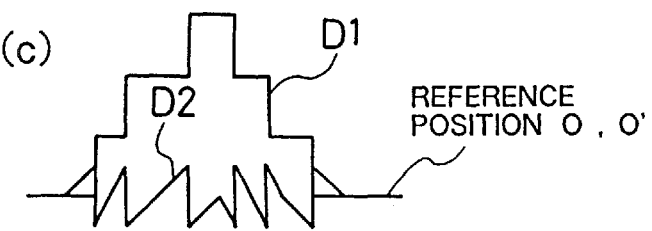
FIG.10 (c)
FIG.10 (d)
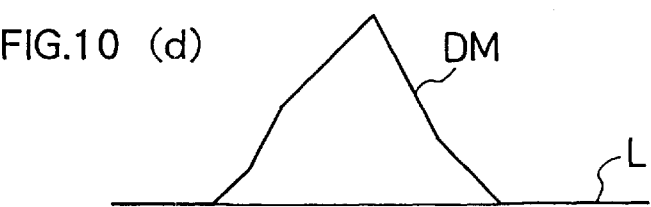

LIGHT BEAM
REFERENCE PLANE L
OBJECT M TO BE MEASURED

FIG.21

| Memory Address | Bit 3 | Bit 2 | Bit 1 | Bit 0 |
|---|---|---|---|---|
| 15 | 1 | 0 | 0 | 0 |
| 14 | 1 | 0 | 0 | 1 |
| 13 | 1 | 0 | 1 | 1 |
| 12 | 1 | 0 | 1 | 0 |
| 11 | 1 | 1 | 1 | 0 |
| 10 | 1 | 1 | 1 | 1 |
| 9 | 1 | 1 | 0 | 1 |
| 8 | 1 | 1 | 0 | 0 |
| 7 | 0 | 1 | 0 | 0 |
| 6 | 0 | 1 | 0 | 1 |
| 5 | 0 | 1 | 1 | 1 |
| 4 | 0 | 1 | 1 | 0 |
| 3 | 0 | 0 | 1 | 0 |
| 2 | 0 | 0 | 1 | 1 |
| 1 | 0 | 0 | 0 | 1 |
| 0 | 0 | 0 | 0 | 0 |

MEMORY BIT

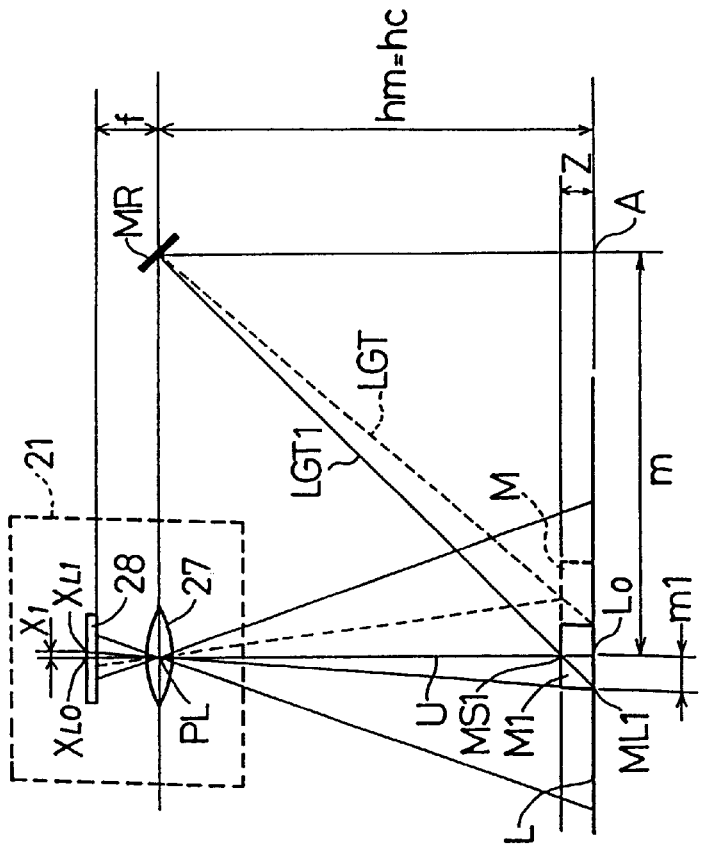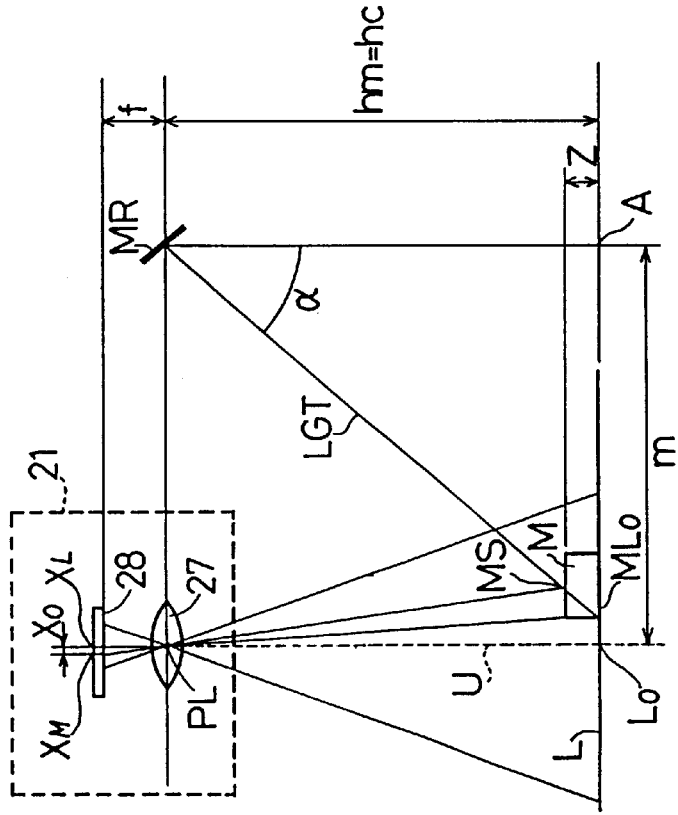

SHAPE MEASURING DEVICE

BACKGROUND OF THE INVENTION

The present invention relates to a shape measuring device for measuring a displacement and three-dimensional shape of an object to be measured by the use of optical means without contact with the object. More particularly, it relates to a shape measuring device in which the object to be measured is illuminated with a light beam, image information obtained by picking up its optical image is operated, and then the shape is calculated.

As one approach for measuring the displacement and three-dimensional shape of the object without contact with the object, a space coding method is known. As an example of this space coding method, the one disclosed in Japanese Patent Publication No. 5-332737 will be described with reference to FIG. 33. A shape measuring device 110 of FIG. 33 has a laser light source 117; a lens system 118 for shaping a laser light into a slit; a polygon mirror 119 for illuminating an object M to be measured with the shaped laser light; a CCD camera 111 for detecting the light reflected by the object M to be measured; and a control section 112 for controlling these elements.

The laser light source 117 is controlled so that it may be switched on/off in accordance with a predetermined rule. The polygon mirror 119 is rotated and deflects/scans the laser light. A stripe pattern is therefore formed by a portion illuminated with the laser light and a portion not illuminated with the laser light on a surface of the object M to be measured. Here, since the laser light is once scanned within a time period (pickup time period) for storing one frame (one picture) by the CCD camera 111, the stripe pattern data of the object M to be measured is stored in one frame of image data. A plurality of scans are then performed in accordance with different patterns formed by switching on/off the light source, so that a plurality of different stripe pattern data are stored whenever the scan is performed.

Subsequently, an operating unit included in the control section 112 calculates space code numbers of points on the object M to be measured in accordance with these stripe pattern data. Furthermore, the operating unit calculates coordinates of the points on the object M to be measured corresponding to pixels by the use of the principle of triangulation, so that the shape is measured.

According to this approach, the space illuminated with the light is divided into many subspaces whose cross sections are generally fan-shaped, and then a series of space code numbers are given to these subspaces. Thus, even if the object M to be measured is high (even if there is a great difference in height), the height can be operated from the space code numbers as long as the object M is placed in the space illuminated with the light. The whole shape of even the high object to be measured can be therefore measured.

A further advantage of this example, in which the laser light is scanned and used, is that a mechanical pattern mask and the replacement thereof are not needed and thus the small-sized device and the rapid measurement can be realized.

As another approach, a phase shift method (also referred to as a grating pattern projecting method or a fringe scanning method) is known. In this method, the light beam, which has the grating pattern whose distribution of illuminance is varied so that it may be shaped into a sine-wave like wave, is projected on the object to be measured. Moreover, the light beam is projected by the grating pattern in which the phase of the sine wave is shifted by ¼ cycle into four steps. Lightness values on the height measuring points are measured for each pattern from a different angle from such a direction as to project the light beam. The phase value of the grating pattern is calculated from the lightness values. In response to the height of the measuring point, the illuminance of the light beam projected on the measuring point is changed, and thus the phase of the grating pattern is modulated. The light beam, whose phase is different from the phase observed in the absence of the object to be measured, is thus observed. Accordingly, the phase of the light beam on the measuring point is calculated and then the calculated phase is substituted into geometric expressions of an optical device by the use of the principle of triangulation, whereby the height on the measuring point (therefore, of the object) is measured, so that the three-dimensional shape is determined.

As an example of the shape measuring device according to this approach, the one disclosed in Japanese Patent Publication No. 4-278406 will be described with reference to FIG. 34. A shape measuring device 120 of FIG. 34 is used for measuring the height and shape on the points of the object M to be measured placed on a reference plane L that is a reference of measurement. This device 120 has a pickup camera 122 for picking up the object M to be measured; a projector 123 for projecting the grating pattern and for shifting the grating pattern by ¼ cycle; a projection controller 124 for outputting a signal shifting the grating pattern by ¼ cycle; an image memory 125 for storing four images picked up by the pickup camera 122, image by image, at the specified time; and a computer 126 for use in the measurement. Also, the computer 126 instructs the projection controller 124 to be operated, instructs the image memory 125 to store the image and reads the lightness value of the image.

The measuring method by this shape measuring device 120 is as follows. That is, the object M to be measured placed on the reference plane L is projected (illuminated) by the light having the sine-wave-shaped distribution of illuminance from the projector 123. The fringe pattern of light and shade is thereby formed on the surface of the object M to be measured. This pattern is picked up by the pickup camera 122, and then the instruction from the computer 126 allows this pattern to be stored, as a first image, in the image memory 125. Next, the instruction from the computer 126 causes the projection controller 124 to output the signal, whereby the projector 123 changes the grating pattern into another grating pattern whose phase is shifted by ¼ cycle. Subsequently, the light is projected from the projector 123 on the object M to be measured in the same manner as described above, and the image picked up by the pickup camera 122 is stored, as a second image, in the image memory 125. In the same manner, third and fourth images, which are picked up by shifting the phase of the grating pattern by ¼ cycle, are stored in the image memory 125. Then, the lightness values of the images are read and operated from the image data in the image memory 125, so that the height and shape on the points on the surface of the object M to be measured are calculated.

According to this approach, even if a space between gratings in the grating pattern is not reduced, the height on the points of the object to be measured can be calculated from the phase values calculated from the lightness values. For this reason, not the roughly quantized height data but the precise height data can be obtained. In other words, advantageously, a resolving power can be fine in the direction of height (the resolving power can be enhanced).

This approach is required to project the grating pattern having the sine-wave like distribution of illuminance. Means for realizing such a grating pattern is described below. That is, a mask like a bamboo blind, in which the slits of a constant width are constantly spaced, or a stripe filter (mask), in which transparent and opaque portions are alternately arranged, is previously formed. The focal point of the projected light is then shifted while this mask transmits the light, whereby the distribution of illuminance of the projected light is varied so that it may be generally shaped like the sine wave. Alternatively, the transmittance of a liquid crystal slit may be previously changed in such a manner that it is shaped like the sine wave, whereby this liquid crystal slit transmits the light so that the light is projected.

According to the above-described space coding method, it is possible to measure the whole shape of even the object to be measured having a wide range of an allowable height (dynamic range) and being high. However, the number of the given space code numbers (the number of the subspaces) cannot be more than the number of the pixels arranged in the direction in which the pickup CCD camera scans the light beam (the number of the horizontal pixels). For this reason, the increase of the resolving power in the direction of height by this approach is limited. Therefore, when the height of the object to be measured is measured by the space coding method, the roughly quantized height data is obtained.

For example, the case, in which the height of an object M1 to be measured having the shape (cross section) shown in FIG. 35($a$) is measured from the reference plane L by the space coding method, will be described. In the drawing, the object M1 to be measured has the trapezoidal cross section which is rightward inclined and flat on the left upper surface thereof.

When the height (shape) of this object M1 to be measured is measured by the space coding method, the height can be wholly measured as shown in FIG. 35($b$). This reason is that the range of the allowable height is wide. However, since the height is divided by the space code numbers and quantized, even the slope is calculated in the form of step-like data.

On the other hand, when the above-mentioned phase shift method is used, the typically illuminating grating pattern is adapted so as to include a plurality of waves (about several wavelengths through tens of wavelengths) like the sine wave. Accordingly, if the object to be measured is high (if there is a great difference in height), a difference between the phases, i.e. an amount of phase modulation (an amount of phase shift) exceeds $2\pi$ (or $4\pi$, $6\pi$, ... ), where the phases are: the phase of the light beam observed by the pixels of the CCD camera for estimating the measuring points of the object M1 to be measured; and the phase of the light beam illuminating the reference plane L when the pixels estimate the reference plane L in the absence of the object M1 to be measured. That is, compare two phases: the phase of the light beam which is inherently calculated when the light beam of the sine-wave like pattern illuminating a certain portion on the reference plane L is observed by a certain pixel; and the phase of the light beam observed by the pixel due to the placement of the object M1 to be measured. As a result of this comparison, the latter phase is modulated and thus is different from the former phase. The greater the height of the object M1 to be measured (exactly, the height of the object M1 to be measured on the measuring point estimated by the examined pixel) is, the more the amount of phase shift (the amount of phase modulation) is. In some cases, when this object M1 to be measured (exactly, the measuring point) is high, the amount of phase shift exceeds $2\pi$ (or $4\pi$, $6\pi$, ... ).

However, when the phase is calculated from the image information, the phase is calculated only within a range of 0 to $2\pi$ due to the cyclicity of the sine wave. Therefore, $2\pi$ ($4\pi$, $6\pi$, ... ) of the amount of phase shift exceeding $2\pi$ ($4\pi$, $6\pi$, ... ) is ignored. That is, only the amount of phase shift of the excess over $2\pi$ ($4\pi$, $6\pi$, ... ) contributes to the calculation of the phase. Accordingly, the height of the low object to be measured (having the amount of phase shift less than $2\pi$) can be correctly calculated. However, if the height of the high object (having the amount of phase shift of $2\pi$ or more) is calculated, this calculation results in only the height equivalent to the amount of phase shift of the excess over $2\pi$ ($4\pi$, $6\pi$, ... ) (the amount of phase shift of the remainder left by subtracting $2\pi$ ... from the inherent amount of phase shift).

For example, if the object M1 to be measured having the shape shown in FIG. 35($a$) is measured by the phase shift method in the same manner as the above-mentioned space coding method, the result described below (see FIG. 35($c$)) is obtained. That is, since the object M1 to be measured is low from a right end point P0 to a point P1 in the course of the slope (in a portion A), the amount of phase shift is less than $2\pi$. Therefore, shape data along the shape of the object M1 to be measured is calculated. However, since the phase seems unmodulated on the point P1 on which the amount of phase shift is just $2\pi$, the calculation indicates that the height is equal to 0. Accordingly, since $2\pi$ of the amount of phase shift is ignored in a portion B between the points P1 and P2 in which the amount of phase shift is more than $2\pi$, the calculated height data is shaped like saw teeth once starting from 0. Furthermore, $4\pi$ of the amount of phase shift is ignored in a portion C from the point P2 to a left end point P4 in which the amount of phase shift is more than $4\pi$, and thus the height data is similarly calculated as the shape data obtained by subtracting the height of the amount of phase shift of $4\pi$ from the actual shape.

According to the phase shift method, the height of the object to be measured can be thus measured at the high resolving power. However, it is possible to measure only the low object (having a little difference in height) in which the range of the measurable height is less than $2\pi$ in terms of the amount of phase shift.

Furthermore, when the aforementioned bamboo-blind-like mask or filter having the arranged slits is used in the above-described phase shift method, the distribution of illuminance of the projected light is influenced by the amount of phase shift from the focal point. Thus, the distribution of illuminance is not always shaped like the sine wave, and consequently a phase error is made. Moreover, when the liquid crystal slit is used, the low-contrast liquid crystal slit transmits the light. For this reason, a rate of change of the distribution of illuminance of the projected light is also reduced, and thus the error of the lightness value is disadvantageously increased. Additionally, since the planar light is projected onto the object to be measured, an insufficient quantity of light of the light source would reduce the illuminance of the projected light, and, as a result, the error of the lightness value is increased. Although this may be solved by the use of the light source having a great quantity of light, this solution causes problems about a power consumption, a heat generation, a heat resistance of the slit or the like, the large-sized device, and so on.

SUMMARY OF THE INVENTION

The present invention is made in order to solve the above problems. An object of the present invention is to provide a shape measuring device which can measure even a high object to be measured and has a high resolving power.

Another object is to provide a shape measuring device capable of measuring portions of the object to be measured at the uniform resolving power.

A still another object is to provide a shape measuring device in which a mechanical slit or the like is not needed by scanning a slit light beam and illuminating the object to be measured with the light beam, and also the measurements by a space coding method and by a phase shift method can be carried out by the use of a common mechanical constitution.

A further object is to provide a shape measuring device by the phase shift method in which the mechanical slit or the like is not needed by scanning the slit light beam and illuminating the object to be measured with the light beam.

In order to achieve the above objects, a shape measuring device of the present invention comprises: light beam illuminating means for illuminating an object to be measured with a light beam whose distribution of integrated illumination intensity has a stripe pattern in accordance with a predetermined code and with a light beam whose distribution of integrated illumination intensity has a sine-wave like pattern in random order, the distribution of integrated illumination intensity is possessed by the light beam illuminating within a time period for picking up one field or one frame; pickup means for picking up, by an integrating pickup member, an optical image formed on a surface of the object to be measured by the light beams; and image information operating means for calculating a shape of the object to be measured by operating image information of a plurality of fields or a plurality of frames outputted from the pickup means; wherein the image information operating means calculates the shape of said object to be measured from space-coded image information and phase-shifted image information, the space-coded image information is obtained by illuminating the object to be measured with the light beam of the stripe pattern in accordance with the predetermined code, and the phase-shifted image information is obtained by illuminating the object to be measured with the light beam of the sine-wave like pattern.

According to the above-described shape measuring device, the image information operating means calculates the shape of the object to be measured from the space-coded image information and the phase-shifted image information, where the space-coded image information is obtained by illuminating the object to be measured with the light beam of the stripe pattern in accordance with a predetermined code, and the phase-shifted image information is obtained by illuminating the object to be measured with the light beam of the sine-wave like pattern. Thus, the space coding method having a wide range of an allowable height (a wide dynamic range) is applied to the space-coded image information, while the phase shift method having the high resolving power is applied to the phase-shifted image information. Since the shape of the object to be measured can be calculated by these two methods, it is possible to measure even the high object to be measured having the wide dynamic range and also to measure the object to be measured at the high resolving power.

Here, any light beam illuminating means will do, as long as it can illuminate the object to be measured with the light beam of the stripe pattern and the light beam of the sine-wave like pattern. As means for changing the light source and the intensity of illumination, some separate means may be appropriately switched and used, or a single means may be properly used depending on the application.

The distribution of integrated illumination intensity means the distribution of illumination intensity in the case of integrating the intensity of illumination of the illuminating light beam within a certain period. In the present invention, the distribution of integrated illumination intensity may be therefore shaped like the stripe or the sine wave. Accordingly, the intensity of illumination of the illuminating light beam at a certain moment does not need to be distributed like the stripe, etc.

The integrating pickup member means such a type of pickup member that the image information to be outputted is outputted in accordance with a value obtained by integrating the intensity of illumination of the illuminating light beam over the pickup period. More particularly, a camera (CCD camera) using a CCD pickup device is taken as an example. Alternatively, the member using a MOS type pickup device or an image pickup tube such as Vidicon may be used.

Whether the image information is used on the basis of a field unit or a frame unit is different depending on a pickup system of the integrating pickup member.

The code having the regularity and the identifiable space code number may be used. For example, the code based on a gray code, a binary code or the like is used. More specifically, when a series of space code numbers are given to subspaces in accordance with the gray code, the gray code indicating the space code number of a certain subspace always differs, in 1 bit alone, from the gray code indicating the space code number given to the subspace adjacent to the former subspace. Thus, when the object to be measured (a part of the object to be measured) estimated by the pixel is just located at a border between the subspaces, it is in 1 bit alone of the gray code that a determination as to whether the pixel output is 0 or 1 (light or dark) for binarizing the pixel output is varied. Since other bits are common to the adjacent subspaces, this determination is not varied. Furthermore, whether this 1 bit is 0 or 1 (light or dark) by the determination, the gray code corresponding to one of the adjacent subspaces is used. Therefore, the use of the gray code is superior to the use of other codes in that a less error of height information is made even if different gray codes are read. The space code number is the number given to the space illuminated with the light beam. That is, the space code number means a series of numbers which are given to the subspaces divided like a fan about (at the core of) the center of illumination along a partition between the light and darkness of the illuminating light beam in accordance with the code.

The space-coded image information means the image information which is picked up by the integrating pickup member when the reference plane, the object to be measured or the reference plane and the object to be measured are illuminated with the light beam of the stripe pattern in accordance with a predetermined code.

The phase-shifted image information means the image information which is picked up by the integrating pickup member when the reference plane, the object to be measured or the reference plane and the object to be measured are illuminated with the light beam of the sine-wave like pattern.

According to the shape measuring device of the present invention, assuming that $0<J\leq 1$, preferably, the light beam of the stripe pattern and the light beam of the sine-wave like pattern have such a relationship that a subspace to which one space code number is given by the light beam of the stripe pattern may coincide with the subspace illuminated with the light beam of J cycle of the sine-wave like pattern.

According to the above-described shape measuring device, the subspace, to which one space code number is given by the light beam of the stripe pattern, coincides with the subspace illuminated with the light beam of J cycle of the sine-wave like pattern. That is, the generally fan-shaped subspace to which one space code number is given (for example, the subspace having a space code number 4) coincides with the subspace illuminated with the light beam of J cycle (for example, 1 cycle, ½ cycle, ¼ cycle or the like) of the sine-wave like pattern.

As described above, the phase shift method has the high resolving power. However, when the high object to be measured causes the amount of phase shift (the amount of phase modulation) to exceed 1 cycle of phase $2\pi$ (=360 deg) or $4\pi$, $6\pi$, ..., this method ignores the amount of phase shift equivalent to $2\pi$, $4\pi$, $6\pi$, ... and calculates only the height equivalent to the amount of phase shift of 0 to $2\pi$. For this reason, as described above (see FIG. 35(c)), the phase data and the height data are discontinuous (for example, shaped like saw teeth), and thus the discontinuity of the phase data and the height data must be corrected before and after the amount of phase shift reaches $2\pi$, $4\pi$. ... This is a so-called phase coupling problem. That is, although the height is actually continuous, the height data is sometimes calculated as if the object to be measured had the discontinuous height because the amount equivalent to $2\pi$, $4\pi$, ... of the amount of phase shift is ignored. It is therefore necessary to correct this error and to determine a true height.

For this purpose, the following method is considered. That is, it is assumed that the height of the object to be measured is continuously changed, and the height data is adjusted so that the height data may be continuous in the discontinuous portion of the height data and the values of the height data may coincide with each other in the discontinuous portion, whereby the whole height data is corrected. However, this method has a difficulty in measuring the height of the object to be measured which seems as if it had the discontinuous height, for example, the object to be measured having the step-like shape. In addition, this method searches for and corrects a discontinuous point of the height data and then proceeds to the next operation, namely, this method makes corrections in sequence. Therefore, this method takes a long time for the correction.

On the other hand, as described above (see FIG. 35(b)), the space coding method has the low resolving power and thus the height is determined by only the skipping quantized values, but the dynamic range is wide. Moreover, since a series of space code numbers are given to the generally fan-shaped subspaces into which the whole space illuminated with the light beam of the stripe pattern is divided, the same space code number is not given to two subspaces or more. Thus, since the subspaces can be distinguished by the space code number, there is no disadvantage unlike the phase shift method.

Therefore, according to the present invention, one space code number is certainly given to the subspace illuminated with J cycle of the sine-wave like pattern.

According to the phase shift method, for example, consider the case in which the height of the object to be measured is measured on a certain measuring point (assumed to be a point A). In this case, even if the amount of phase shift exceeds $2\pi$ (or an integral multiple of $2\pi$) on the point A, $2\pi$ (or the integral multiple of $2\pi$) of the amount of phase shift is ignored as described above. Thus, the height on the point A is calculated at the value which is lower than the actual height, and consequently the phase data, the height data, etc. are discontinuous.

However, when the height on the point A is measured by the space coding method, the height is calculated by the quantized value, but the discontinuity is not caused. The subspace, which one space code number is given to, also coincides with the subspace of J cycle (0<J≦1) of the light beam of the sine-wave like pattern. The fact that the space code numbers differ by 1 is thus equivalent to that the phases differ by $2\pi \times J$. The discontinuity of the phase data and the height data due to the phase shift method can be therefore corrected by the space code number data obtained by the space coding method and the height data determined by the space code number data. Furthermore, since this correction is not influenced by the correction for the neighboring pixels, the correction can be independently done for each pixel. Since the sequential correction is unnecessary, the correction can be easily done at high speed.

J is set to 0<J≦1 for the reason described below. If the subspace illuminated with the light beam of one cycle or more of the sine-wave like pattern corresponds to the subspace to which one space code number is given, the phase data is discontinuous in the subspace. However, this discontinuity cannot be corrected by the space code number, and thus the correspondence between both the subspaces has no merit.

In the above-described shape measuring device, the value of J is desirably set to 1 or ½.

By this, the shape of the object to be measured can be easily determined by the use of the space code number determined by the space coding method and the phase (the amount of phase shift) determined by the phase shift method.

That is, if J=1, in other words, if the subspace to which one space code number is given coincides with the subspace illuminated with the light beam of one cycle of the sine-wave like pattern, the increase or decrease of 1 in the space code number is equivalent to the increase or decrease of just one cycle, i.e., $2\pi$(rad)(=360 (deg)) in the phase (the amount of phase shift). Thus, the space code number and the amount of space code number shift are easily replaced by the phase and the amount of phase shift, respectively. Therefore, the height (shape) can be readily determined by combining the phase (the amount of phase shift) determined by the phase shift method and the amount of phase shift obtained by the conversion from the space code number.

Even when the heights are previously determined from the space-coded image information and the phase-shifted image information and then these determined heights are combined, the combination can be also facilitated.

Moreover, if J=½, namely, if the subspace to which one space code is given coincides with the subspace illuminated with the light beam of ½ cycle of the sine-wave like pattern, the increase or decrease of 1 in the space code number is equivalent to the increase or decrease of just ½ cycle, i.e., $\pi$(rad)(=180 (deg)) in the phase (the amount of phase shift). Thus, as in the case of J=1, the space code number and the amount of space code number shift are easily replaced by the phase and the amount of phase shift, respectively. Therefore, the height (shape) can be readily determined by combining the phase (the amount of phase shift) determined by the phase shift method and the amount of phase shift obtained by the conversion from the space code number.

Also, the heights are previously determined from the space-coded image information and the phase-shifted image information, and then these determined heights can be easily combined.

As described below, by the phase shift method, a phase angle of the light beam illuminating a certain portion is calculated from the light beam of four sine-wave like patterns whose phases differ by $\pi/2$ (¼ cycle) (for example, the light beam having an integrated illumination intensity I on the reference plane represented by $I_0=\cos\theta$, $I_1=\cos(\theta+\pi/2)$, $I_2=\cos(\theta+\pi)$ and $I_3=\cos(\theta+3\pi/2)$). In this case, it is necessary to calculate $\arctan(=\tan^{-1})$ (see an equation (2) described below). However, the phase angle of 1 cycle cannot be calculated by only calculating arctan, because of $\tan\theta=\tan(\theta+\pi)$, that is, because the value $\tan\theta$ cannot be distinguished from the value which is obtained when the phase angle $\theta$ is varied by $\pi$. Thus, there is a need for an additional calculation for discriminating a quadrant to which the phase angle $\theta$ belongs.

On the other hand, if J=½, whenever the space code number is increased or decreased by 1, the amount of phase shift is increased or decreased by $\pi$. Thus, the range of the phase angle determined by the phase shift method may be the range of $\pi$, for example, the range of $\theta=-\pi/2$ to $\pi/2$ or $\theta=0$ to $\pi$. Therefore, since only the calculation of arctan allows the phase angle to be calculated, the calculation is more facilitated.

Preferably, if J=1, assuming that one of four types of sine-wave like patterns is expressed as $IS_0=\cos\theta$, the relationship between the phases of the sine-wave like patterns and the subspaces is selected so that the borders between the subspaces may be located at the positions of $\theta=0, 2\pi, 4\pi, \ldots$.

By this, the phase $\theta$ (a precise phase $\theta p$) calculated by the phase shift method is calculated in the range of $\theta=0$ to $2\pi$. Moreover, when the space code numbers given to the subspaces are set to Sc=0, 1, 2, 3, ..., n, ..., the space code numbers can be easily converted into a rough phase $\theta r$ ($=2n\pi$). Thus, a combined phase $\theta c$ ($=\theta r+\theta p=2n\pi+\theta p$) resulting from the simple combination of both the phases is determined. In this way, the origin is set to a point where $\theta p=0$, namely, the end of the space of a space code number n=0, whereby the combined phase $\theta c$ can be calculated and thus the height can be more easily calculated.

Preferably, if J=½, assuming that one of four types of sine-wave like patterns is expressed as $IS_0=\cos\theta$, the relationship between the phases of the sine-wave like patterns and the subspaces is selected so that the borders between the subspaces may be located at the positions of $\theta=-\pi/2, \pi/2, 3\pi/2, \ldots$.

By this, the phase $\theta$ (the precise phase $\theta p$) calculated by the phase shift method is calculated in the range of $\theta=-\pi/2$ to $\pi/2$. Moreover, when the space code numbers given to the subspaces are set to Sc=0, 1, 2, 3, ..., n, ..., the space code numbers can be easily converted into the rough phase $\theta r$ ($=n\pi$). Thus, the combined phase $\theta c$ ($=\theta r+\theta p=n\pi+\theta p$) resulting from the simple combination of both the phases is determined. In this way, the origin is set to the point where $\theta p=0$, namely, the end of the space of the space code number n=0, whereby the combined phase $\theta c$ can be calculated and thus the height can be more easily calculated.

Furthermore, according to the shape measuring device of the present invention, the subspace, which the one space code number is given to and which is illuminated with the light beam of the J cycle of the sine-wave like pattern, is adapted so that it may have an equal central angle of a generally fan-shaped cross section.

In the shape measuring device of the present invention having the above-described constitution, the subspaces have an equal central angle of their generally fan-shaped cross section. Thus, the control of the light beam illuminating means for generating the light beams of the stripe pattern and the sine-wave like pattern does not depend on a deflection angle of the light beam. Therefore, the control of the light beam illuminating means is facilitated.

According to the shape measuring device of the present invention, preferably, a height from a reference plane perpendicular to an optical axis of the integrating pickup member to a center of illumination of the light beam is equal to the height from the reference plane to a principal point of an objective lens of the integrating pickup member, and the subspace, which the one space code number is given to and which is illuminated with the light beam of said J cycle of with sine-wave like pattern, is adapted so that it may have an equal width on the reference plane belonging to said subspace.

According to the shape measuring device of the present invention having the above-described constitution, the height from the reference plane to the center of illumination of the light beam is equal to the height from the reference plane to the principal point of the objective lens of the integrating pickup member, and the subspaces have an equal width on the reference plane belonging to the subspaces. Thus, the resolving power for the height is constant regardless of the deflection angle of the illuminating light beam. That is, even if the object to be measured is horizontally moved to any position on the reference plane, the shape (the height) is measured at the same resolving power, and thus the portions of the object to be measured can be measured at the uniform resolving power. The shape (the height) can be also easily calculated.

Here, the reference plane means the plane which is the reference of the height of the object to be measured. The reference plane may be a real plane or a virtual plane.

Moreover, according to the shape measuring device of the present invention, preferably, the image information operating means includes: means for operating an amount of space code number shift, for calculating the amount of space code number shift for each pixel from space-coded image information and a reference space code number, the space-coded image information being obtained by illuminating the object to be measured with the light beam of the stripe pattern in accordance with the predetermined code, the reference space code number being observed by the pixels during illuminating the reference plane with the light beam of the stripe pattern in the absence of the object to be measured; means for operating an amount of phase shift, for calculating the amount of phase shift for each pixel from phase-shifted image information and a reference phase, the phase-shifted image information being obtained by illuminating the object to be measured with the light beam of the sine-wave like pattern, the reference phase being observed by the pixels during illuminating the reference plane with the light beam of the sine-wave like pattern in the absence of the object to be measured; and shape operating means for calculating the shape of the object to be measured from the amount of space code number shift and the amount of phase shift.

In the shape measuring device of the present invention having the above-mentioned constitution, as described above, the height from the reference plane to the center of illumination of the light beam is equal to the height from the reference plane to the principal point of the objective lens. The subspace, which one space code number is given to and which is illuminated with the light beam of J cycle of the sine-wave like pattern, is adapted so that it may have an equal width on the reference plane belonging to the subspace.

Also, the amount of space code number shift is determined for each pixel from the space-coded image information and the reference space code number. The amount of phase shift is determined for each pixel from the phase-shifted image information and the reference phase. Thus, the reference space code number and the reference phase are additionally needed. However, for calculating the shape of the object to be measured from these two amounts of shift, the height can be calculated by a simple calculation without determining a deflection angle $\alpha$ and using the calculation in accordance with the principle of triangulation including the calculation of tan $\alpha$.

The reference space code number and the reference phase may be obtained by illuminating the reference plane with the light beam before or after measuring the object to be measured. Alternatively, the previously measured or calculated reference space code number and reference phase may be stored in a memory (a storage medium) such as ROM and a hard disk.

Furthermore, according to the shape measuring device of the present invention, preferably, the shape operating means includes means for operating an amount of combined phase shift/a shape, for calculating the shape of the object to be measured from the amount of combined phase shift obtained by combining, for each pixel, the amount of space code number shift and the amount of phase shift.

According to the shape measuring device of the present invention having the above-described constitution, the shape of the object to be measured is calculated from the amount of combined phase shift obtained by once combining the amount of space code number shift and the amount of phase shift. Therefore, this device is preferable because the shape is operated only once.

Moreover, according to the shape measuring device of the present invention, preferably, the shape operating means includes: means for operating an amount of space code number shift/a rough shape, for calculating the rough shape of said object to be measured from the amount of space code number shift; means for operating an amount of phase shift/a precise shape, for calculating the precise shape of the object to be measured from the amount of phase shift; and phase combining means for calculating the shape of the object to be measured by combining the rough shape and the precise shape.

In the shape measuring device of the present invention having the above-described constitution, the rough shape and the precise shape are determined from the amount of space code number shift and the amount of phase shift, respectively. Thus, the shape is calculated twice for each pixel. However, the combination is sufficiently accomplished by only adding the rough and precise shapes to each other, and consequently the shape can be easily calculated.

Also, according to the shape measuring device of the present invention, preferably, the image information operating means includes: rough phase operating means for calculating, for each pixel, a rough phase equivalent to the phase of the light beam of the sine-wave like pattern from the space-coded image information; precise phase operating means for calculating a precise phase for each pixel from the phase-shifted image information; combined phase operating means for calculating a combined phase for each pixel by combining, for each pixel, the rough phase and the precise phase; and combined phase/shape operating means for calculating the shape of the object to be measured from the combined phase.

According to the shape measuring device of the present invention having the above-described constitution, the rough phase operating means calculates the rough phase for each pixel from the space-coded image information. The calculated rough phase is defined as phase information in the same manner as the precise phase calculated from the phase-shifted image information for each pixel. Thus, only the addition of the rough and precise phases to each other is sufficient for the combined phase operating means to combine the rough phase and the precise phase, and therefore the combined phase can be easily calculated. Moreover, since the shape of the object to be measured can be calculated from the combined phase at one time, the shape can be also easily calculated.

Furthermore, according to the shape measuring device of the present invention, preferably, the image information operating means includes: space-coding shape operating means for calculating the rough shape of the object to be measured from the space-coded image information obtained by illuminating the object to be measured with the light beam of the stripe pattern in accordance with said predetermined code; phase-shifting shape operating means for calculating the precise shape of the object to be measured from the phase-shifted image information obtained by illuminating the object to be measured with the light beam of the sine-wave like pattern; and shape combining/operating means for combining the rough shape calculated by the space-coding shape operating means and the precise shape calculated by the phase-shifting shape operating means and for calculating the shape of the object to be measured.

In the shape measuring device of the present invention having the above-described constitution, the space-coding operating means calculates the rough shape of the object to be measured from the space-coded image information obtained by illuminating the object to be measured with the light beam of the stripe pattern. On the other hand, the phase-shifting operating means calculates the precise shape of the object to be measured from the phase-shifted image information obtained by illuminating the object to be measured with the light beam of the sine-wave like pattern. Furthermore, the shape combining/operating means combines the rough shape and the precise shape calculated by these means and then calculates the shape of the object to be measured.

In short, according to the present invention, the rough shape is calculated by the space-coding shape operation, the precise shape is calculated by the phase-shifting shape operation, and these shapes are combined. Thus, the object can be measured at the high resolving power in the wide range of the allowable height (in the wide dynamic range). Even the large-sized object to be measured can be therefore measured at the high resolving power.

Moreover, although it is necessary to calculate two types of shapes, i.e., the rough shape and the precise shape of the object to be measured, the combination of the shapes is sufficiently accomplished by only adding the shapes to each other, and thus the combination is facilitated.

Furthermore, according to the shape measuring device of the present invention, preferably, the light beam illuminating means includes: a light source for generating a slit light beam; slit light beam scanning means for illuminating the surface of the object to be measured with the slit light beam and for deflecting/scanning the slit light beam; space-coding light beam controlling means for controlling the slit light beam so that the integrated illumination intensity of the slit light beam illuminating within the time period for picking up one field or one frame may be distributed like a stripe in accordance with a predetermined code; and phase-shifting light beam controlling means for controlling the slit light beam so that the integrated illumination intensity of the slit light beam illuminating within the time period for picking up one field or one frame may be distributed like a sine wave.

In the shape measuring device of the present invention having the above-described constitution, in the light beam illuminating means, the light source emits the slit light beam, and the light beam scanning means illuminates the surface of the object to be measured with the slit light beam and deflects/scans the slit light beam. At this time, the space-coding light beam controlling means controls the slit light beam so that the integrated illumination intensity of the slit light beam illuminating within the time period for picking up one field or one frame may be distributed like a stripe in accordance with a predetermined code. Also, the phase-shifting light beam controlling means controls the slit light beam so that the integrated illumination intensity of the slit light beam illuminating within the time period for picking up one field or one frame may be distributed like a sine wave.

According to the present invention, the slit light beam is used to control the illumination intensity of the light beam so that the integrated illumination intensity in the time period for picking up one field or one frame may have the stripe and sine-wave like patterns. It is thus unnecessary to use a planar light source. Consequently, even if the light source having a small quantity of light is used, the measurement can be accomplished by enhancing a contrast. Therefore, since it is unnecessary to use the light source having a great quantity of light, there is no problem about a heat generation and thus the device can be compacted.

Furthermore, the measurement by the space coding method and the measurement by the phase shift method are performed by using the common light source and light beam scanning means and the different controlling means. Thus, the object can be measured at the high resolving power and also the device can be compact and inexpensive.

Moreover, the phase-shifted image information can have the high contrast. Thus, even a little difference in height can be clearly distinguished as a difference in lightness (a difference in phase). Therefore, the resolving power for the height can be improved.

According to the present invention, more particularly, the measurement can be done by the phase shift method by the use of a high-luminance laser light beam or the like.

Preferably, a laser light source is used as the light source because it can function as a slit light source consuming less power but having a high intensity of illumination. Although any laser light source such as a semiconductor laser, a gas laser, a solid-state laser and a liquid laser may be used as the laser light source, the semiconductor laser is preferably used because it can miniaturize the device and perform a high-speed switching. The wavelength of the laser light beam may be selected depending on the material of the object to be measured, the photosensitivity of the integrating pickup member (CCD camera, etc.), the wavelength of an externally scattered light resulting in a noise, or the like. The wavelength selected in the range of a visible light (for example, red, green, blue and so on) is convenient for an easy visual check on the operation. The light beam may be shaped into the slit by the use of optical means such as a cylindrical lens.

Any light beam scanning means will do, as long as it deflects a traveling direction of the slit light beam when it reflects and transmits the Slit light beam. More specifically, a rotary polygon mirror (hereinafter, also referred to as a polygon mirror), a galvanometer mirror or the like may be used.

According to the shape measuring device of the present invention, preferably, the phase-shifting light beam controlling means controls the slit light beam so that the slit light beam may have the distribution of integrated illumination intensity in which the phases of the sine wave differ by ¼ cycle in each field or each frame, and the phase-shifting shape operating means calculates the precise shape of the object to be measured by the use of the phase-shifted image information of at least four fields or four frames differing from one another in the phases of the sine-like wave.

For measuring the shape by the phase shift method, the shape can be, in principle, calculated from three pieces of image information or more obtained by illuminating the object with three types of light beams or more differing in the phase. However, the phase-shifted image information of four fields or four frames differing by ¼ cycle is used, because it is possible to simply calculate the phase and also to eliminate the influence of the reflectance of the object to be measured and the influence of the externally scattered light.

Moreover, according to the shape measuring device of the present invention, preferably, the phase-shifting light beam controlling means controls how long the slit light beam is switched on while scanning a subarea on the reference plane and thereby adjusts the integrated illumination intensity in the subarea.

In the shape measuring device of the present invention having the above-described constitution, in order to distribute the integrated illumination intensity like the sine wave, the phase-shifting light beam controlling means controls how long the slit light beam is switched on while scanning the subarea on the reference plane. The integrated illumination intensity in the subarea is thereby adjusted.

In short, according to the present invention, the integrated illumination intensity of the light beam illuminating a certain subarea on the reference plane is adjusted by the time in which the slit light beam is actually switched on while scanning the subarea, in the time period in which the subarea is scanned by the slit light beam. Therefore, it is not necessary to use a bamboo-blind-like mask and a liquid crystal slit like the prior art in order that the integrated illumination intensity is distributed like the sine wave. By adjusting the lighting time, the state of the distribution of integrated illumination intensity can be also adjusted (for example, the phase of the distribution, the range of the integrated illumination intensity or the like can be adjusted). Thus, there is no need for a mechanical adjustment such as a focusing and a replacement of the mask. The adjustment associated with an electric circuit is sufficient to adjust the distribution, and thus the state of the distribution is readily adjusted.

As an approach for controlling the lighting/scanning time, more particularly, PWM (pulse width modulation) is used so as to change the time in which the slit light source continues lighting in the time period for scanning a certain subarea and to make the lighting time longer in the portion desired to be illuminated with the higher intensity of illumination. Alternatively, by changing the number of times of lighting (the number of pulses) having a constant time width included in the time period for scanning a certain subarea, the larger number of times of lighting (the larger number of pulses) is increased in the portion desired to be illuminated with the higher intensity of illumination. Other approach may be used as the above-mentioned controlling approach, as long as it can adjust the time in which the light source is actually switched on in the time period for scanning the subarea by the light beam.

As other adjusting means, the luminance of the light source itself is modulated whereby the integrated illumination intensity is changed, or the transmittance of a liquid crystal filter is modulated whereby the integrated illumination intensity is changed.

Moreover, according to the shape measuring device of the present invention, preferably, the slit light beam scanning means allows the slit light beam to perform plural scans within the time period for picking up one field or one frame, and the phase-shifting light beam controlling means controls how many times the slit light beam is switched on while scanning the subarea on the reference plane, whereby the integrated illumination intensity in the subarea is adjusted.

In the shape measuring device of the present invention having the above-described constitution, in order that the integrated illumination intensity is distributed like the sine wave, the slit light beam scanning means allows the slit light beam to perform plural scans within the time period for picking up one field or one frame. Furthermore, the phase-shifting light beam controlling means controls how many times the slit light beam is switched on while scanning the subarea on the reference plane in these plural scans and thereby adjusts the integrated illumination intensity in this subarea.

In short, according to the present invention, the integrated illumination intensity of the light beam illuminating a certain subarea on the reference plane is controlled by the number of times the light beam is actually switched on while scanning the subarea, in the number of times the subarea is scanned by the light beam. Therefore, it is not necessary to use the bamboo-blind-like mask and the liquid crystal slit like the prior art in order that the integrated illumination intensity is distributed like the sine wave. By adjusting the number of times of lighting, the state of the distribution of integrated illumination intensity can be also adjusted. Thus, there is no need for the mechanical adjustment such as the focusing. The adjustment associated with the electric circuit is sufficient to adjust the distribution, and thus the state of the distribution is readily adjusted.

The approach for controlling the number of times of lighting/scanning is more particularly accomplished in the following manner. That is, as regards a certain subarea, this subarea is scanned plural times by the slit light beam within the time period for picking up one field or one frame. By controlling the number of times the light beam is actually switched on while scanning the subarea in these plural scans, the integrated illumination intensity of the light beam illuminating this subarea within the pickup period is changed. For example, when the subarea is scanned 7 times during the pickup period, the number of times of lighting/scanning can be changed in the range of 0 to 7 times, namely, 8 steps.

Furthermore, according to the shape measuring device of the present invention, preferably, the slit light beam scanning means allows the slit light beam to perform plural scans during the time period for picking up one field or one frame, (and also) the phase-shifting light beam controlling means controls how long and how many times the slit light beam is switched on while scanning the subarea on the reference plane, whereby the integrated illumination intensity in the subarea is adjusted.

In the shape measuring device of the present invention having the above-described constitution, the slit light beam scanning means allows the slit light beam to perform plural scans during the time period for picking up one field or one frame. Furthermore, the phase-shifting light beam controlling means controls how long and how many times the slit light beam is switched on while scanning the subarea on the reference plane in these plural scans, whereby the integrated illumination intensity in this subarea is adjusted.

In short, according to the present invention, the integrated illumination intensity is distributed like the sine wave by allowing the slit light beam to perform plural scans and then by controlling how many times and how long the light beam is switched on while scanning the subarea on the reference plane in these plural scans. Therefore, it is not necessary to use the bamboo-blind-like mask and the liquid crystal slit like the prior art.

Furthermore, since the number of times and the time can be independently controlled, many steps can be set so as to change the intensity. Accordingly, many variable steps can be set, the distribution of intensity can be thus more closer to the sine-wave like shape, and consequently it is possible to reduce the error caused due to the distortion of the waveform of the distribution.

In the above-mentioned shape measuring device, the slit light beam scanning means may deflect/scan the slit light beam by a rotary polygon mirror.

The rotary polygon mirror is adapted so as to have the increased number of rotation and the increased number of surfaces, whereby its scanning rate can be increased. Thus, the slit light beam can easily perform plural scans within the time period for picking up one field or one frame. Unlike the galvanometer mirror, no return scanning is performed and thus the number of times of scanning can be readily adjusted.

Moreover, according to Embodiment 2 of the present invention, a shape measuring device comprises: a light source for generating a slit light beam; slit light beam scanning means for illuminating the surface of the object to be measured with the slit light beam and for deflecting/scanning the slit light beam; phase-shifting light beam controlling means for controlling the slit light beam so that the integrated illumination intensity of the slit light beam illuminating within the time period for picking up one field or one frame may be distributed like the sine wave; pickup means for picking up, by the integrating pickup member, the optical image formed on the surface of the object to be measured by the slit light beam; and phase-shifting shape operating means for calculating the shape of the object to be measured from the phase-shifted image information obtained by illuminating the object to be measured with said slit light beam controlled by the phase-shifting light beam controlling means.

In the shape measuring device of the present invention having the above-described constitution, the light source emits the slit light beam, and the slit light beam scanning means illuminates the surface of the object to be measured with the slit light beam and deflects/scans the slit light beam. At this time, the phase-shifting light beam controlling means controls the slit light beam so that the integrated illumination intensity of the slit light beam illuminating within the time period for picking up one field or one frame may be distributed like the sine wave. The pickup means picks up the optical image formed on the surface of the object to be measured by the slit light beam. Furthermore, the phase-shifting shape operating means calculates the shape of the object to be measured from the phase-shifted image information obtained by illuminating the object to be measured with the slit light beam controlled by the phase-shifting light beam controlling means.

That is, according to the present invention, when the phase shift method is applied to the present invention, the slit light beam is used so as to be scanned. Then, the intensity of illumination of the light beam is controlled so that the integrated illumination intensity in the time period for picking up one field or one frame may have the sine-wave like pattern. Thus, it is not necessary to use the planar light source. Even if the light source having a small quantity of light is used, the measurement can be accomplished by enhancing the contrast. Therefore, since it is unnecessary to use the light source having a great quantity of light, there is no problem about the heat generation and thus the device can be compacted.

Moreover, the phase-shifted image information can have the high contrast. Thus, even a little difference in height can be clearly distinguished as a difference in lightness (a difference in phase). Therefore, the resolving power for the height can be improved.

According to the present invention, more particularly, the measurement can be done by the phase shift method by the use of the high-luminance laser light beam or the like.

Furthermore, according to the above shape measuring device, preferably, the phase-shifting light beam controlling means controls the slit light beam so that the slit light beam may have the distribution of integrated illumination intensity in which the phases of the sine wave differ by ¼ cycle in each field or each frame, and the phase-shifting shape operating means calculates the shape of the object to be measured by the use of the phase-shifted image information of at least four fields or four frames differing from one another in the phases of the sine wave.

The phase-shifted image information of four fields or four frames differing by ¼ cycle is used, because it is possible to simply calculate the phase and also to eliminate the influence of the reflectance of the object to be measured and the influence of the externally scattered light.

Also, according to the above shape measuring device, preferably, the phase-shifting light beam controlling means controls how long the slit light beam is switched on while scanning the subarea on the reference plane and thereby adjusts the integrated illumination intensity in the subarea.

According to the present invention, the integrated illumination intensity of the light beam illuminating a certain subarea on the reference plane is controlled by the time in which the light beam is actually switched on while scanning the subarea, in the time period in which the subarea is scanned by the light beam. Therefore, it is not necessary to use the bamboo-blind-like mask and the liquid crystal slit like the prior art in order that the integrated illumination intensity is distributed like the sine wave. By controlling the lighting time, the state of the distribution of integrated illumination intensity can be also adjusted. Thus, there is no need for the mechanical adjustment such as the focusing. The adjustment associated with the electric circuit is sufficient to adjust the distribution, and thus the state of the distribution is readily adjusted.

Also, according to the above shape measuring device, preferably, the slit light beam scanning means allows the slit light beam to perform plural scans within the time period for picking up one field or one frame, and the phase-shifting light beam controlling means controls how many times the slit light beam is switched on while scanning the subarea on the reference plane, whereby the integrated illumination intensity in the subarea is adjusted.

According to the present invention, the integrated illumination intensity of the light beam illuminating a certain subarea on a certain reference plane is controlled by the number of times the light beam is actually switched on while scanning the subarea within the time period in which the subarea is scanned by the light beam. Therefore, it is not necessary to use the bamboo-blind-like mask and the liquid crystal slit like the prior art in order that the integrated illumination intensity is distributed like the sine wave. By controlling the number of times of lighting, the state of the distribution of integrated illumination intensity can be also adjusted. Thus, there is no need for the mechanical adjustment such as the focusing. The adjustment associated with the electric circuit is sufficient to adjust the distribution, and thus the state of the distribution is readily adjusted.

Also, according to the above shape measuring device, preferably, the slit light beam scanning means allows the slit light beam to perform plural scans during the time period for picking up one field or one frame, and the phase-shifting light beam controlling means adjusts how long and how many times the slit light beam is switched on while scanning the subarea on the reference plane, whereby the integrated illumination intensity in the subarea is adjusted.

According to the present invention, the integrated illumination intensity is distributed like the sine wave by allowing the slit light beam to perform plural scans and then by controlling how many times and how long the light beam is switched on while scanning the subarea on the reference plane in these plural scans. Therefore, it is not necessary to use the bamboo-blind-like mask and the liquid crystal slit like the prior art. Furthermore, since the number of times and the time can be independently controlled, many steps can be set so as to change the intensity. Accordingly, many variable steps can be set, the distribution of intensity can be thus more closer to the sine-wave like shape, and consequently it is possible to reduce the error caused due to the distortion of the waveform of the distribution.

Furthermore, according to the above shape measuring device, preferably, the height from the reference plane perpendicular to the optical axis of the integrating pickup member to the center of illumination of the light beam is equal to the height from the reference plane to the principal point of the objective lens of said integrating pickup member, and the phase-shifting light beam controlling means controls the slit light beam so that the distribution of integrated illumination intensity of the slit light beam illuminating the reference plane may have a sine-wave like pattern of a constant wavelength on the reference plane.

According to the shape measuring device of the present invention having the above-described constitution, the height from the reference plane to the center of illumination of the light beam is equal to the height from the reference plane to the principal point of the objective lens of the integrating pickup member. The distribution of integrated illumination intensity of the slit light beam has the sine-wave like pattern of a constant wavelength on the reference plane.

Thus, the resolving power for the height is constant regardless of the deflection angle of the illuminating light beam. That is, even if the object to be measured is horizontally moved to any position on the reference plane, the shape (the height) can be measured at the same resolving power, and thus the portions of the object to be measured can be measured at the uniform resolving power.

BRIEF DESCRIPTION OF THE DRAWINGS

FIG. 4 shows data of a space-coding light beam control data memory;

FIG. 10 shows the method for combining rough shape data and precise shape data;

FIG. 21 shows data of a space-coding light beam control data memory according to Embodiment 2;

FIG. 22 shows method for formulating an equation to find height Z with ease according to FIG. 20, FIG. 20(a) is of a case before an object to be measured is moved, and FIG. 20(b) is of a case after an object to be measured has virtually been moved;

DESCRIPTION OF THE EMBODIMENTS

Embodiments of a shape measuring device according to the present invention will be described below with reference to the accompanying drawings.

Embodiment 1

Figure 1:
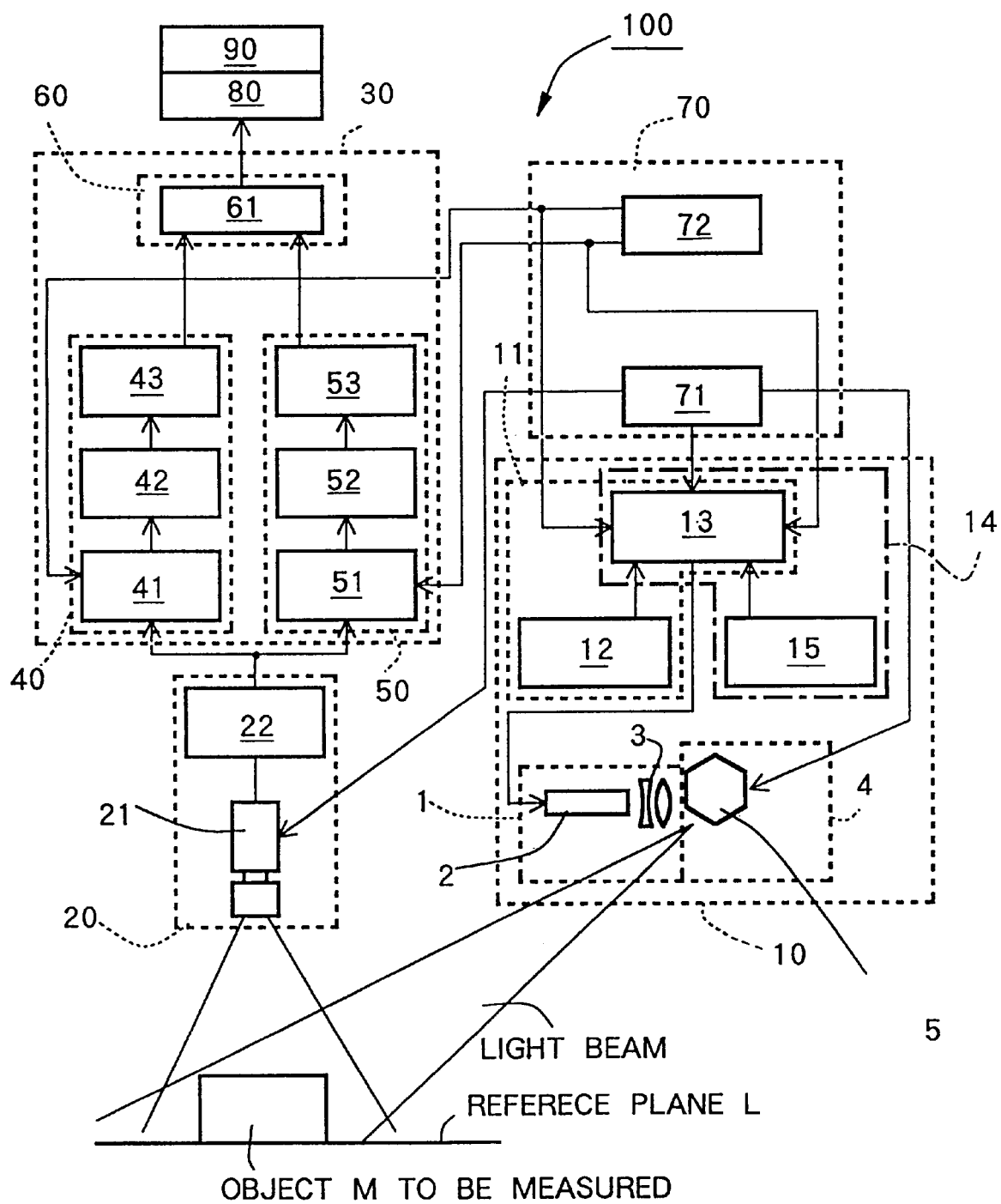
FIG. 1 shows a shape measuring device according to Embodiment 1.

FIG. 1 illustrates a shape measuring device 100 according to a first embodiment of the present invention. The shape measuring device 100 of this embodiment has light beam illuminating means 10 for illuminating an object M to be measured placed on a reference plane L with a light beam; pickup means 20 for picking up an optical image formed by illuminating the object M to be measured with the light beam; image information operating means 30 for calculating the height and shape of the object M to be measured from picked-up image information; and a control section 70.

The light beam illuminating means 10 includes a light source 1 for emitting a slit light beam; light beam scanning means 4 for illuminating the object to be measured with the slit light beam and for deflecting/scanning the slit light beam; and space-coding light beam controlling means 11 and phase-shifting light beam controlling means 14 for controlling the slit light beam. In greater detail, the light source 1 includes a laser light source 2; and a lens system 3 for shaping a laser light beam from the laser light source 2 into the slit light beam. The light beam scanning means 4 includes a polygon mirror 5 for reflecting the slit light beam and for deflecting/scanning the slit light beam by its rotation.

The space-coding light beam controlling means 11 includes a space-coding light beam control data memory 12 (an S-type data memory shown in FIG. 1); and a laser controller 13 for reading a code stored in the space-coding light beam control data memory 12 and for controlling the laser light source 2 in accordance with this code. The laser controller 13 is included in a phase-shifting light beam control data memory 15 (a P-type data memory shown in the drawing) and phase-shifting light beam controlling means 14. The laser controller 13 also reads control data stored in the phase-shifting light beam control data memory 15 and controls the laser light source 2 in accordance with this control data.

The pickup means 20 includes a CCD camera 21 and an image memory 22 which are set so that they may output the image information by a field storing system. The CCD camera 21 picks up the image every time period (1/60 sec) for picking up one field. The image information to be outputted is stored in the image memory 22.

The image information operating means 30 has space-coding shape operating means 40 for calculating a rough shape of the object M to be measured; phase-shifting shape operating means 50 for calculating a precise shape of the object M to be measured; and shape combining/operating means 60 for combining the rough and precise shapes and for calculating the shape of the object M to be measured. In greater detail, the space-coding shape operating means 40 includes a space-coded image information capturing circuit 41 (an S-type capturing circuit shown in the drawing) for capturing the image information from the pickup means 20, for converting the captured image information into binary image information indicating light and darkness, and then for storing the binary image information; a space-coding operating circuit 42 (an S-type operating circuit shown in the drawing) for calculating the rough shape of the object M to be measured from the binary image information by a space coding method; and a rough shape data memory 43 (a rough shape memory shown in the drawing) for storing the calculated rough shape.

Figure 2:
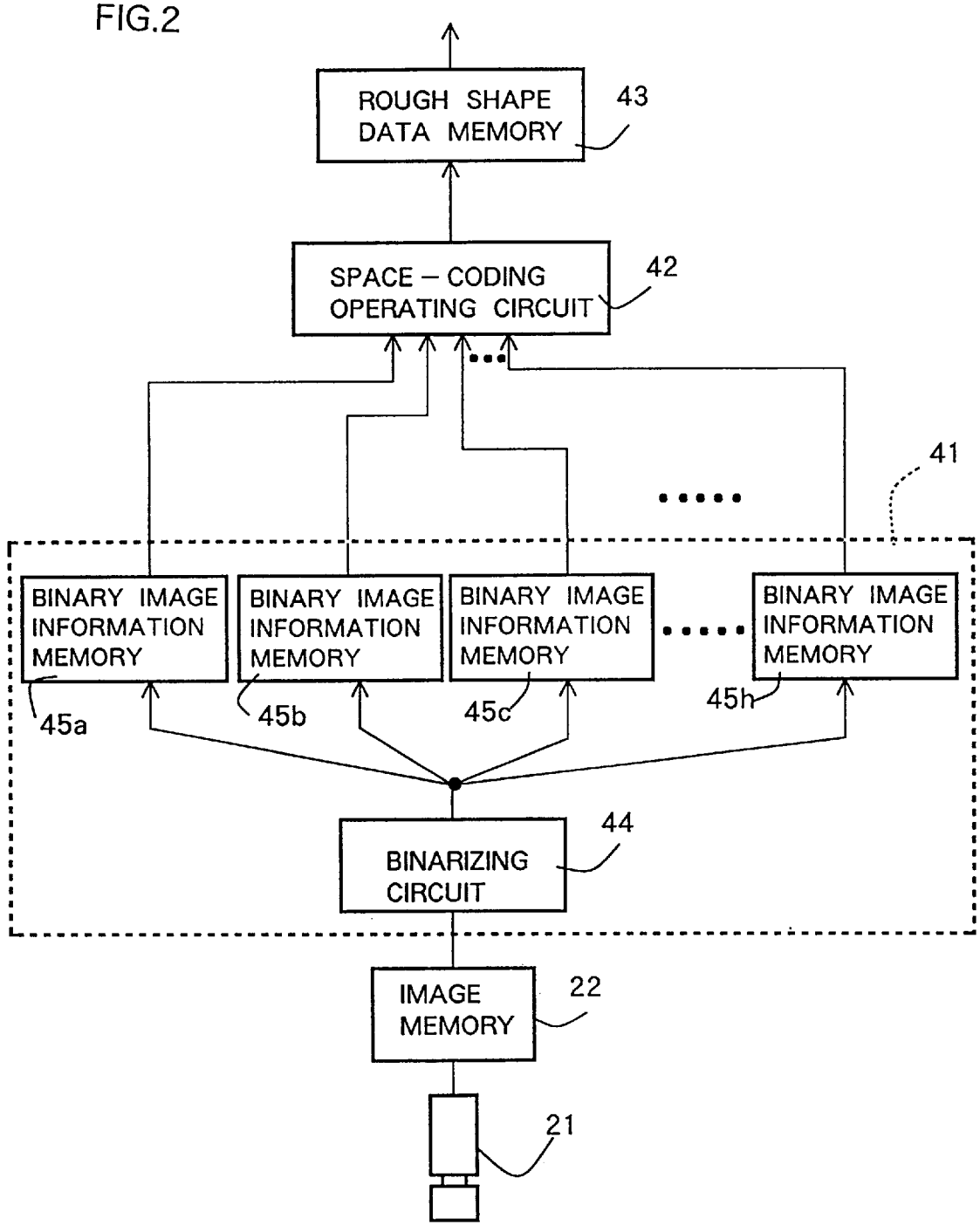
FIG. 2 shows details of a space-coded image information capturing circuit.

As shown in detail in FIG. 2, the space-coded image information capturing circuit 41 also has a binarizing circuit 44 and eight binary image information memories 45a–45h (binary image memories shown in the drawing), for example. Lightness image information of each pixel is captured from the image memory 22 and has an 8-bit tone, for example. This lightness image information is first converted into the light/darkness binary information for each pixel by the binarizing circuit 44. Then, the light/darkness binary information is stored in any one of the binary image information memories 45a–45h.

Figure 3:
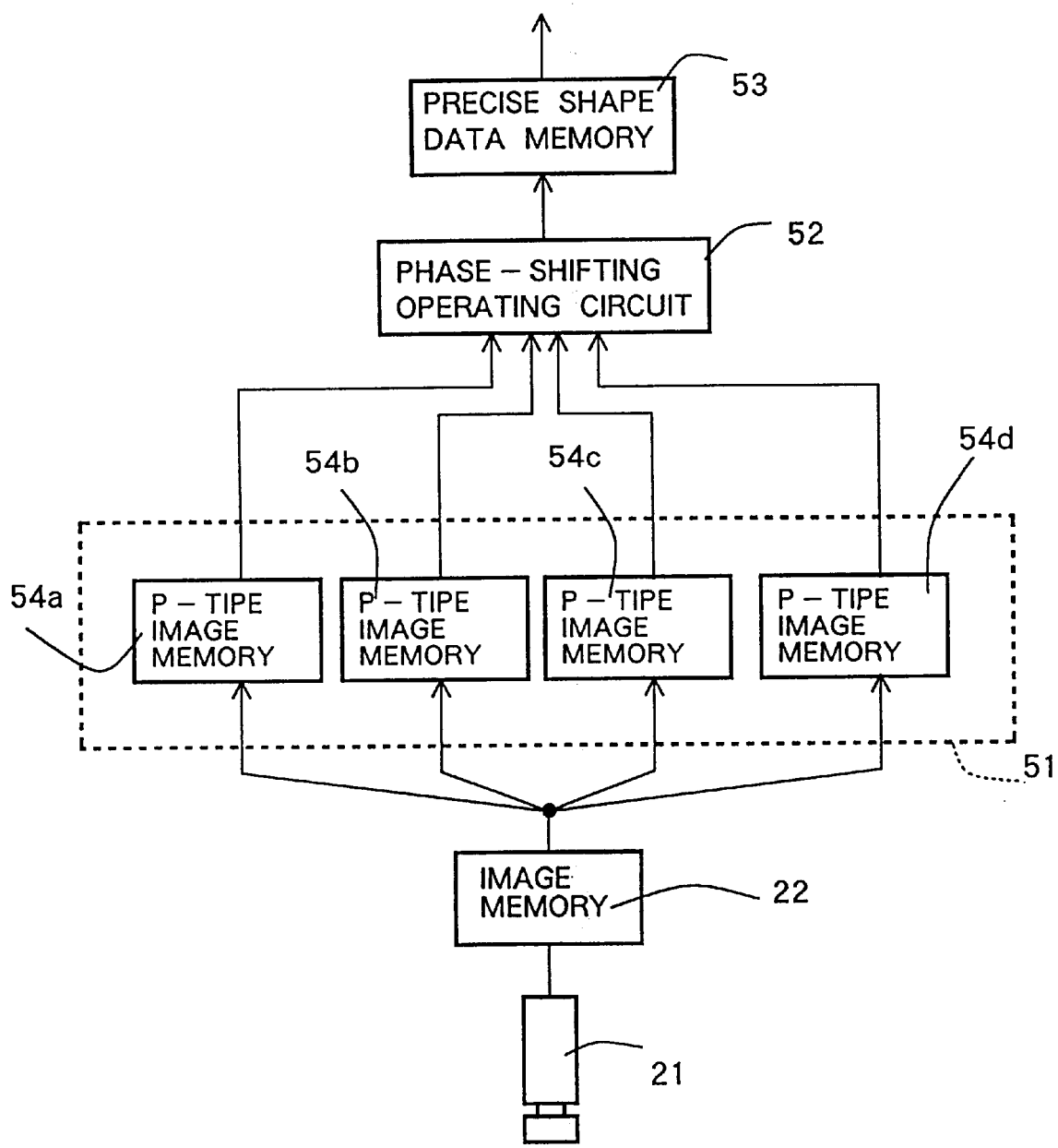
FIG. 3 shows details of a phase-shifted image information capturing circuit.

The phase-shifting shape operating means 50 includes a phase-shifted image information capturing memory 51 (a P-type capturing memory shown in the drawing) for capturing and storing the image information from the pickup means 20; a phase-shifting operating circuit 52 (a P-type operating circuit shown in the drawing) for calculating the precise shape of the object to be measured from a lightness value of the image information by a phase shift method; and a precise shape data memory 53 (a precise shape memory shown in the drawing) for storing the calculated precise shape data. The shape combining/operating means 60 includes a shape combining circuit 61 (a combining circuit shown in the drawing) for combining the rough shape data and the precise shape data and calculating the shape of the object M to be measured. The phase-shifted image information capturing memory 51 includes four phase-shifted image information memories 54a–54d (P-type image memories shown in the drawing), as shown in FIG. 3. The lightness image information of each pixel, which is captured from the image memory 22 and has the 8-bit tone for example, is stored in any one of the phase-shifted image information memories 54a–54d.

Furthermore, the control section 70 includes a synchronous circuit 71 and a selector 72. The synchronous circuit 71 adjusts the timing among the polygon mirror 5, the laser controller 13 and the CCD camera 21. The selector 72 switches the measurement between the measurement by the space coding method and the measurement by the phase shift method.

When the measurement is done by the space coding method, the selector 72 selects (switches) the code which the laser controller 13 reads from the space-coding light beam control data memory 12. The selector 72 also selects which memory of the binary image information memories 45a–45h stores the image information captured and binarized by the space-coded image information capturing circuit 41.

Similarly, when the measurement is done by the phase shift method, the selector 72 selects (switches) the control data which the laser controller 13 reads from the phase-shifting light beam control data memory 15. The selector 72 also selects which memory of the phase-shifted image information memories 54a–54d stores the image information captured by the phase-shifting shape operating means 50.

In the shape measuring device 100 of this embodiment, the laser light beam emitted from the laser light source 2 is shaped into the slit light beam by the lens system 3. The slit light beam is reflected, deflected and scanned by the polygon mirror 5. The object M to be measured (and the reference plane L) is(are) obliquely illuminated with the slit light beam.

The case in which the measurement by the space coding method is selected by the selector 72 will be first described. In this case, the selector 72 instructs the laser controller 13 to read the data from the space-coding light beam control data memory 12. The laser controller 13 controls whether the laser light source 2 is switched on or off in accordance with this data.

Eight types of codes in accordance with a gray code as shown in FIG. 4, for example, are stored in the space-coding light beam control data memory 12. One of memory bits 0 through 7 is selected, and the selected memory bit is read into the laser controller 13. Then, for example, this code data is assumed so that "0" and "1" may correspond to the darkness (switch off) and the light (switch on), respectively. In accordance with the selected code data, the laser light source 2 is switched on/off in the order of memory addresses 0 through 255 at a predetermined interval by a clock pulse or the like, for example. In this way, for example, when the code in the memory bit 0 of FIG. 4 is selected, the laser light source 2 is switched on/off in accordance with a pattern indicating darkness, light, light, darkness, darkness, light, light, darkness, darkness, . . . at a predetermined time interval.

The slit light beam, which is scanned by the polygon mirror 5 keeping the constant number of rotation (a constant angular velocity), is thus changed into the light beam of a stripe pattern in accordance with the read code. The optical image of the stripe pattern is formed on the surface of the object M to be measured. The height of the object M to be measured on the portions thereof is observed as the shift in the light/darkness of the stripe pattern. The space is illuminated with eight types of light beams in accordance with the above-described eight types of codes, whereby the space illuminated with the light beams is divided into 256 (=$2^8$) subspaces SS. A series of space code numbers Sc are given to the subspaces SS by the space coding method. The subspaces SS have each a generally fan-shaped cross section having an equal central angle. The portions on the surface of the object M to be measured are therefore represented by the space code numbers given to the subspaces SS which the portions on the surface belong to (are included in). The shape (height) of the object M to be measured in the portions on the surface thereof is calculated from the space code numbers Sc determined from eight types of picked-up optical images by the principle of triangulation.

The subspaces SS can have an equal central angle β by switching on/off the laser light source 2 at a predetermined time interval, regardless of a deflection angle of the light beam. Thus, the control is easy.

The image is picked up by the CCD camera 21 (having 512×240 pixels) from the position substantially just above the object M to be measured in the drawing. The output from the CCD camera 21, namely, the image information is stored in the image memory 22. The image information from the CCD camera 21 is the data whose lightness is represented by the 8-bit tone for each pixel.

As described above, the laser controller 13, the polygon mirror 5 and the CCD camera 21 are synchronously operated by the synchronous circuit 71. That is, the synchronous circuit 71 controls the pickup timing of the CCD camera, the number of rotation of the polygon mirror 5 and the angles of mirror surfaces so that the object M to be measured may be scanned one or plural predetermined times by the slit light beam during the time period ($\frac{1}{60}$ sec) in which the CCD camera 21 picks up one field. Moreover, these timings are synchronized to the timing at which the laser controller 13 controls the laser light source 2 so that the object M to be measured may be illuminated with the light beam of a predetermined pattern. When plural scans are performed by the slit light beam within the time period for picking up one field, the laser light source 2 is switched on/off in accordance with the pattern based on the same code for each scan. In consideration of the reflectance of the object M to be measured and the externally scattered light, the laser light source 2 may be actually switched on and perform the scan appropriate times (for example, twice) of plural times (for example, five times), and, otherwise, the laser light source 2 may be switched off.

Next, the selector 72 instructs the space-coded image information capturing circuit 41 to capture the image information stored in the image memory 22. The image information, which is picked up when the laser controller 13 controls the laser light source 2 in accordance with the data in the space-coding light beam control data memory 12, is thus captured in the space-coded image information capturing circuit 41. On the other hand, the phase-shifted image information capturing memory 51 captures the image information which is picked up when the laser controller 13 controls the laser light source 2 in accordance with the data in the phase-shifting light beam control data memory 15 described below.

In the space-coded image information capturing circuit 41, as shown in detail in FIG. 2, the image information captured from the image memory 22 is first converted into the light/darkness binary image information for each pixel by the binarizing circuit 44. Then, the binary image information is stored in any one (for example, 45a) of the binary image information memories 45a–45h.

Next, the selector 72 instructs the laser controller 13 to read, from the space-coding light beam control data memory 12, the code in the memory address (for example, the memory address 1) which is not used in the previous pickup. In accordance with this code, the laser light source 2 is switched on/off in the same manner as described above. The optical image of the object M to be measured formed by the light beam of the stripe pattern in accordance with this code is then picked up. The optical image is converted into the binary image information in the same manner as described above. The binary image information is stored in any one (for example, 45b) of the binary image information memories 45a–45h in which the binary image information is not yet stored.

This operation is carried out for eight types of codes stored in memory codes 0 through 7 shown in FIG. 4. It should be noted that the order of pickup does not need to be the order of the memory codes.

When the binary image information in accordance with each code is stored in the binary image information memories 45a–45h, the binary image information stored in these eight memories 45a–45h is read in the space-coding operating circuit 42. Then, the shape (rough shape) of the object M to be measured is calculated by the use of the known space coding method and the principle of triangulation (described below). The calculated rough shape data is stored in the rough shape data memory 43.

Next, the case in which the measurement by the phase shift method is selected by the selector 72 will be described. In this case, the selector 72 instructs the laser controller 13 to read the data from the phase-shifting light beam control data memory 15 and then to control the laser light source 2 in accordance with this data.

Figure 5:
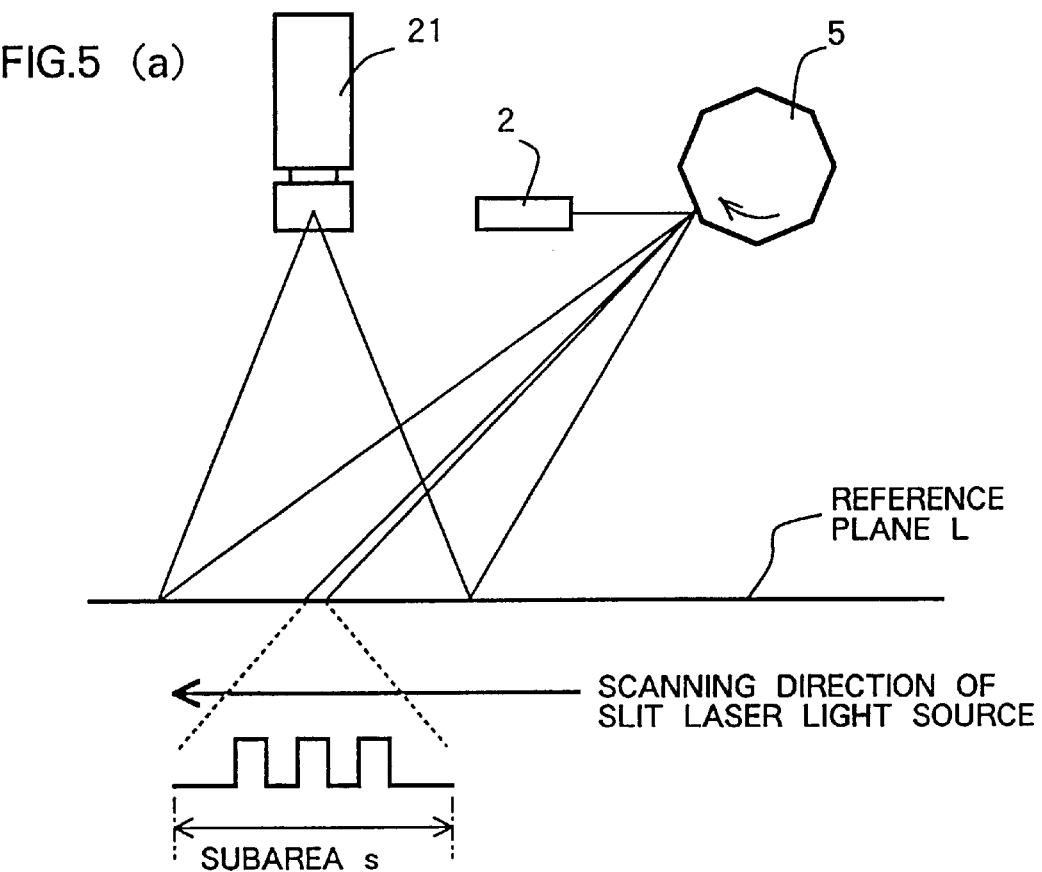
FIG. 5 shows the first approach to change integrated illumination intensity.
Figure 5:
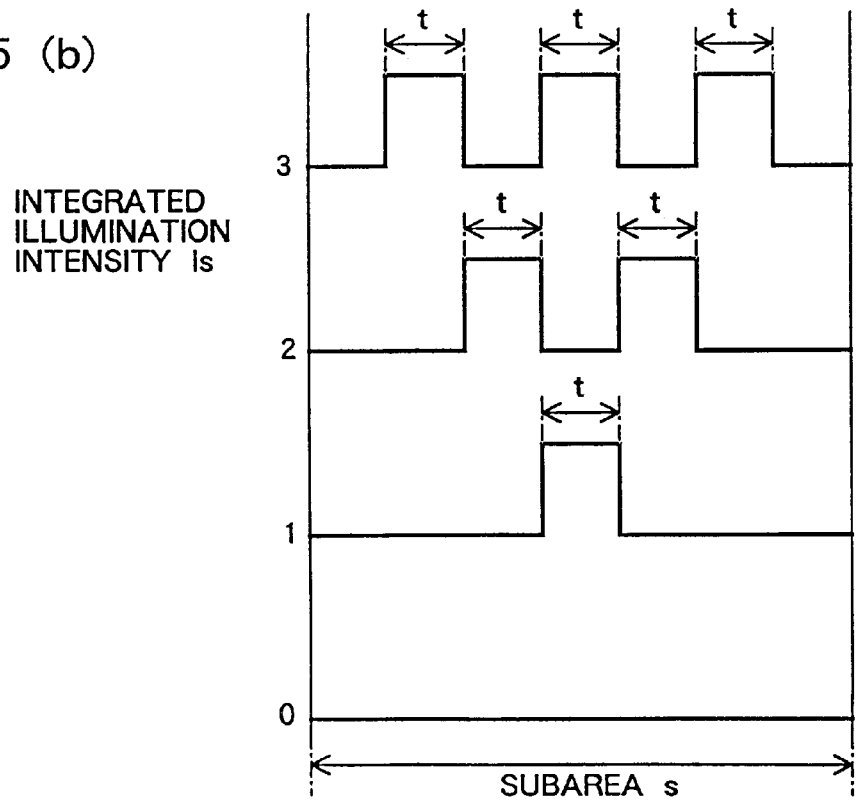

For measuring the shape of the object M to be measured by the phase shift method, a distribution of illuminance of the illuminating light beam must be shaped like a sine wave. The CCD camera 21 outputs, as the image information, the value (integrated value) obtained by integrating an intensity of illumination of the light beam illuminating an area estimated by each pixel during the pickup period. This fact is used. That is, as shown in FIG. 5(a), the slit light beam from the laser light source 2 (where the lens system is omitted in the drawing) is scanned by the polygon mirror 5, so that the reference plane L is illuminated with the slit light beam. At this time, the image information outputted from a certain pixel p (not shown) of the CCD camera 21 corresponds to an integrated illumination intensity Is which is obtained by integrating the intensity of illumination over the pickup period in a subarea s on the reference plane L estimated by this pixel p. As can be easily understood, the stripe pattern, which is obtained by switching on/off the slit light beam in accordance with a predetermined code while scanning/deflecting the slit light beam as described above, also has the stripe-patterned distribution (distribution of integrated illumination intensity) which is obtained by integrating the intensity of illumination during the time period in which the CCD camera 21 picks up one field.

By an approach as described below, the integrated illumination intensity Is is changed in the subarea s on the reference plane L estimated by a certain pixel p of the CCD camera 21.

A first approach is to control how long the slit light beam is actually switched on while scanning the subarea s within the time period in which the slit light beam scans the subarea s from the right to the left as illustrated by an arrow in the drawing, as shown in FIG. 5(a). More particularly, by increasing/decreasing the number of pulse lighting (three in FIG. 5(a)) which is switched on for a constant time t within the time period in which the subarea s is scanned by the slit light beam, the lighting time is controlled. According to this approach, as shown in FIG. 5(b), as the number of pulse lighting for the lighting time t is increased to 1, 2 and 3, the integrated illumination intensity Is is also increased in proportion to the increase in the number of pulse lighting. Therefore, the number of pulse lighting for the lighting time t can be m at maximum within the time period in which the subarea s is scanned by the slit light beam, whereby the integrated illumination intensity Is can be changed at (m+1) steps (four steps in this embodiment).

Figure 6:
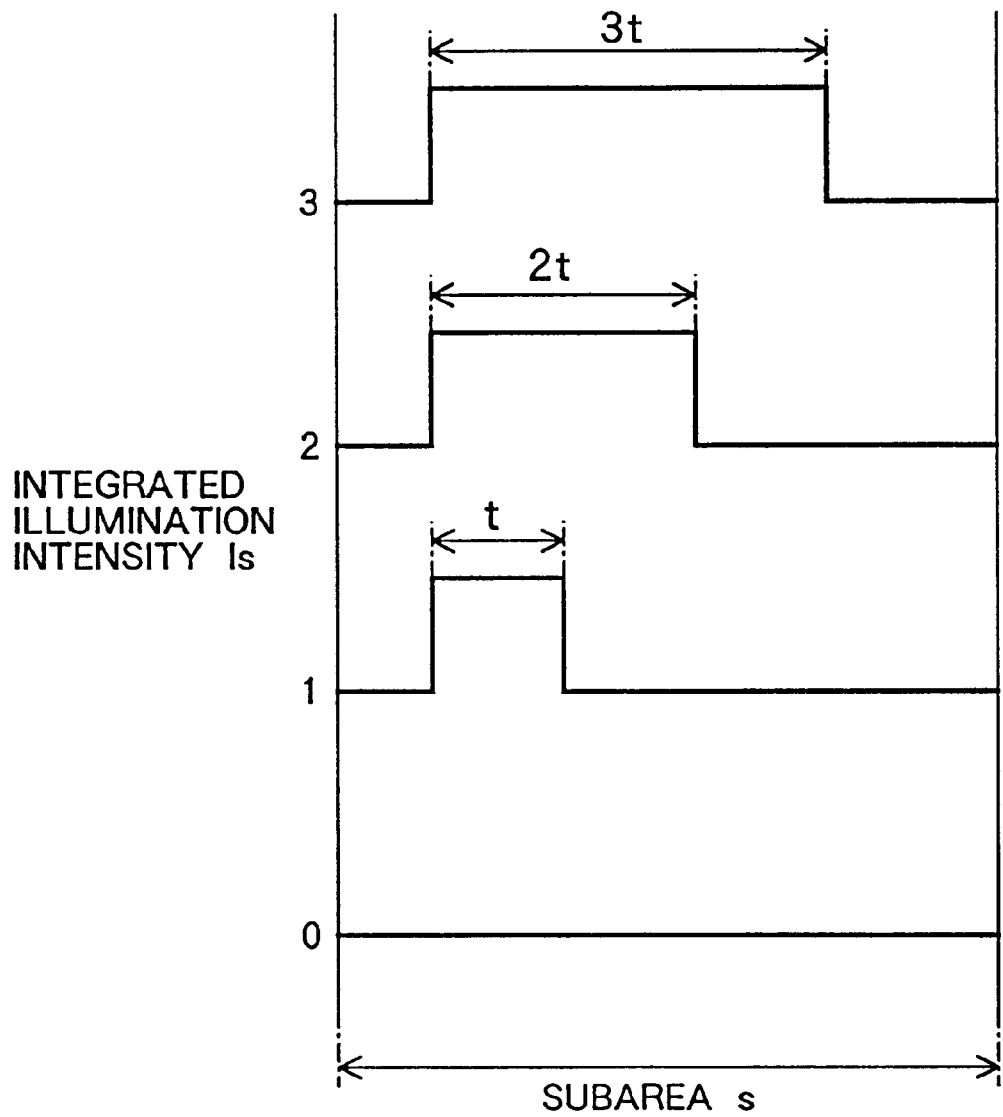
FIG. 6 shows a variant of the first approach to change integrated illumination intensity.

Alternatively, as shown in FIG. 6, the integrated illumination intensity Is may be controlled by the use of PWM (pulse width modulation) which controls the continuously lighting time so that it may be t, 2t and 3t.

Figure 7:
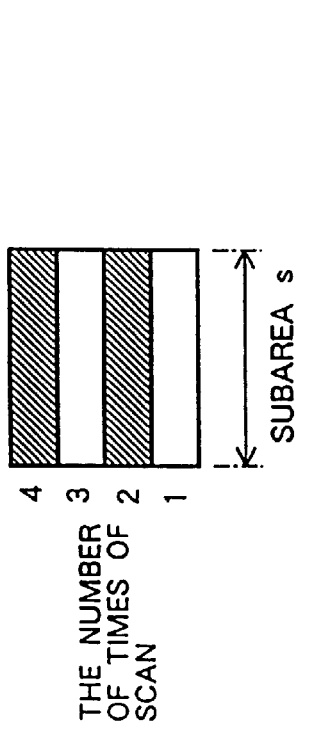
FIG. 7 shows the second approach to change integrated illumination intensity.
Figure 7:
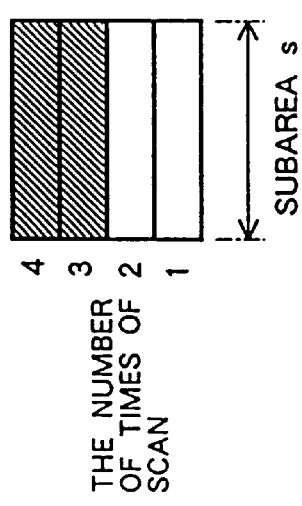
Figure 7:
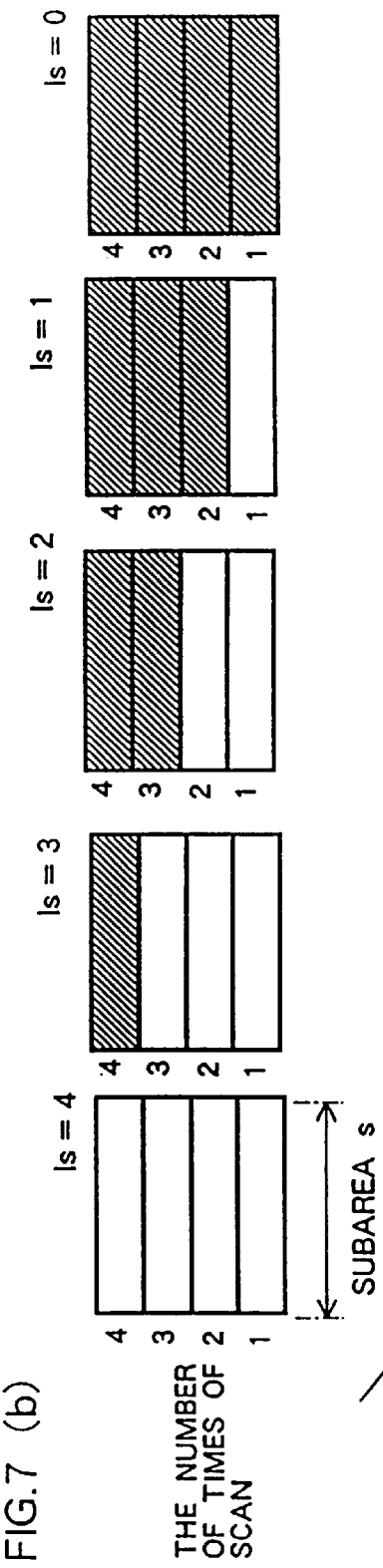

A second approach is to set the number of times the slit light beam scans the subarea s to plural times and to control the number of times the slit light beam is actually switched on while scanning the subarea s in these plural scans. More particularly, the polygon mirror is rotated so that the subarea s may be scanned plural times (four times in FIG. 7). The slit light beam is actually switched on and scans the subarea s at the time of the first and second scans of the four scans. The slit light beam is switched off and scans the subarea s at the time of the third and fourth scans. This is shown in FIG. 7(a), that is, white portions represent the switched-on slit light beam and hatched portions represent the switched-off slit light beam. Therefore, if n scans are performed, the number of times the slit light beam is switched on while scanning the subarea s in these n scans is changed. This change allows the integrated illumination intensity Is to be changed at (n+1) steps (five steps in FIG. 7(b)). In the case of the combination of on and off (Is=1, 2, 3 in FIG. 7(b)), the slit light beam does not have to be always switched on required times continuously from the first scan unlike FIG. 7(b). For example, as shown in FIG. 7(c), the slit light beam is switched on and scans the subarea at the time of the first and third scans, namely, totally twice. Therefore, when the slit light beam is switched on in plural scans may be appropriately selected.

When the slit light beam is switched on while scanning the subarea, the slit light beam does not have to be switched on all over the time period in which the subarea s is scanned by the slit light beam. That is, in the same manner as the first approach, the subarea may be illuminated with a predetermined number of pulse lighting for the lighting time t in one scan.

Furthermore, the combination of the first and second approaches may be used as a third approach. That is, the third approach is to set the number of times the slit light beam scans the subarea s to plural times and to control how long and how may times the slit light beam is actually switched on while scanning the subarea s in these plural scans. More particularly, the polygon mirror is rotated so that the subarea s may be scanned plural times (four times in FIG. 8). Then, by increasing/decreasing the number of pulse (five in FIG. 8) which is switched on for the constant time t within the time period in which the subarea s is scanned once by the slit light beam, the lighting time is controlled. The number of times the slit light beam is actually switched on and scans the subarea s in plural scans is also controlled.

Figure 8:
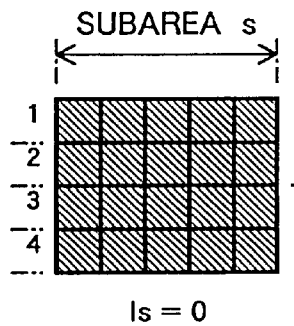
FIG. 8 shows the third approach to change integrated illumination intensity.
Figure 8:
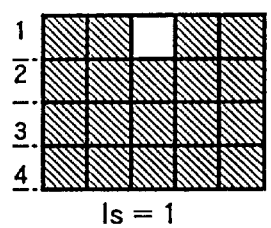
Figure 8:
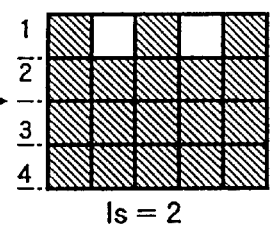
Figure 8:
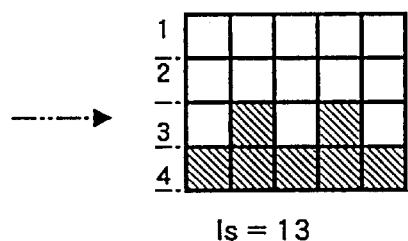
Figure 8:
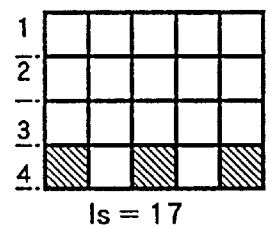
Figure 8:
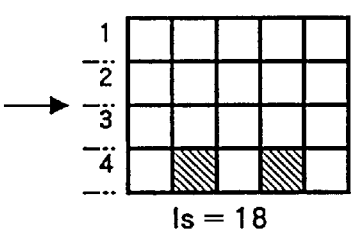
Figure 8:
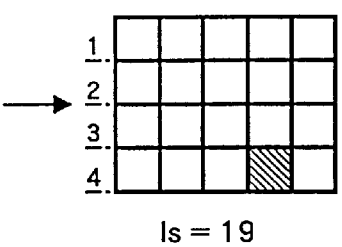
Figure 8:
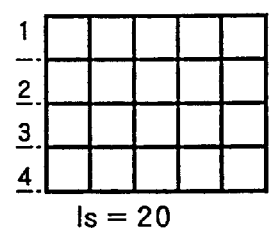
Figure 8:
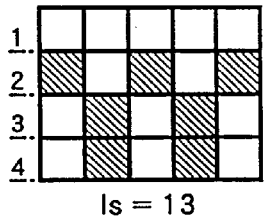

This will be described by using an example shown in FIG. 8. In the first place, the polygon mirror is adjusted so that four scans may be performed within the time period for picking up one field. The subarea s is illuminated with, at maximum, five pulses for the lighting time t within the time period in which the subarea s is scanned once by the slit light beam. In the first scan, the slit light beam is switched on while scanning the subarea s. In this scan, the subarea s is twice illuminated with the pulse lighting for the lighting time t. On the other hand, in the remaining second, third and fourth scans, the slit light beam is not switched on. This situation is shown in FIG. 8(c). The integrated illumination intensity Is can be set to Is=2. In this drawing, the hatched portions represent the switched-off slit light beam and the white portions represent the switched-on slit light beam. Similarly, in the first and second scans, the subarea s is five times illuminated with the pulse lighting. In the third scan, the subarea s is three times illuminated with the pulse lighting. In the fourth scan, the slit light beam is switched off. This situation is shown in FIG. 8(d). The integrated illumination intensity Is can be set to Is=13.

In such a manner, the integrated illumination intensity Is can be changed at 21 steps, namely, Is=0 to 20 (see FIG. 8(a)–8(h)). In general, the subarea s can be illuminated with the pulse lighting m times at maximum in one scan. If the subarea s is scanned n times within the time period for picking up one field, the integrated illumination intensity Is can be changed at (m×n+1) steps. The allocation of the number of times of pulse lighting in each scan is not particularly limited. For example, in order to set Is=13 in the same manner as shown in FIG. 8(d), the subarea s may be illuminated with the pulse lighting five times, twice, three times and three times in the respective scans, namely, totally thirteen times, as shown in FIG. 8(i). That is, the adjustment is sufficient as long as it is carried out so that the number of times of pulse lighting may be a predetermined number of times.

In the above description, the number of pulse lighting is used so as to adjust the time in which the subarea is illuminated with and scanned by the slit light beam, and this adjustment is combined with the number of times of scans. However, PWM may be used so as to adjust the pulse lighting time in the same manner as the first approach and this adjustment may be combined with the number of times of scans.

By any one of the above-described approaches, the integrated illumination intensity Is can be changed. By the third approach of these approaches, the integrated illumination intensity Is is distributed like the sine wave. In this embodiment, the subarea is illuminated with the pulse lighting four times at maximum in one scan and that the subarea is scanned six times during the time period for picking up one field. Thus, the integrated illumination intensity Is can be changed at 25 (=4×6+1) steps.

Figure 9:
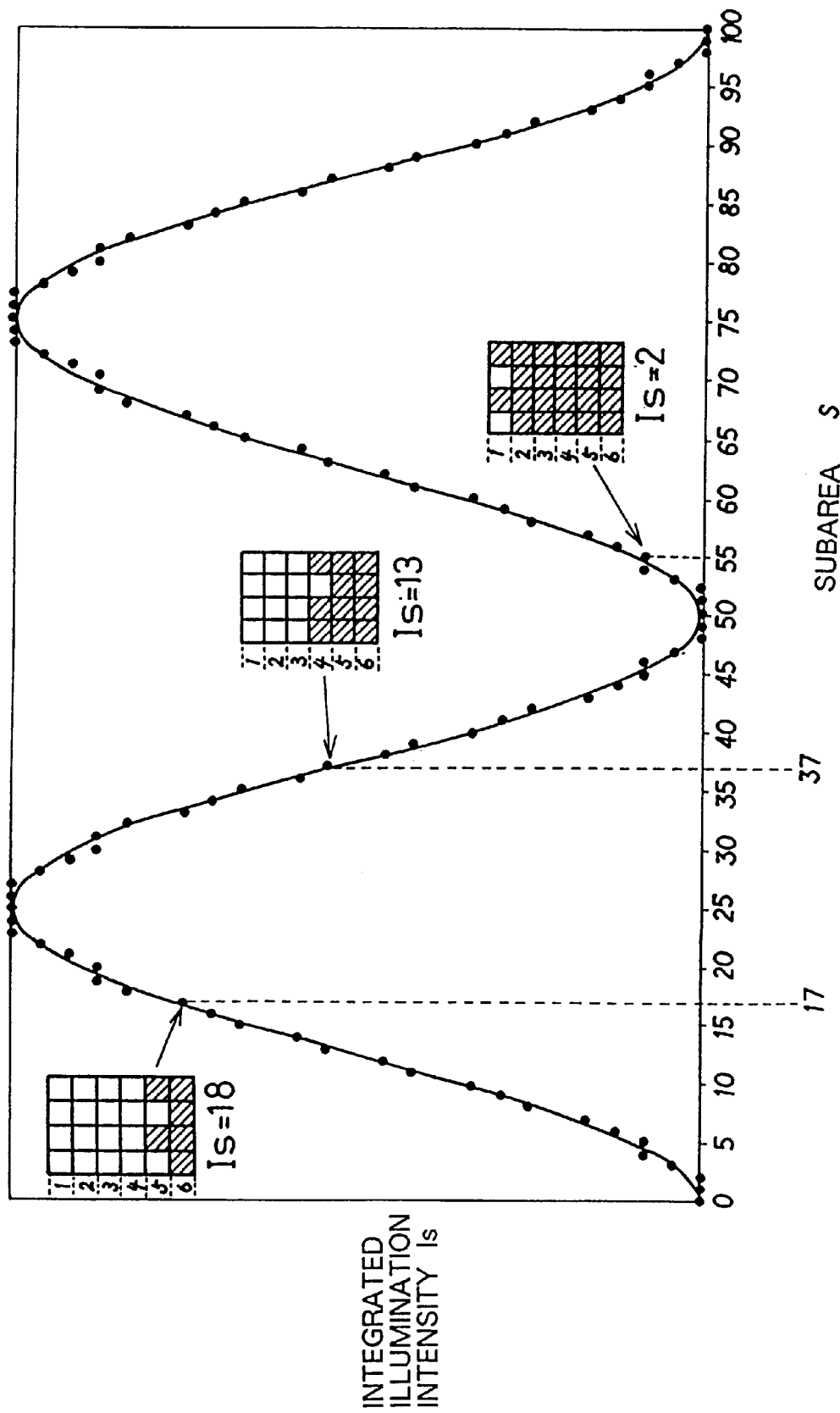
FIG. 9 shows an example of distribution of integrated illumination intensity with sine-wave like pattern which is obtained by the third approach.

The distribution of integrated illumination intensity having two wavelengths (two cycles) of the sine-wave like pattern is given to 101 subareas s arranged in the scanning direction on the reference plane L. In this case, the integrated illumination intensity Is corresponding to each subarea s is changed as shown in FIG. 9. In FIG. 9, a horizontal axis represents the number given to the subarea s, and a vertical axis represents the integrated illumination intensity Is. A solid line shows the ideal shape of the sine wave. Dots show the values of the integrated illumination intensity which the subareas s should be illuminated with in order that the distribution approximates closely to the ideal sine-wave like shape. As regards the subareas s having numbers 17, 37 and 55, there are illustrated the integrated illumination intensity Is which the subareas s should be illuminated with and the way to adjust the slit light beam for obtaining the intensity Is by the third approach. That is, for example, in the subarea having number 17, the integrated illumination intensity Is needs to be Is=18 in order that the distribution approximates closely to the sine wave. For this purpose, the subarea is illuminated with the pulse lighting four times each in the first through fourth scans. The subarea is also illuminated with the pulse lighting twice in the fifth scan. The slit light beam is switched off in the sixth scan.

Of course, the integrated illumination intensity Is can take only 0 or positive values. For this reason, the integrated illumination intensity Is is not exactly the sine wave but is distributed closely to the waveform which is obtained by offsetting the sine wave by at least its amplitude in the positive direction.

The control data for the above-described control is stored in the phase-shifting light beam control data memory 15. This control data is read by the laser controller 13, whereby the laser light source 2 is controlled. Also, the phase-shifting light beam control data memory 15 stores four types of data which control the sine wave so that the phases of the sine wave may differ by ¼ cycle (phase angle $\theta=0$, $\pi/2$, $\pi$, $3\pi/2$). Any one of these data is read by the laser controller 13. The number of scans is controlled by controlling the number of rotation of the polygon mirror 5 by the synchronous circuit 71.

In this embodiment, as described below, in order to easily combine the rough shape of the object M to be measured determined by the space coding method and the precise shape of the object M to be measured determined by the phase shift method, 256 subspaces SS formed by the light beam of the stripe pattern are adapted so as to coincide with one cycle of the light beam of the sine-wave like pattern.

More specifically, it is assumed that four sine-wave like patterns shifted by ¼ cycle are represented by $Is_0=\cos\theta$, $Is_1=\cos(\theta+\pi/2)$, $Is_2=\cos(\theta+\pi)$ and $Is_3=\cos(\theta+3\pi/2)$. In this case, the relationship between the phases of the sine-wave like patterns and the subspaces by the space coding method is determined so that the borders between the subspaces SS may be located at the positions of $\theta=\pi$, $3\pi$, $5\pi$, $7\pi$, . . . .

Thus, as described below, by the phase shift method, a phase $\theta_M$ on the measuring point of the object M to be measured determined by equation (2) is determined in the range of $-\pi \leq \theta_M \leq \pi$. As described above, if the phase $\theta_M$ on the measuring point of the object M to be measured is actually within the range of $\pi \leq \theta_M \leq 3\pi$ or $3\pi \leq \theta_M \leq 5\pi$, . . . , the amounts of $\pi$, $3\pi$, $5\pi$, . . . are ignored in the calculation of the phase by the phase shift method. However, the subspace SS to which one space code number is given corresponds to one cycle of the sine-wave like pattern. Therefore, for example, if $\pi \leq \theta_M \leq 3\pi$, the space code number is shifted by 1. Similarly, if $3\pi \leq \theta_M \leq 5\pi$, the space code number is shifted by 2. From this fact, the above-mentioned relationship is set whereby a part of the phase $\theta_M$ ignored due to the cyclicity of the sine wave is equivalent to the value of the rough shape determined by the space coding method.

In this manner, the slit light beam is scanned while the slit light beam is switched on/off so that the distribution of integrated illumination intensity is shaped like the sine wave. Thereby, the optical image of a gradated fringe pattern is formed on the surface of the object M to be measured by the integration over the time period for picking up one field. The height of the portions of the object M to be measured is observed as the phase shift of the gradated fringe pattern (the amount of phase shift (the amount of phase modulation)). Four types of optical images in accordance with the above four types of data are picked up, whereby the phase of the light beam illuminating the portions can be calculated by the phase shift method described below. The shape (height) of the portions of the object M to be measured can be calculated by the principle of triangulation described below.

In the same manner as the measurement by the space coding method, these optical images are picked up by the CCD camera 21 (having 512×240 pixels) from the position substantially just above the object M to be measured in the drawing. The output from the CCD camera 21, namely, the image information is stored in the image memory 22. The image information from the CCD camera 21 is the data whose lightness is represented by the 8-bit tone for each pixel. ($2^8=256$ tones)

In the same manner as the measurement by the space coding method, the laser controller 13, the polygon mirror 5 and the pickup of the CCD camera 21 are synchronously operated by the instruction from the synchronous circuit 71. That is, the synchronous circuit 71 controls the pickup timing of the CCD camera, the number of rotation of the polygon mirror 5 and the angles of mirror surfaces so that the object M to be measured may be scanned one or plural predetermined times (six times in this embodiment) by the slit light beam during the time period (1/60 sec) in which the CCD camera 21 picks up one field. Moreover, these timings are synchronized to the timing at which the laser controller 13 controls the laser light source 2 so that the object M to be measured may be illuminated with the light beam of a predetermined pattern in accordance with the data in the phase-shifting light beam control data memory 15.

Next, as described above, the selector 72 instructs the phase-shifted image information capturing memory 51 to capture the image information stored in the image memory 22. The image information, which is picked up when the laser controller 13 controls the laser light source 2 in accordance with the data in the phase-shifting light beam control data memory 15, is thus captured in the phase-shifted image information capturing memory 51.

In the phase-shifted image information capturing memory 51, as shown in detail in FIG. 3, the image information captured from the image memory 22 is stored in any one (for example, 54a) of the phase-shifted image information memories 54a–54d.

Next, the selector 72 instructs the laser controller 13 to read, from the phase-shifting light beam control data memory 15, the control data which is not used in the previous pickup (has a different phase). In accordance with this control data, the laser light source 2 is switched on/off in the same manner as described above. Subsequently, the optical image of the object M to be measured formed by the light beam of the sine-wave like pattern having different phases in accordance with this control data is picked up. The image information is stored in any one (for example, 54b) of the phase-shifted image information memories 54a–54d in which the phase-shifted image information is not yet stored.

This operation is carried out for four types of control data having the phases differing by ¼ cycle ($\pi/2$ in terms of the phase angle). It should be noted that the order of pickup does not need to be the order of the phase angle.

When the phase-shifted image information in accordance with each data is stored in the phase-shifted image information memories 54a–54d, the phase-shifted image information of four fields stored in these four phase-shifted image information memories 54a–54d is read in the phase-shifting operating circuit 52. Then, the shape (precise shape) of the object M to be measured is calculated in accordance with the known phase shift method and the principle of triangulation (described below). The calculated precise shape data is stored in the precise shape data memory 53.

In the above description, the rough shape is previously measured by the space coding method, and then the precise shape is measured by the phase shift method. However, the measurements may be carried out in the opposite order to the above-described example. Furthermore, it is not necessary to simultaneously pick up eight fields by illuminating the object with the light beam of the stripe pattern and pick up four fields by illuminating the object with the light beam of the sine-wave like pattern. Total twelve fields can be picked up in an optional order.

Next, the combination of the rough shape data and the precise shape data will be described. The rough shape data is calculated by the space-coding operating circuit 42 and stored in the rough shape data memory 43, as described above. The precise shape data is calculated by the phase-shifting operating circuit 52 and stored in the precise shape data memory 53, as described above. The rough and precise shape data are captured and processed by the shape combining circuit 61 of the shape combining/operating means 60. FIG. 10 illustrates the combination performed by the shape combining circuit 61. As shown in FIG. 10(*a*), rough shape data D1 is obtained by measuring the generally triangular object M to be measured shown by a dotted line. The rough shape data D1 is the quantized step-shaped data for the following reason. This is, when the measurement is performed by the space coding method, the height of the portions is calculated by the space code number given to the space which the portions of the object M to be measured belong to. In FIG. 10(*a*), the left and right hems (ends) are set to a reference position O of 0 in height, because the object M to be measured does not exist on the left and right hems and the reference plane L is thus measured.

On the other hand, as shown in FIG. 10(*b*), precise shape data D2 is obtained by measuring the same object M to be measured. The precise shape data D2 is the saw-teeth-shaped data for the following reason. That is, when the measurement is performed by the phase shift method, $2\pi$, $4\pi$, . . . of the amount of phase shift exceeding $2\pi$, $4\pi$, . . . is ignored due to the cyclicity of the sine wave, and then the height is calculated. In other words, in this embodiment, the phase is calculated in the range of $-\pi$ to $\pi$, and thus $\pi$, $3\pi$, $5\pi$, . . . of the shift exceeding $\pi$, $3\pi$, $5\pi$, . . . is ignored. In FIG. 10(*b*), the left and right ends are set to a reference position O' of 0 in height, because the reference plane L is measured on the left and right ends as in the case of FIG. 10(*a*). In this embodiment, the range of the phase angle $\theta$ measured by the phase shift method is set to $\theta=-\pi$ to $\pi$. Thus, the precise shape data D2 is the positive or negative height data about the reference position O'.

Next, these data D1 and D2 are added to each other so as to be combined with each other. At this time, the reference position O of the rough shape data D1 and the reference position O' of the precise shape data D2 are positioned at the same height. Since the data D1 and D2 are superimposed as shown in FIG. 10(*c*), the height data are added in each portion (each pixel) whereby height data DM of the object M to be measured from the reference plane L is obtained as shown in FIG. 10(*d*). As can be seen from FIG. 10(*d*), according to the shape measuring device of this embodiment, it is possible to measure even the high object M to be measured in the wide dynamic range at the high resolving power without shaping the data like the step. Moreover, the addition of the rough shape data D1 and the precise shape data D2 in each portion is sufficient to calculate the shape of the object M to be measured. Thus, the calculation of the shape of the object M to be measured is also easy.

The measurement of the height by the triangulation and the measurement of the height by the space coding method and the phase shift method will be briefly described. First, the principle of triangulation will be described with reference to FIG. 11. In this drawing, it is assumed that the upper surface of the object M to be measured placed on the reference plane L is set to the measuring point and that a height Z of the upper surface is measured. The light beam emitted from the laser light source 2 is reflected on a mirror surface 5*a* of the polygon mirror 5. The upper surface of the object M to be measured is illuminated with the reflected light beam. This light beam passes through an objective lens 27 of the CCD camera 21. The image is formed on a photo-detector 28. The image is picked up. An optical axis U of the CCD camera 21 is arranged so that it may be perpendicular to the reference plane L. hm denotes the height from the reference plane L to a scan center MR on the mirror surface 5*a*. $\alpha$ denotes the deflection angle from a reference point A. hc denotes the height from the reference plane L to the principal point of the objective lens 27 of the CCD camera 21. f denotes a focal length of the objective lens 27. m denotes the distance on the reference plane L from the reference point A to the optical axis U of the CCD camera 21. x denotes the position of the pixel detecting the light on the photo-detector 28 of the CCD camera 21 (the position of the pixel estimating the upper surface of the object M to be measured).

In this case, the height Z of the upper surface of the object M to be measured can be expressed by equation (1)

$$Z=\{x \cdot hc - f(m - hm \cdot \tan \alpha)\}/(x + f \cdot \tan \alpha) \qquad (1)$$

Figure 11:
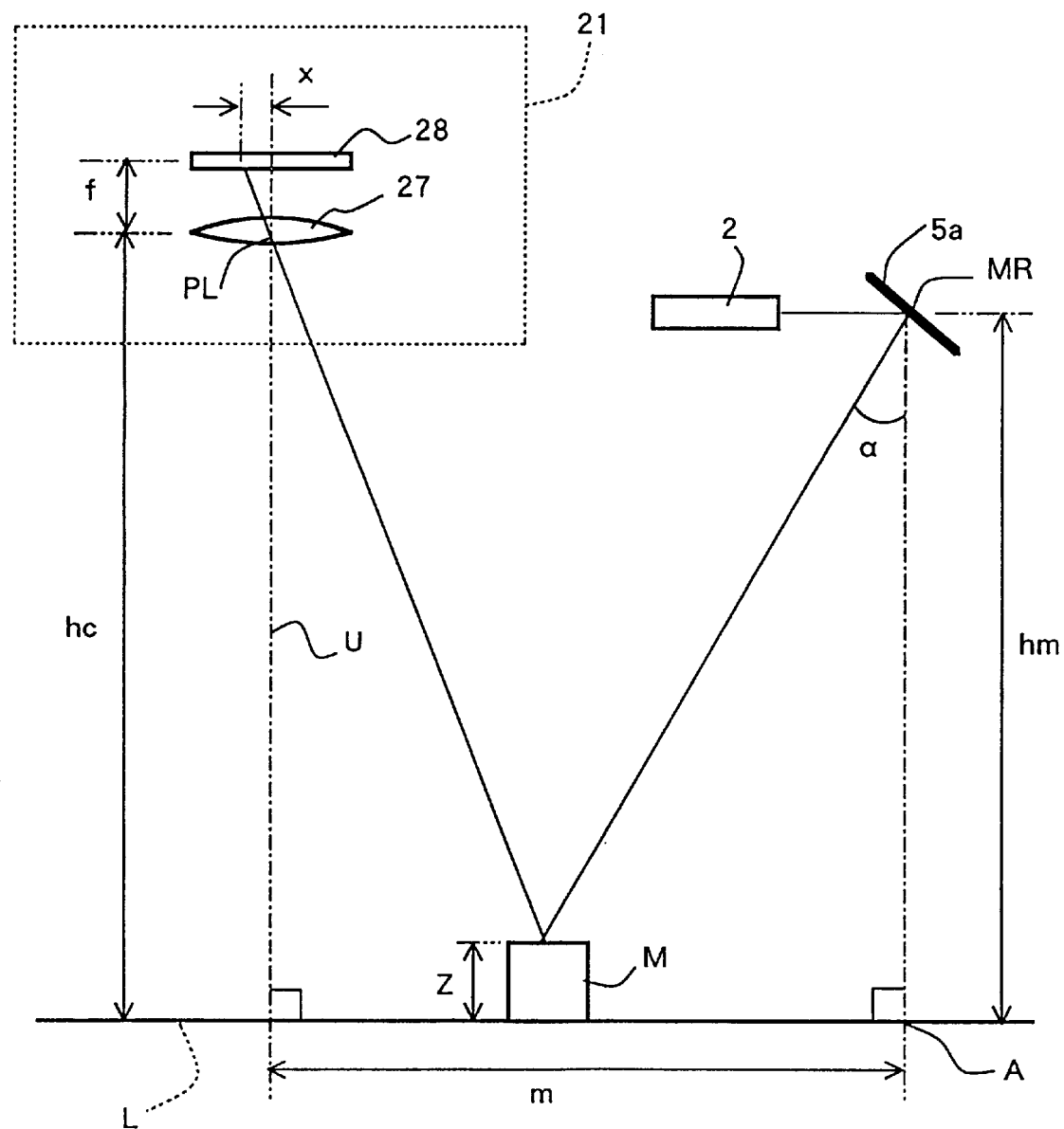
FIG. 11 shows height measurement by triangulation.

As can be seen from FIG. 11, hc, f, m and hm are fixed values independent of the object M to be measured. Therefore, if x and $\alpha$ are known, Z can be calculated from equation (1). Although a coordinate (position) in a y-direction (in the direction perpendicular to a sheet of FIG. 11) is not expressed in the above equation, this coordinate is deduced directly from the position of the pixel in the y-direction on the photo-detector 28 of the CCD camera 21. Thus, a three-dimensional measurement can be accomplished.

Next, the measurement of the height by the space coding method will be described.

Figure 12:
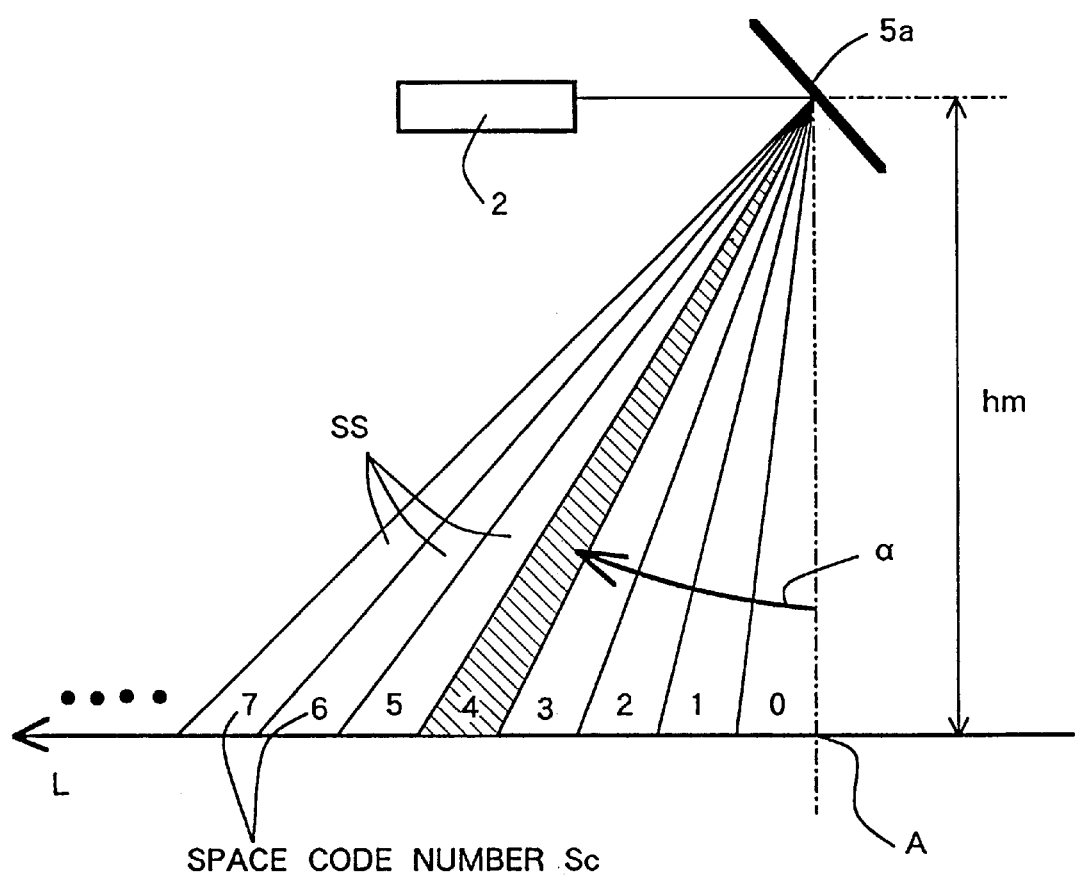
FIG. 12 shows the method for calculating a deflection angle by the space coding method.

According to the space coding method, as shown in FIG. 12, the space illuminated with the light beam can be finely divided into the subspaces SS which a series of space code numbers Sc are given to. That is, the space can be finely divided into the subspaces SS whose cross section is fan-shaped about the scan center on the mirror surface 5*a* of the polygon mirror 5 located at the height hm from the reference plane L. A series of space code numbers Sc=0, 1, 2, . . . can be given to the subspaces SS. The relationship between the space code numbers Sc and the deflection angle $\alpha$ of the subspaces SS having the given space codes can be calculated from the angle of the mirror surface 5*a*.

For example, when the upper surface of the object M to be measured is located in the space having the space code number Sc=4, the upper surface of the object M to be measured is illuminated with the light beam of the pattern unique to the space code number Sc=4. For example, consider the pickup of eight fields in accordance with the gray code shown in FIG. 4. If the fields are picked up in the order of the codes in the memory bits 0 to 7, the darkness and light appear in the order of darkness, light, light, darkness, darkness, darkness, darkness, darkness (0, 1, 1, 0, 0, 0, 0, 0) on the upper surface of the object M to be measured in each field (see a row edged by a thick line in FIG. 4). Conversely, the light and darkness on the upper surface of the object M to be measured is checked over the image information of eight fields, whereby it is possible to know, from the manner in which the light and darkness appear, the space code number Sc which the upper surface of the object M to be measured belongs to. It is therefore possible to know the deflection angle $\alpha$ as well. Moreover, since the position x of the pixel estimating the upper surface of the object M to be measured is clearly known, it is possible to calculate the height Z of the upper surface of the object M to be measured by the above equation (1).

Next, the measurement of the height by the phase shift method will be described.

In the measurement by the phase shift method, as described above, the object M to be measured is illuminated with the light beam so that the distribution of the integrated illumination intensity Is may be shaped like the sine wave.

Figure 13:
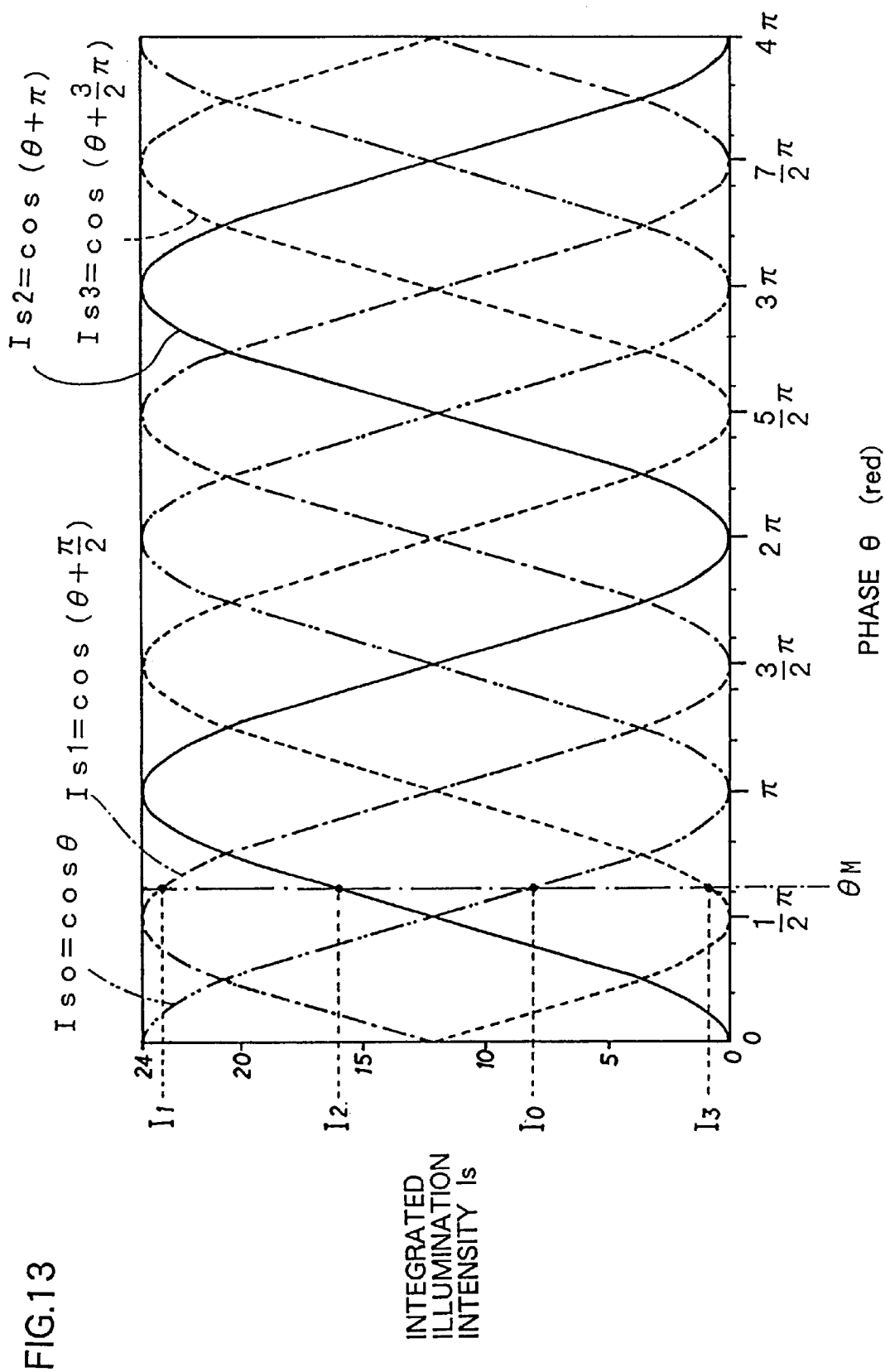
FIG. 13 shows the method for calculating a phase by phase shifting method.

Moreover, the object M to be measured is illuminated with four types of light beams having the distributions whose phases differ by ¼ cycle. This is shown in FIG. 13. That is, FIG. 13 shows the distribution of the integrated illumination intensity Is in the range of phase $\theta=0$ to $4\pi$. Here, four types of distributions can be expressed by $Is_0=\cos\theta$, $Is_1=\cos(\theta+\pi/2)$, $Is_2=\cos(\theta+\pi)$ and $Is_3=\cos(\theta+3\pi/2)$. Exactly, in consideration of an amplitude value 12 ($=24/2$) and an offset value 12, the four types of distributions are expressed by $Is_0=12(1+\cos\theta)$, $Is_1=12(1+\cos(\theta+\pi/2))$, $Is_2=12(1+\cos(\theta+\pi))$ and $Is_3=12(1+\cos(\theta+3\pi/2))$. However, as described below, the amplitude value and the offset value are canceled by equation (2). Therefore, even if these values are ignored and the distributions are expressed as described above, the same result is obtained. Thus, the distributions are expressed for short as described above.

The upper surface of the object M to be measured described in the principle of triangulation (see FIG. 11) is illuminated with the light beams having four types of distributions according to the phase shift method. As shown in FIG. 13, for example, when the upper surface of the object M to be measured is illuminated with the light beam having the distribution expressed by $Is_0=\cos\theta$, the integrated illumination intensity expressed by $I_0=\cos\theta_M$ is observed. Similarly, in the case of the light beam having the distribution expressed by $Is_1=\cos(\theta+\pi/2)$, the integrated illumination intensity expressed by $I_1=\cos(\theta_M+\pi/2)$ is observed.

The integrated illumination intensities expressed by $I_2=\cos(\theta_M+\pi)$ and $I_3=\cos(\theta_M+3\pi/2)$ are observed in the same manner. $\theta_M$ denotes the phase angle which is formed when the upper surface (measuring point) of the object M to be measured is illuminated with the light beam. Conversely, the lightness on the upper surface (measuring point) of the object M to be measured is checked over the image information of four fields, whereby it is possible to know, from the manner in which the lightness appears, the phase angle $\theta_M$ of the light beam which the upper surface of the object M to be measured is illuminated with. A particular method of calculating the phase angle EM is expressed by equation (2).

$$\theta_M=\arctan\{(I_3-I_1)/(I_0-I_2)\} \quad (2)$$

For determining the phase angle $\theta_M$ from the lightness, the object M to be measured is illuminated with the light beams having at least three types of distributions whose phases differ from one another. On the other hand, in this embodiment, the measurement is performed by the use of the light beams having four types of distributions differing by ¼ cycle. This is preferable, because the phase angle $\theta_M$ can be calculated by the above equation (2), excluding the difference of the reflectance and the influence of the externally scattered light due to a color tone or the like of the object M to be measured.

Furthermore, the relationship between the deflection angle $\alpha$ and the phase angle $\theta_M$ can be previously determined. Therefore, the phase angle $\theta_M$ can be calculated by the above-described approach, whereby the deflection angle $\alpha$ corresponding to this phase angle $\theta_M$ can be determined. Additionally, since the position x of the pixel estimating the upper surface of the object M to be measured is clearly known, it is possible to calculate the height Z of the upper surface of the object M to be measured by the above equation (1) in even the phase shift method.

In such a manner, the calculated shape data DM of the object M to be measured is then sent to an operating section 80 and a display section 90. In these sections, a post-processing is performed. For example, a peripheral length, a sectional shape, etc. of the object M to be measured are calculated, and the shape of the object M to be measured is displayed by a display (not shown).

In this manner, according to the shape measuring device 100 of this embodiment, two types of measurements by the space coding method and the phase shift method are performed, whereby it is possible to realize the shape measuring device having the wide measurable range (the wide dynamic range) and the high resolving power. Moreover, even if the shape (height) of the object M to be measured has a discontinuous portion (for example, a portion shaped like a steep wall), the height can be measured.

In this embodiment, the laser light source 2 is used as the light source 1 so as to shape and use the laser light beam from the laser light source 2. However, the light beam from a typical light source may be shaped and used without the use of the laser light source. Although the polygon mirror 5 is used as the light beam scanning means 4, other deflecting devices such as the galvanometer mirror may be used. The number of surfaces of the polygon mirror 5 may be also appropriately selected in consideration of the number of rotation, the scanning range, the number of scans or the like. Although the shape of the object M to be measured placed on the reference plane L is measured in this embodiment, it is not necessary to pick up the reference plane L in the measurement. Furthermore, the reference plane L may be eliminated and the height from a virtual reference plane may be measured.

The calculation of the height Z in accordance with equation (1) on the basis of the principle of triangulation is common to the calculation of the rough shape by the space coding method and the calculation of the precise shape by the phase shift method. The operation common to the space-coding shape operating means 40 and the phase-shifting shape operating means 50, more particularly, the space-coding operating circuit 42 and the phase-shifting operating circuit 52 may be therefore performed by the common operating circuit.

For calculating the height z by the above equation (1), it is necessary to calculate tan $\alpha$ from $\alpha$. Thus, the calculation is troublesome and takes a long time. In the calculation of the rough shape by the space coding method, the space code number Sc which the surface of the object M to be measured estimated by a certain pixel belongs to is determined, the deflection angle $\alpha$ is determined from this space code number Sc, and then the height Z is determined. Accordingly, the value of the height Z is previously determined when a certain space code number is observed by a certain pixel, whereby the height Z is easily calculated. The following operation may be therefore performed. That is, the height Z, which is obtained when the space code numbers Sc (256 numbers in this embodiment) are observed by the pixels (512×240 pixels in this embodiment), is previously held as a height data table, whereby the troublesome calculation is omitted and the rough shape is calculated.

In the measurement of the precise shape by the phase shift method, the calculation of arctan is required for the calculation of equation (2). Preferably, a phase angle data table is previously held so that the value of the phase angle $\theta_M$ can be retrieved from the value of $(I_3-I_1)/(I_0-I_2)$. In the calculation of the precise shape by the phase shift method, the phase angle $\theta_M$ of the surface of the object M to be measured estimated by a certain pixel is determined, the deflection angle $\alpha$ is determined from this phase angle $\theta_M$, and then the height Z is determined. Accordingly, the value of the height Z is previously determined when a certain phase angle $\theta_M$ is observed by a certain pixel, whereby the height Z is easily calculated. It should be noted that the phase angle $\theta_M$ needs to be divided into appropriately spaced parts because the phase angle $\theta_M$ is a continuous value unlike the above-described space code number Sc. Thus, the following operation may be performed. That is, the height Z, which is obtained when the phase angles $\theta_M$ divided into the finite number of parts are observed by the pixels (512×240 pixels in this embodiment), is previously held as the height data table, whereby the troublesome calculation is omitted and the precise shape is calculated.

Embodiment 2

Next, a second embodiment of the present invention will be described in connection with the accompanying drawings.

In the first embodiment, the central angles of the subspaces SS having the generally fan-shaped cross sections formed by the space coding method are equal to one another, and these subspaces SS correspond to one cycle of the sine-wave like pattern. Therefore, the subspaces illuminated with one cycle of the sine-wave like pattern also have the equal angle. The rough shape and the precise shape of the object M to be measured are determined from the determined space code number Sc and the calculated phase angle $\theta_M$, respectively. These rough and precise shapes are then combined with (added to) each other, whereby the shape of the object M to be measured is determined.

On the other hand, the second embodiment is different from the first embodiment in the following point. That is, although the subspace having the given space code number is related to the subspace formed by one cycle of the sine-wave like pattern in the same manner, the subspaces have an equal width on the reference plane belonging to (included in) the subspaces. Therefore, the central angle is not equal, and the width of one cycle of the sine-wave like pattern which the reference plane is illuminated with is equal in any portion on the reference plane. Moreover, the height hm from the reference plane to the center of illumination MR of the light beam is equal to the height hc from the reference plane to a principal point PL of the objective lens of the CCD camera. The second embodiment is also different from the first embodiment in the following point. That is, the rough phase equivalent to the phase determined from the determined space code number by the phase shift method is determined, and then this rough phase is added to the calculated precise phase so as to obtain the combined phase, whereby the shape of the object M to be measured is determined from the combined phase.

However, since the second embodiment is the same as the first embodiment in other points, the description of the same points is omitted and the above-described differences will be described.

First, a shape measuring device 200 according to this embodiment will be described in connection with FIG. 14. The shape measuring device 200 has substantially the same constitution as the shape measuring device 100 of the first embodiment. That is, the shape measuring device 200 has light beam illuminating means 210, the pickup means 20, image information operating means 230 and a control section 270.

As described below, the light beam illuminating means 210 illuminates the object with the light beam so that the subspaces formed by the light beam and the space illuminated with the one cycle of the sine-wave like pattern may have the equal width on the reference plane L. Therefore, the shape measuring device 200 is different from the shape measuring device 100 of the first embodiment in space-coding light beam controlling means 211 and phase-shifting light beam controlling means 214 for controlling the slit light beam.

The space-coding light beam controlling means 211 includes a space-coding light beam control data memory 212 (an S-type data memory shown in FIG. 14) and a laser controller 213. The phase-shifting light beam controlling means 214 includes the laser controller 213 and a phase-shifting light beam control data memory 215 (a P-type data memory shown in the drawing).

The pickup means 20 comprises the CCD camera 21 and the image memory 22 in the same manner as the shape measuring device 100.

The image information operating means 230 has space-coding phase operating means 240 for calculating a rough phase $\theta r$ of the object M to be measured; phase-shifting phase operating means 250 for calculating a precise phase $\theta p$ of the object M to be measured; and combined phase/shape operating means 260 for combining the rough and precise phases and for calculating the shape of the object M to be measured.

In greater detail, the space-coding phase operating means 240 includes a space-coded image information capturing circuit 241 (an S-type capturing circuit shown in the drawing) for capturing the image information from the pickup means 20, for converting the captured image information into the light/darkness binary image information for each pixel, and then for storing the binary image information; a rough phase operating circuit 242 for knowing the space code number Sc from the binary image information by the space coding method and for calculating the rough phase $\theta r$ of the object M to be measured for each pixel; and a rough phase data memory 243 (a rough phase memory shown in the drawing) for storing the calculated rough phase data.

Figure 15:
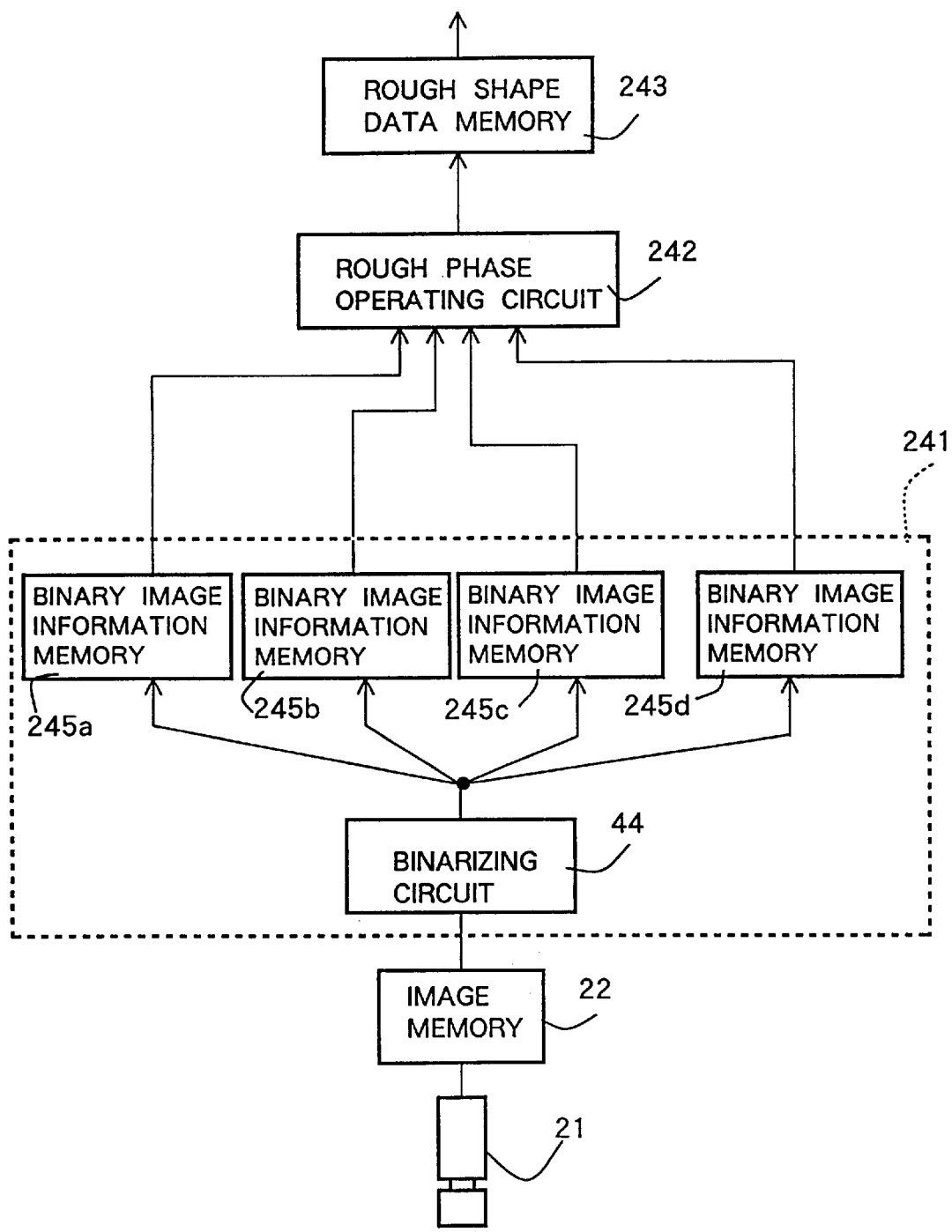
FIG. 15 shows details of a space-coded image information capturing circuit according to Embodiment 2.

As shown in detail in FIG. 15, the space-coded image information capturing circuit 241 has the binarizing circuit 44 and four binary image information memories 245a–245d (binary image memories shown in the drawing). The lightness image information of each pixel is captured from the image memory 22 and has the 8-bit tone, for example. This lightness image information is first converted into the light/darkness binary information for each pixel by the binarizing circuit 44. Then, the light/darkness binary information is stored in any one of the binary image information memories 245a–245d.

The phase-shifting phase operating means 250 includes the phase-shifted image information capturing memory 51 (the P-type capturing memory shown in the drawing) for capturing and storing the image information from the pickup means 20; a precise phase operating circuit 252 for calculating the precise phase $\theta p$ of the object M to be measured for each pixel from the lightness value of the image information by the phase shift method; and a precise phase data memory 253 (a precise phase memory shown in the drawing) for storing the calculated precise phase data.

Figure 16:
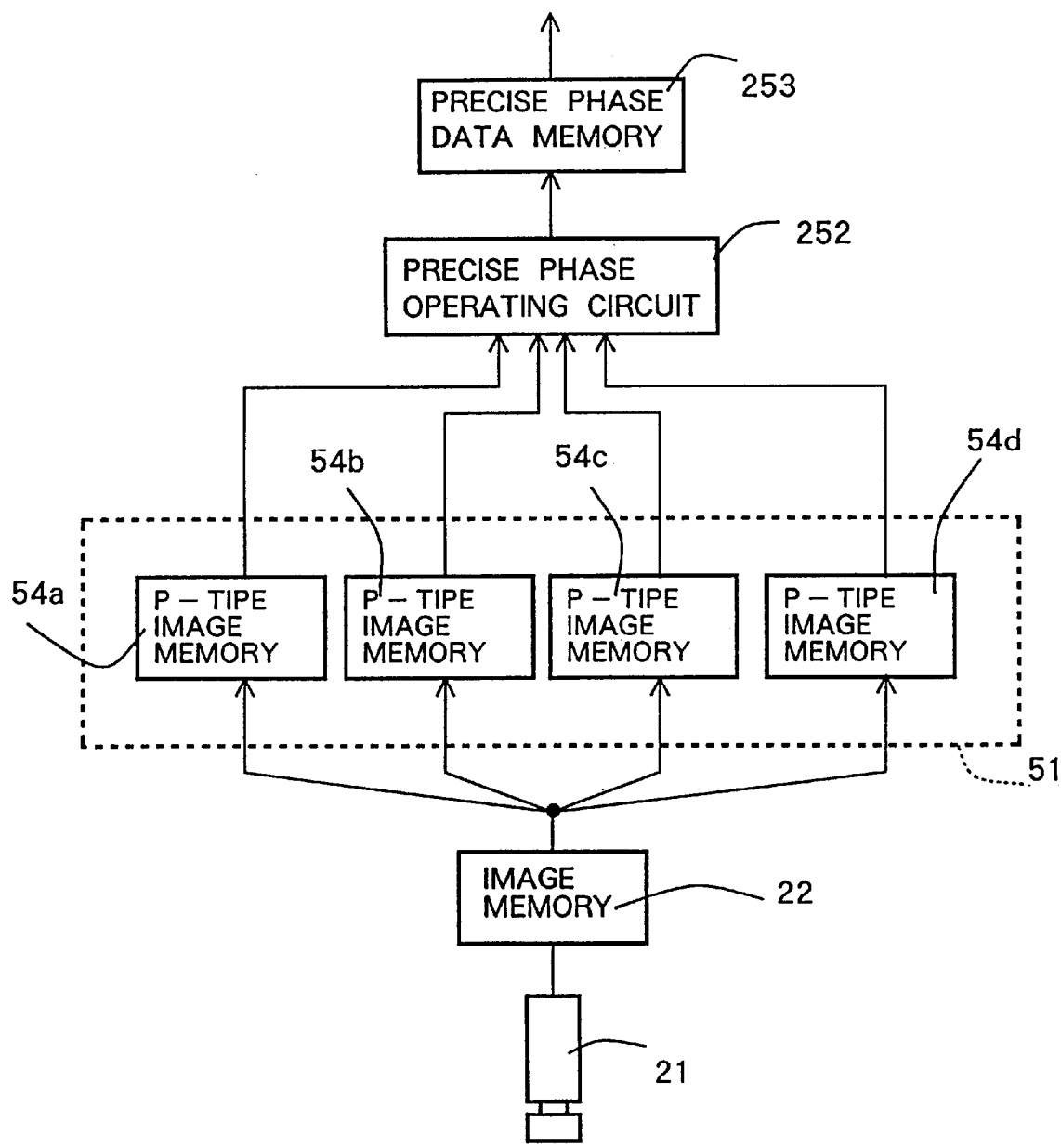
FIG. 16 shows details of a phase-shifted image information capturing memory according to Embodiment 2.

As shown in FIG. 16, the phase-shifted image information capturing memory 51 includes the four phase-shifted image information memories 54a–54d (the P-type image memories shown in the drawing) in the same manner as the first embodiment. The lightness image information of each pixel, which is captured from the image memory 22 and has the 8-bit tone for example, is stored in any one of the phase-shifted image information memories 54a–54d.

The combined phase/shape operating means 260 includes a phase combining circuit 261 for combining the rough phase data and the precise phase data for each pixel and determining a combined phase $\theta c$; and a phase operating circuit 262 for operating the shape of the object M to be measured from this combined phase $\theta c$.

The control section 270 includes a synchronous circuit 271 and the selector 72. The synchronous circuit 271 adjusts the pickup timing or the like among the polygon mirror 5, the laser controller 213 and the CCD camera 21. The selector 72 switches the measurement between the measurement by the space coding method and the measurement by the phase shift method.

In the measurement by the space coding method, the selector 72 selects (switches) the code which the laser controller 213 reads from the space-coding light beam control data memory 212. The selector 72 also selects which memory of the binary image information memories 245a–245d stores the image information captured and binarized by the space-coded image information capturing circuit 241.

Similarly, in the measurement by the phase shift method, the selector 72 selects (switches) the control data which the laser controller 213 reads from the phase-shifting light beam control data memory 215. The selector 72 also selects which memory of the phase-shifted image information memories 54a–54d stores the image information captured by the phase-shifting shape operating means 50.

The relationship between the space code number Sc and the phase will be described. In this embodiment, in the same manner as the first embodiment, the subspace SS which one space code number Sc is given to coincides with the subspace illuminated with the light beam of 1 cycle of the sine-wave like pattern. The relationship between the phase of the sine-wave like pattern and the subspace SS formed by the space coding method is selected in the follows manner. That is, assuming that one of four types of sine-wave like patterns is expressed as $IS_0 = \cos\theta$, borders SSW between the subspaces SS are located at the positions of $\theta = 0, 2\pi, 4\pi, \ldots$.

Figure 17:
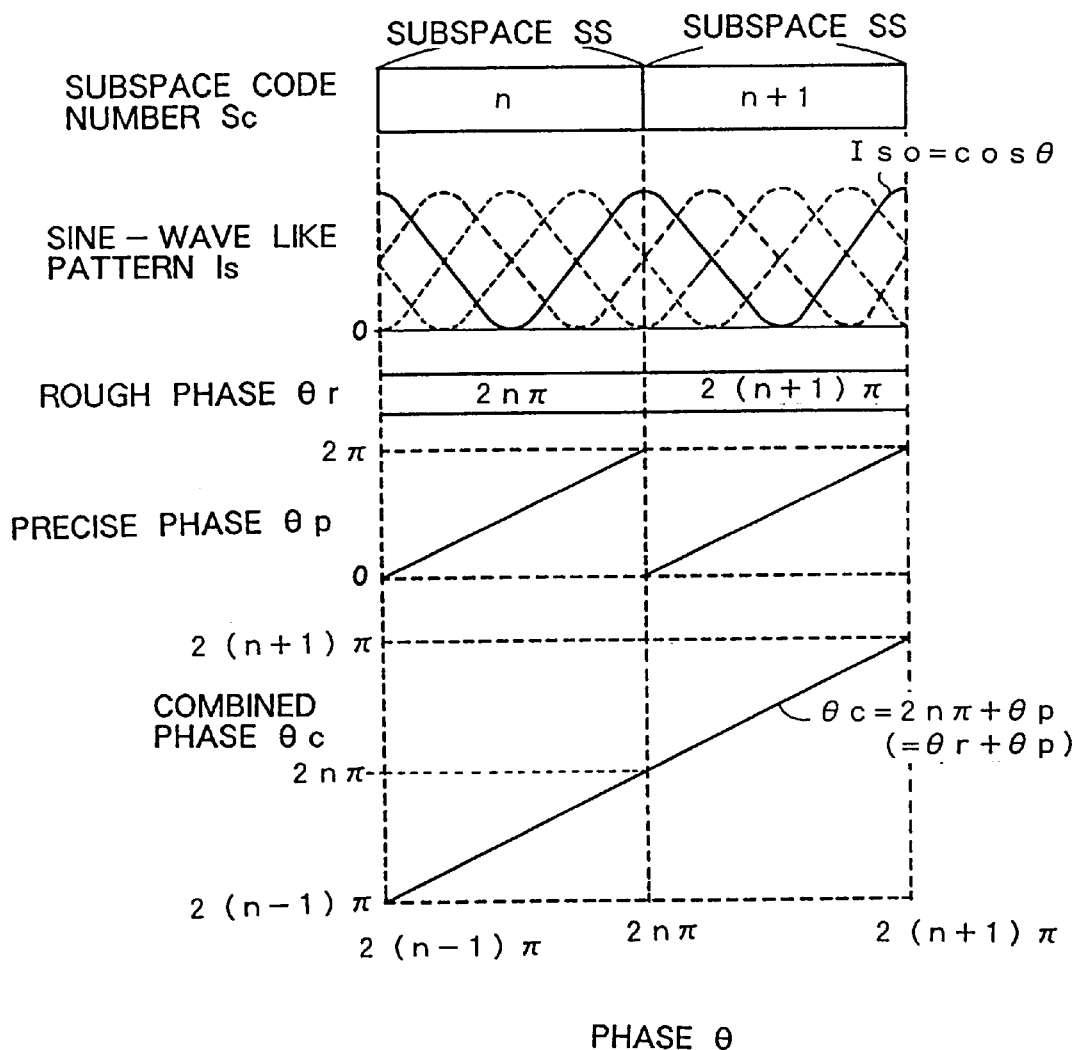
FIG. 17 shows the relation between space code number and sine-wave like pattern and the relation among rough phase θr calculated from space code number, precise phase θp calculated from the sine-wave like pattern, and combined phase θc.

FIG. 17 shows this relationship. Two subspaces SS: one subspace SS having the given space code number Sc=n and the other subspace SS having the given space code number Sc=n+1, correspond to one cycle of the (four types of) sine-wave like patterns. On the border between these two subspaces, the relationship represented by $IS_0 = \cos\theta = 1$, therefore, $\theta = 0, 2\pi, 4\pi, \ldots$ is established.

From such a relationship, the space code number Sc and the phase $\theta$ of the sine-wave like pattern can be related to each other. For example, assuming that the space code numbers Sc are set to a series of 0 or positive integral numbers n (Sc=0, 1, 2, 3, ..., n, ...), the space code number n can be converted into the phase $\theta$ (rough phase $\theta r$) by an equation $\theta r = 2n\pi$.

On the other hand, in each subspace SS, the phase (precise phase $\theta p$) can be determined in the range of $\theta p = 0$ to $2\pi$ in accordance with the above equation (2) by the phase shift method.

Therefore, since the space code number Sc determined by the space coding method is converted into the rough phase $\theta r$, the rough phase $\theta r$ is only added to the precise phase $\theta p$ determined by the phase shift method, whereby the results of both the methods can be combined and thus the combined phase $\theta c$ (=$\theta r + \theta p = 2n\pi + \theta p$) can be obtained. When n=0 and $\theta p=0$, the combined phase $\theta c$ is equal to 0. Thus, a relational equation is simple. Moreover, the rough phase $\theta r$ is equivalent to $2\pi, 4\pi, \ldots$ of the phase ignored due to the cyclicity of the sine wave in the phase shift method. Thus, as described in the first embodiment, the relationship between the deflection angle $\alpha$ and the combined phase $\theta c$ is previously determined, whereby then the height Z of the object M to be measured is determined by the above equation (1) in accordance with the principle of triangulation. In this case, $2\pi, 4\pi, \ldots$ of the phase ignored in the typical phase shift method is compensated by the rough phase $\theta r$. Thus, there is no phase coupling problem in which the calculated height data is shaped like the saw teeth, etc. Therefore, it is not necessary to correct the calculated height data by coupling the data in sequence. Consequently, the height Z can be immediately determined from the space code number Sc and the precise phase $\theta p$ determined for each pixel.

Next, the difference among the following three cases will be described. In a first case (for example, the first embodiment, see FIG. 18), for illuminating the reference plane L (and the object M to be measured) with the light beam, the central angles of the subspaces formed by the space coding method are equal to the central angles of the subspaces illuminated with the light beam of one cycle of the sine-wave like pattern. In a second case (see FIG. 19), the subspaces have the equal width on the reference plane L belonging to the subspaces. In a third case (see FIG. 20), the height hm from the reference plane L to the center of illumination MR is equal to the height hc from the reference plane L to the principal point PL of the objective lens of the CCD camera 21.

Figure 18:
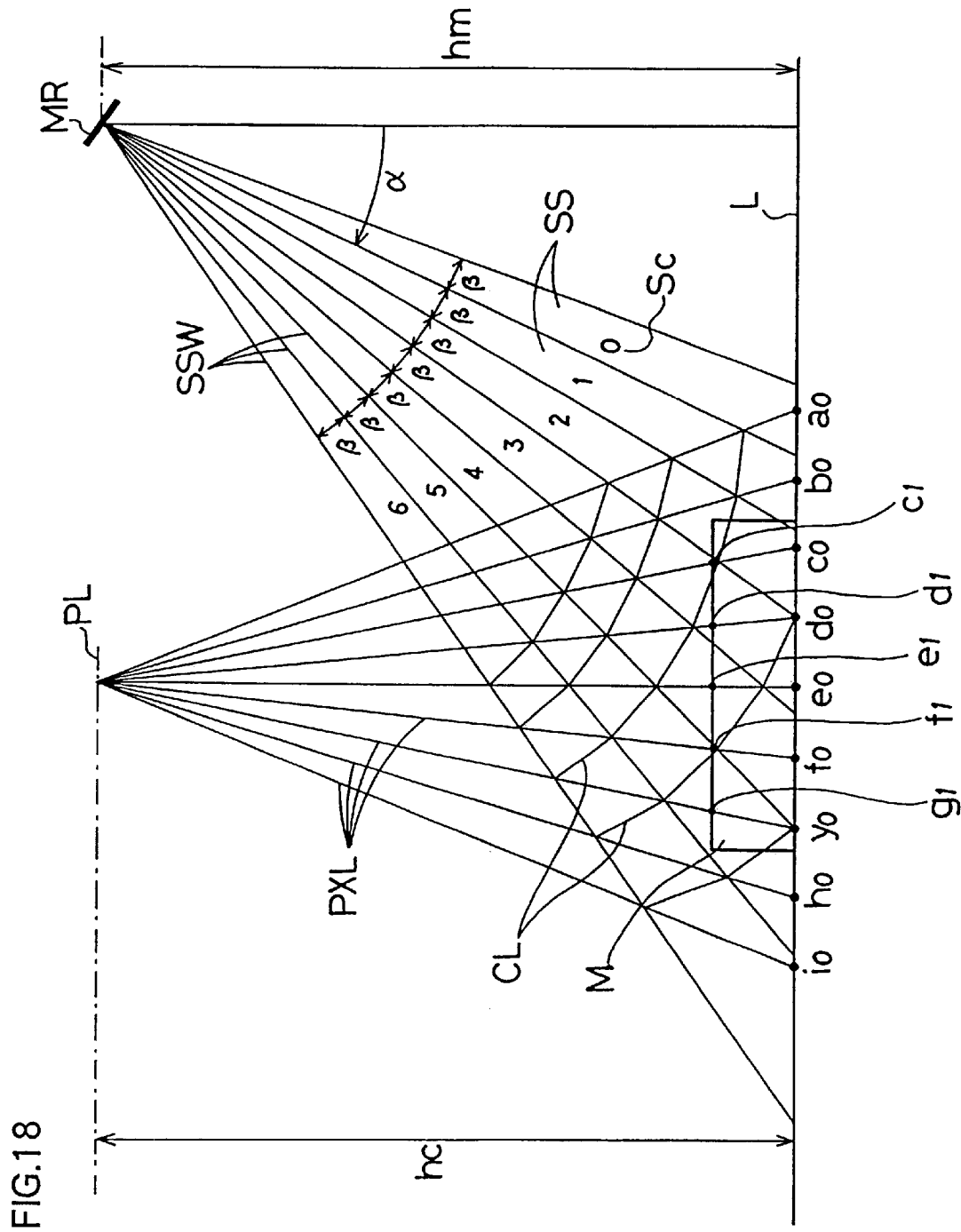
FIG. 18 shows resolving power when the light beam is illuminated so that subspaces may have equal central angles.

First, the case in which the central angles of the subspaces are equal, i.e., the case of the first embodiment will be described. As shown in FIG. 18, the subspace SS are fanned out about the center of illumination MR and have a series of given space code numbers Sc (Sc=0, 1, 2, ...). The subspace SS have the same central angle $\beta$. Radial lines from the principal point PL show optical axes (pixel optical axes) PXL estimated by the pixels (not shown) of the CCD camera 21. If the object M to be measured is absent, the pixels sense the stripe pattern illuminating intersections a0–i0 of these pixel optical axes PXL and the reference plane L. Therefore, for example, the space code number Sc=2 is known from the pixel corresponding to the intersection c0. In this manner, it is possible to know, from the pixels, the space code numbers Sc in response to the subspaces SS including the intersections a0–i0 corresponding to the pixels. The intersections a0–i0 are equally spaced, because the pixels (not shown) corresponding to the intersections are equally spaced.

It is assumed that the object M to be measured having a constant height is placed on the reference plane L. The intersections (for example, c1–g1) of some pixel optical axes PXL and the upper surface of the object M to be measured are formed. In short, the pixels corresponding to these intersections estimate the upper surface of the object M to be measured. For example, the pixel (not shown) originally estimating the intersection c0 on the reference plane L estimates the intersection c1 on the upper surface of the object M to be measured. Thus, the space code number Sc sensed by the pixel is changed from Sc=2 to Sc=3. Therefore, the space code number Sc is changed from an original value to other value, whereby the presence of the object M to be measured can be detected and the height (but the quantized value) of the object M to be measured can be calculated. Similarly, the space code number Sc sensed by the pixel estimating the intersection e0 is changed from Sc=3 to Sc=4 because of the presence of the object M to be measured.

However, the space code number Sc sensed by the pixel estimating the intersection d0 is not changed and remains Sc=3 regardless of the presence or absence of the object M to be measured. This pixel cannot therefore detect the presence of the object M to be measured, and thus the height of the object to be measured cannot be calculated. From this fact, as described above, if the object is illuminated with the light beam so that the subspaces SS may have the same central angle $\beta$, a problem is caused. That is, even the object M to be measured having the same height cannot be sometimes detected or the height thereof cannot be sometimes calculated depending on the difference in the position on the reference plane L on which the object M to be measured is placed. In short, the resolving power is varied depending on the position on the reference plane L. This problem is caused for the following reason. That is, if the central angles β are equal, lines CL connecting the adjacent intersections of the intersections of the borders SSW between the subspaces SS and the pixel optical axes PXL are not parallel to the reference plane L.

The subspaces SS illuminated with the light beam of one cycle of the sine-wave like pattern are discussed in the same manner. Therefore, when the height of the object M to be measured is measured by the phase shift method, the resolving power is similarly varied depending on the position.

Figure 19:
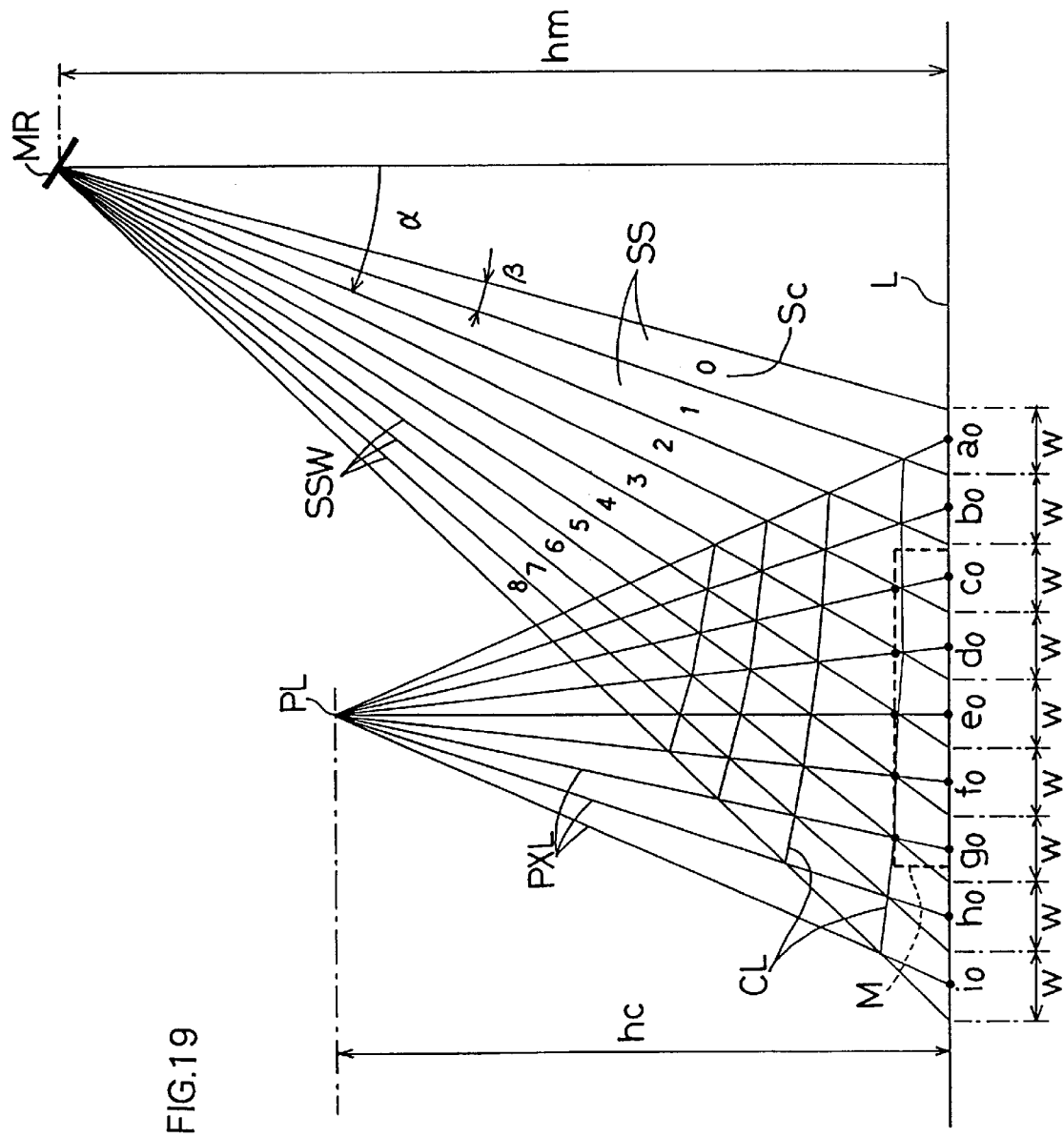
FIG. 19 shows resolving power when the light beam is illuminated so that subspaces may have an equal width on the reference plane belonging to the subspaces.

Next, the case in which the subspaces have the equal width on the reference plane L belonging to the subspaces will be described. As shown in FIG. 19, the space is illuminated with the light beam so that the subspaces SS may have an equal width w on the reference plane L belonging to the subspaces SS, i.e., the distances w between the intersections of the borders SSW between the subspaces SS and the reference plane L may be equal. In this drawing, the height hm from the reference plane L to the center of illumination MR is different from the height hc from the reference plane L to the principal point PL. More particularly, the case of hc<hm is illustrated in the drawing.

In this case, as can be seen from FIG. 19, the lines CL connecting the adjacent intersections of the intersections of the borders SSW between the subspaces SS and the pixel optical axes PXL are not parallel to the reference plane L. Therefore, for example, when the object M to be measured as shown by a broken line is placed on the reference plane L, the change in the space code number cannot be sometimes detected by the pixel depending on the place. In short, the resolving power is varied depending on the position on the reference plane L.

Figure 20:
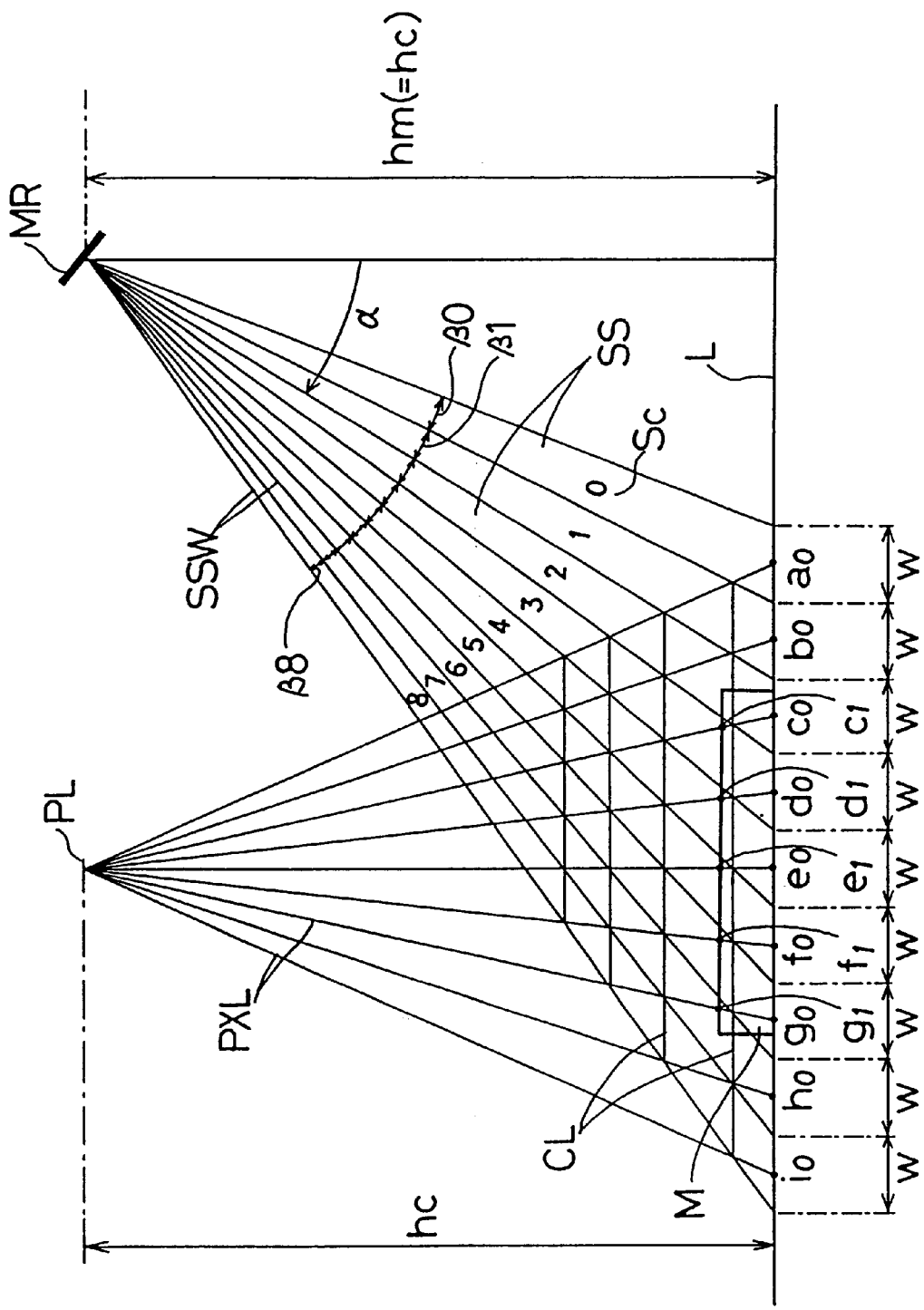
FIG. 20 shows resolving power when the light beam is illuminated so that subspaces may have an equal width on the reference plane belonging to the subspaces and the height from the reference plane to the center of illumination (hm) is equal to the height from the reference plane to the principal point of the objective lens of the CCD camera (hc)

Finally, the case in which the subspaces have the equal width on the reference plane L belonging to the subspaces and hc=hm will be described. As shown in FIG. 20, hc=hm is set and the space is illuminated with the light beam so that the subspaces SS may have the equal width w on the reference plane L belonging to the subspaces SS.

In this case, as can be seen from FIG. 20, the lines CL connecting the neighboring intersections of the intersections of the borders SSW between the subspaces SS and the pixel optical axes PXL are parallel to the reference plane L. Therefore, for example, as shown in FIG. 20, when the object M to be measured having the constant height is placed on the reference plane L, the space code numbers Sc of the subspaces SS which the intersections c1–g1 belong to are increased by 1, compared to the space code numbers Sc in the absence of the object M to be measured (the intersections c0–g0). Accordingly, the change in the space code number can be detected by the pixel regardless of the place, and thus the height of the object M to be measured can be measured. In short, the resolving power does not depend on the position on the reference plane L and is not varied. Thus, even if the object M to be measured is placed on any position on the reference plane L, the same measurement result can be obtained.

The subspaces SS illuminated with the light beam of one cycle of the sine-wave like pattern are similarly discussed. Therefore, when the height of the object M to be measured is measured by the phase shift method, the resolving power does not depend on the position and is not varied in the same manner.

In this embodiment, the shape is measured in accordance with this condition. Thus, as the deflection angle α gets larger, the central angles β (β0–β8 in FIG. 20) of the subspaces SS are gradually smaller (β0>β1> . . . >β8). In short, the synchronous circuit 271 and the laser controller 213 control a switching interval of the laser light source 2, the rotation of the polygon mirror 5 or the like in consideration of the relationship between the deflection angle α and the subspaces SS, whereby the above-describe condition is realized. Alternatively, the sufficiently rapidly switchable laser light source is used so that the laser light source can be switched on/off sufficient times in even the subspace having the smallest central angle β, whereby the number of switching in the subspaces may be controlled.

The case in which the measurement by the space coding method is selected by the selector 72 will be first described. In the same manner as the first embodiment, the selector 72 instructs the laser controller 213 to read the data from the space-coding light beam control data memory 212. The laser controller 213 controls whether the laser light source 2 is switched on or off in accordance with this data. This embodiment is the same as the first embodiment in this point.

However, in this embodiment, a 4-bit gray code (see FIG. 21) is used in the space-coding light beam control data memory 212. The number of the subspaces SS is less than the number of the subspaces SS in the first embodiment (see FIG. 4). First, one of memory bits 0 through 3 is selected and the selected one is read in the laser controller 213. Then, the laser light source 2 is switched on or off in the order of memory addresses 0 through 15 in accordance with the selected code data.

The space is illuminated with four types of light beams in accordance with the above-described 4-bit gray code, whereby the space illuminated with the light beams is divided into 16 (=$2^4$) subspaces SS. A series of space code numbers are given to the subspaces SS by the space coding method. The subspaces SS have the generally fan-shaped cross section.

Figure 14:
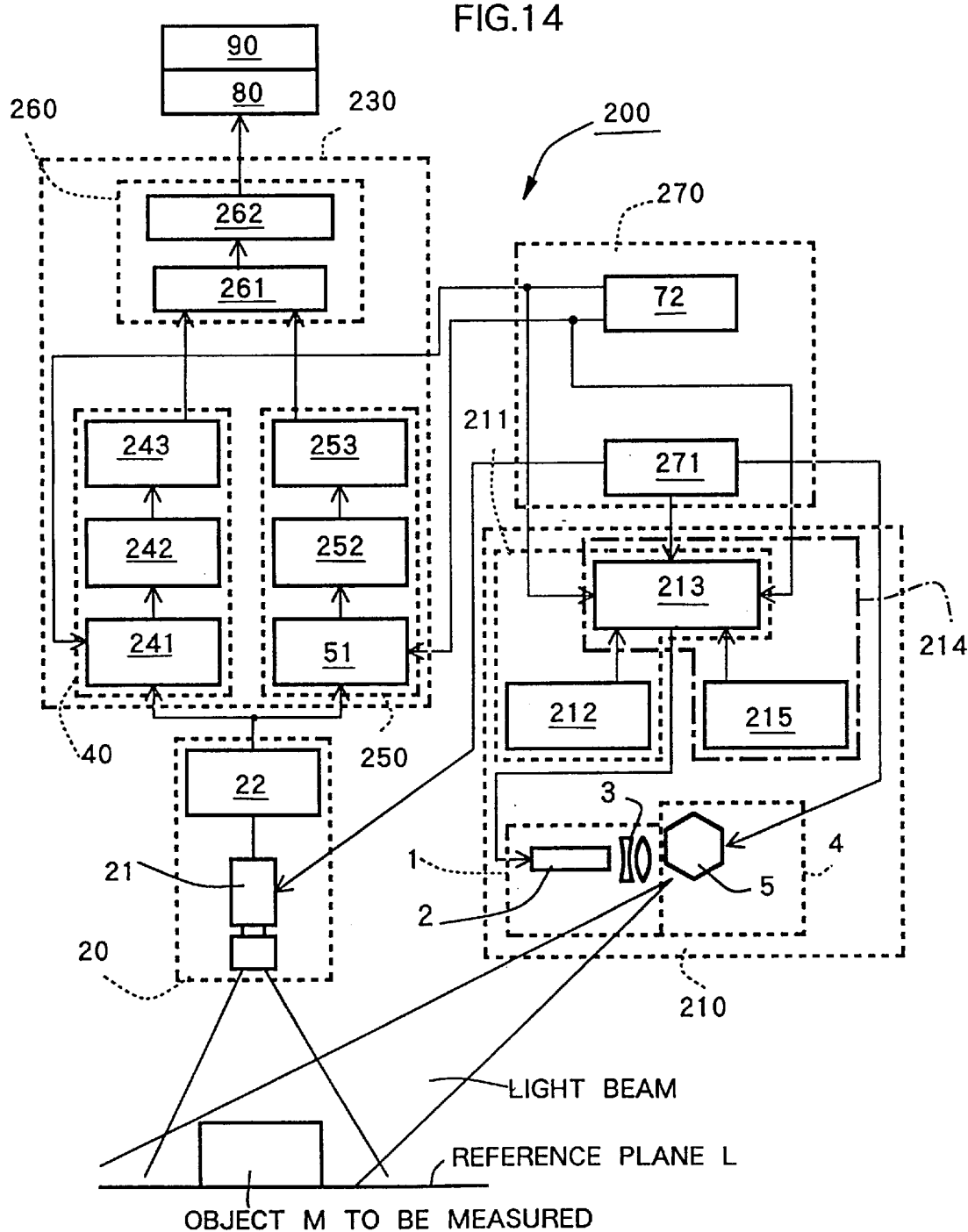
FIG. 14 shows a shape measuring device according to Embodiment 2.

In this embodiment, as shown in FIG. 14, in the same manner as the first embodiment, the object M to be measured is picked up by the CCD camera 21 and the image information is stored in the image memory 22. The synchronous circuit 271 controls the pickup timing of the CCD camera 21, the number of rotation of the polygon mirror 5, the angles of mirror surfaces and the timing for controlling the laser light source 2 by the laser controller 213 so that the object M to be measured may be scanned six times by the slit light beam during the time period for picking up one field.

For measuring the shape of the object M to be measured by the space coding method, the selector 72 instructs the space-coded image information capturing circuit 241 to capture, from the image memory 22, the image information which is picked up when the object M to be measured is illuminated with the laser light beam in accordance with the data in the space-coding light beam control data memory 12.

In the space-coded image information capturing circuit 241, as described above with reference to FIG. 15, the image information captured from the image memory 22 is first converted into the light/darkness binary image information for each pixel by the binarizing circuit 44. Then, the binary image information is stored in any one (for example, 245a) of the binary image information memories 245a–245d.

Next, the selector 72 instructs the laser controller 213 to read, from the space-coding light beam control data memory 212, the code in the memory address which is not used in the previous pickup. In accordance with this code, the laser light source 2 is switched on/off. The optical image of the object M to be measured formed by the light beam of the stripe pattern in accordance with this code is then picked up. The optical image is converted into the binary image information in the same manner as described above. The binary image information is stored in any one (for example, 245b) of the binary image information memories 245a–245d in which the binary image information is not yet stored. This operation is carried out for four types of codes stored in memory codes 0 through 3.

When the binary image information in accordance with each code is stored in the binary image information memories 245a–245d, the binary image information stored in these four memories 245a–245d is read in the rough phase operating circuit 242. Then, the space code number Sc of the subspace SS including the area estimated by the pixel is calculated for each pixel by the space coding method. Furthermore, the space code number Sc is converted into the rough phase $\theta r$ (=$2n\pi$), and this rough phase data is stored in the rough phase data memory 243.

Next, the case in which the measurement by the phase shift method is selected by the selector 72 will be described. In this case, the selector 72 instructs the laser controller 213 to read the data from the phase-shifting light beam control data memory 215 and then to control the laser light source 2 in accordance with this data. The phase-shifted image information capturing memory 51 captures the image information which is picked up when the laser controller 213 controls the laser light source 2 in accordance with the data in the phase-shifting light beam control data memory 215.

In this embodiment, in the same manner as the first embodiment, the integrated illumination intensity Is is changed by the third approach in order that the distribution of illuminance of the illuminating light beam is shaped like the sine wave. As described above, the subarea is scanned six times and illuminated with the pulse lighting three times at maximum, whereby the integrated illumination intensity Is is changed at 19 (=3×6+1) steps. The distribution of integrated illumination intensity having one cycle of the sine-wave like pattern is provided to 32 subareas s arranged in the scanning direction on the reference plane L. In the first embodiment, the central angles $\beta$ of the subspaces SS are equal. Thus, as the deflection angle $\alpha$ is larger, the subarea s has the greater width on the reference plane L in the scanning direction. That is, the subareas s do not have the equal width. In the second embodiment, since the subspaces SS have the equal width on the reference plane L across the subspaces SS, the subareas s also have the equal width.

In this way, in the same manner as the first embodiment, the optical images of four types of gradated fringe patterns are picked up, whereby it is possible to calculate the phase $\theta_M$ (precise phase $\theta p$) of the light beam illuminating the portions from the above equation (2) by the phase shift method. The calculated precise phase data is stored in the precise phase data memory 253.

The thus determined rough phase $\theta r$ and precise phase $\theta p$ are combined for each pixel in the phase combining circuit 261. More particularly, the corresponding rough phase $\theta r$ and precise phase $\theta p$ are added to each other so as to obtain the combined phase $\theta c$ (=$\theta r+\theta p=2n\pi+\theta p$). Furthermore, in the phase operating circuit 262, the height Z is calculated for each pixel from the deflection angle $\alpha$ corresponding to the combined phase $\theta c$ and the position x of the pixel in accordance with equation (1). It is therefore possible to calculate the height, namely, the shape of the portions of the object M to be measured. Then, in the same manner as the first embodiment, the operating section 80 and the display section 90 are used so as to calculate the sectional shape and perform a wire frame processing, so that the shape of the object to be measured can be displayed on the display or the like.

In this embodiment, the space code number Sc is converted into the rough phase $\theta r$. Thus, a single calculation of the height by equation (1) is sufficient for each pixel, and therefore the calculation is facilitated. Moreover, since the resolving power can be constant regardless of the position of the object M to be measured, the shape of each portion of the object M to be measured can be measured at the uniform and high resolving power.

Embodiment 3

Next, a third embodiment of the present invention will be described in connection with the accompanying drawings.

Although this embodiment is substantially the same as the second embodiment, it is different from the second embodiment in the method of calculating the height of the object to be measured. Therefore, the difference will be mainly described and the same part will be omitted or briefly described.

In the same manner as the second embodiment, in this embodiment, the subspace SS which one space code is given to corresponds to one cycle of the sine-wave like pattern. The subspaces SS have the equal width on the reference plane belonging to the subspaces SS. Moreover, the height hm from the reference plane L to the center of illumination MR of the light beam is equal to the height hc from the reference plane L to the principal point PL of the objective lens of the CCD camera. Thus, as described in the second embodiment (see FIG. 20), the resolving power is constant on any position on the reference plane L. Therefore, the height Z can be more easily calculated as described below, which is not employed in the second embodiment.

Consider the case in which the object M to be measured is placed on the reference plane L and the height Z is measured on a measuring point MS on the upper surface of the object M to be measured.

As shown in FIG. 22(a), the height hm from the reference plane L to the center of illumination MR of the light beam is equal to the height hc from the reference plane L to the principal point PL of the objective lens of the CCD camera. The space is illuminated with the light beam so that the subspaces SS may have the equal width on the reference plane belonging to the subspaces SS (not shown). L0 denotes the intersection of the optical axis U of the CCD camera 21 and the reference plane L. The measuring point MS is illuminated with a light beam LGT. ML0 denotes the intersection of the light beam LGT illuminating the measuring point MS and the reference plane L. $x_M$ denotes the position of the pixel on the photo-detector 28 estimating the measuring point MS. $x_L$ denotes the position of the pixel estimating the intersection ML0. x0 denotes the distance between the position $x_M$ and the position XL.

In this case, the measuring point MS is shifted from the optical axis U of the CCD camera 21. However, as described above, the resolving power is the same on any position on the reference plane L. Thus, in the case of measuring the height of an upper surface M1S of an object M1 to be measured, namely, the virtually moved object M to be measured, the same result is obtained. Therefore, consider the case in which a measuring point MS1 is positioned on the optical axis U as shown in FIG. 22(b). ML1 denotes the intersection of a light beam LGT1 illuminating the measuring point MS1 and the reference plane L. m1 denotes the distance between the intersection L0 and the intersection ML1. $x_L0$ denotes the position of the pixel on the photo-detector 28 estimating the intersection L0 and the measuring point MS1. $x_L1$ denotes the position of the pixel estimating the intersection ML1. x1 denotes the distance between the position $x_L0$ and the position $x_L1$.

Two triangles, ΔPL-MR-MS1 and ΔL0-ML1-MS1 are similar in shape (ΔPL-MR-MS1 ∞ΔL0-ML1-MS1). Thus, the following equation (3) is formulated.

$$(hm-Z)/m = Z/m1 \tag{3}$$

On the other hand, two triangles, ΔPL-xL0-xL1 and ΔPL-L0-ML1 are also similar in shape (ΔPL-xL0-xL1 ∞ΔPL-L0-ML1). Thus, the following equation (4) is formulated.

$$x1/f = m1/hm \tag{4}$$

From these two equations (3) and (4), the following equation (5) is deduced.

$$Z = x1 \cdot hm^2/(f \cdot m + x1 \cdot hm) \tag{5}$$

Here, hm, m and f are already known. Therefore, if x1 is known, the height Z can be determined by equation (5) without the use of the above equation (1) including the calculation of tan α.

Due to the placement of the object M to be measured, the pixel on the position $x_M$ of the photo-detector 28 detects the light of the space code number Sc and the phase $\theta_M$ which should be detected by the pixel on the position $x_L$ originally (i.e., in the absence of the object to be measured). Similarly, due to the object M1 to be measured, the pixel on the position $x_L0$ detects the light of the space code number Sc and the phase $\theta_M$ which should be originally detected by the pixel on the position $x_L1$.

For example, due to the object M1 to be measured having the height Z, the pixel on the position $x_L0$ detects the light of the space code number Sc and the phase $\theta_M$ which should be originally detected by the pixel shifted from the position $x_L0$ by the distance x1. In this case, x1 can be determined from the amount of shift of the space code number Sc and the amount of shift of the phase $\theta_M$. The height Z can be thus determined by the above equation (5).

As described above, the subspaces SS have the equal width on the reference plane L belonging to the subspaces SS. Moreover, since the pixels are equally spaced on the photo-detector 28, the pixels estimate the equal width on the reference plane L. For example, V photo-detection devices (pixels) are arranged in a width W (mm) in a light detecting area of the photo-detector 28. P pixels estimate the area on the reference plane L belonging to the subspace SS which one space code number is given to. The pixel on the position $x_L0$ senses the space code number (which should be sensed by the pixel on the position $x_L1$ located the distance x1 apart from the position $x_L0$) which is shifted by NC from the space code number which should be originally detected and sensed by the pixel on the position $x_L0$. In this case, x1 can be determined by the following equation (6).

$$x1 = NC \cdot P \cdot W/V \tag{6}$$

On the other hand, although the distance x0 is varied depending on the position on the reference plane L which the object M to be measured is placed on, the resolving power does not depend on the position as described above. In other words, since the amount of shift of the space code number Sc depends on only the height Z, the amount of shift of the space code number Sc is also constant in any position on the reference plane L. In short, even if the object to be measured having the height Z is placed on any position on the reference plane, the amount of shift of the space code number Sc takes the same value. Therefore, by the use of NC, namely, the amount of shift of the space code number Sc (hereinafter, also referred to as an amount of number shift) between the light which should be originally detected by the pixel on the position $x_M$ and the light which is actually detected by the pixel on the position $x_M$, x1 can be determined from the above equation (6). Equation (6) is substituted into equation (5), whereby the following equation (7) is formulated.

$$Z = NC \cdot P \cdot W \cdot hm^2/(V \cdot f \cdot m + NC \cdot P \cdot W \cdot hm) \tag{7}$$

From equation (7), the height Z (rough shape) can be determined.

For this purpose, a reference space code number Scb, which should be operated when the reference plane L is illuminated with the light beam in the absence of the object M to be measured, is stored as the reference for each pixel. The actual space code number Sc is compared to the reference space code number Scb, so that the amount of number shift NC is calculated.

Similarly, the amount of shift of the phase $\theta_M$ takes the same value regardless of the position on the reference plane L, as long as the height Z is equal. Accordingly, equation (8) is formulated in the following case. That is, one cycle (2π(rad)=360 (deg)) of the sine-wave like pattern is estimated by P pixels. Then, the pixel on the position $x_L0$ detects the light beam having the phase shifted by NP (deg) from the phase of the light which should be originally detected by the pixel on the position $x_L0$.

$$x1 = NP \cdot P \cdot W/(360 \cdot V) \tag{8}$$

Equation (8) is substituted into equation (5), whereby the following equation (9) is formulated.

$$Z = NP \cdot P \cdot W \cdot hm^2/(360 \cdot V \cdot f \cdot m + NP \cdot P \cdot W \cdot hm) \tag{9}$$

From equation (9), the height Z (precise shape) can be determined.

For this purpose, a reference phase $\theta_M b$, which should be operated when the reference plane L is illuminated with the light beam in the absence of the object M to be measured, is stored as the reference for each pixel. The actual phase $\theta_M$ is compared to the reference phase $\theta_M b$, so that the amount of phase shift NP is calculated.

In such a manner, the shape of the object M to be measured can be easily determined by adding two heights Z determined from the above equations (7) and (8) to each other without the calculation of tan or the like.

Figure 23:
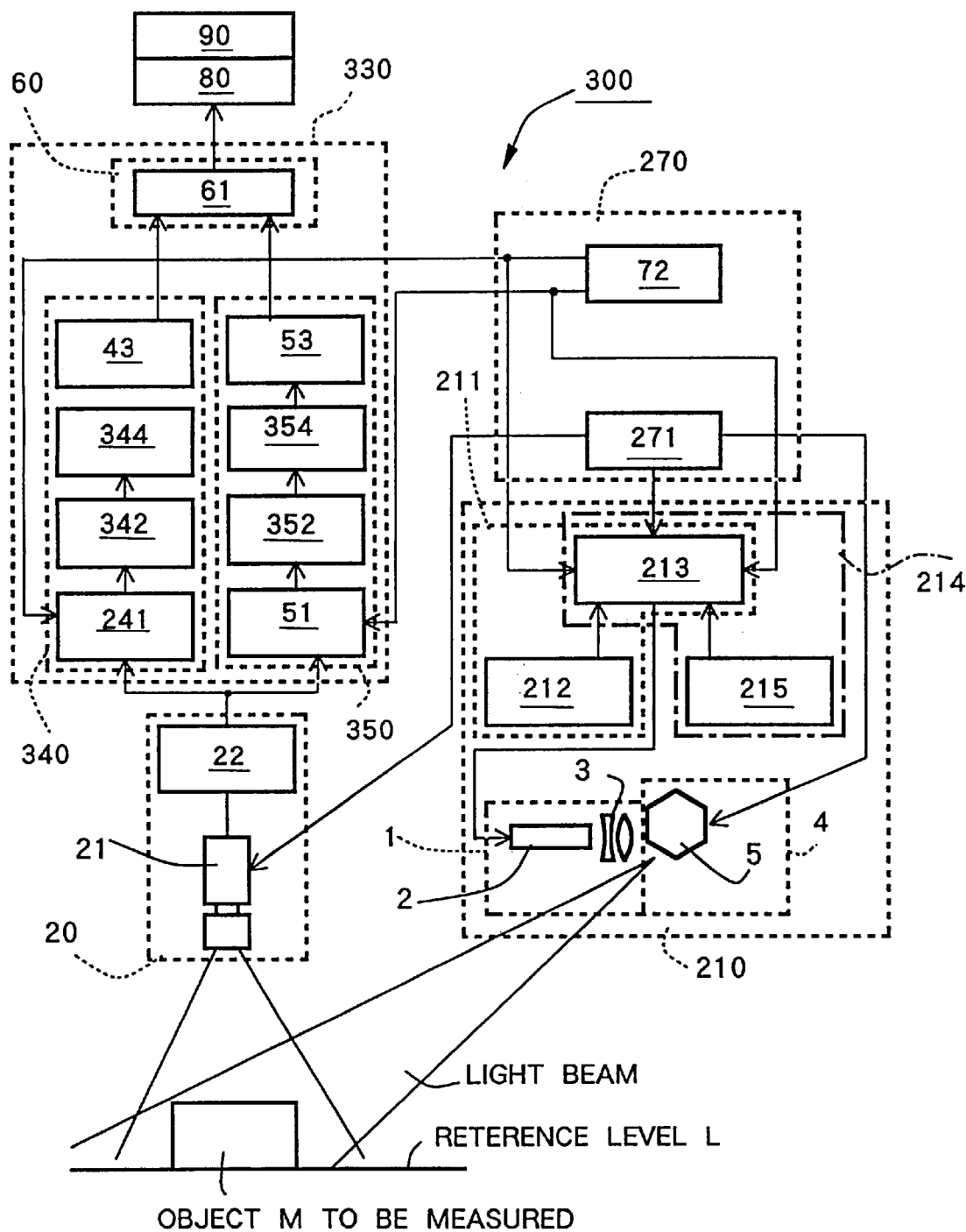
FIG. 23 shows a shape measuring device according to Embodiment 3.

FIG. 23 shows a shape measuring device 300 according to this embodiment. Although this shape measuring device 300 has substantially the same constitution as the shape measuring device 200 (see FIG. 14) of the second embodiment, it is different from the device 200 in image information operating means 330. This image information operating means 330 has space-coding shape operating means 340 for calculating the rough shape of the object M to be measured; phase-shifting shape operating means 350 for calculating the precise shape of the object M to be measured; and the shape combining/operating means 60 for combining the rough and precise shapes and for calculating the shape of the object M to be measured in the same manner as the first embodiment.

In greater detail, the space-coding shape operating means 340 includes the same space-coded image information capturing circuit 241 as the second embodiment (the S-type capturing circuit shown in the drawing); a space code number shift operating circuit 342 (a number shift operating circuit shown in the drawing); a rough shape operating circuit 344; and the same rough shape data memory 43 as the first embodiment (the rough shape memory shown in the drawing).

The space-coded image information capturing circuit 241 captures the image information from the pickup means 20, converts the image information into the light/darkness binary image information and stores the binary image information. The space code number shift operating circuit 342 operates the space code number Sc from the binary image information for each pixel and calculates the amount of space code number shift NC between the space code number Sc and the reference space code number Scb. The rough shape operating circuit 344 calculates the rough shape of the object M to be measured from the amount of number shift NC. The rough shape data memory 43 stores the calculated rough shape data.

Figure 24:
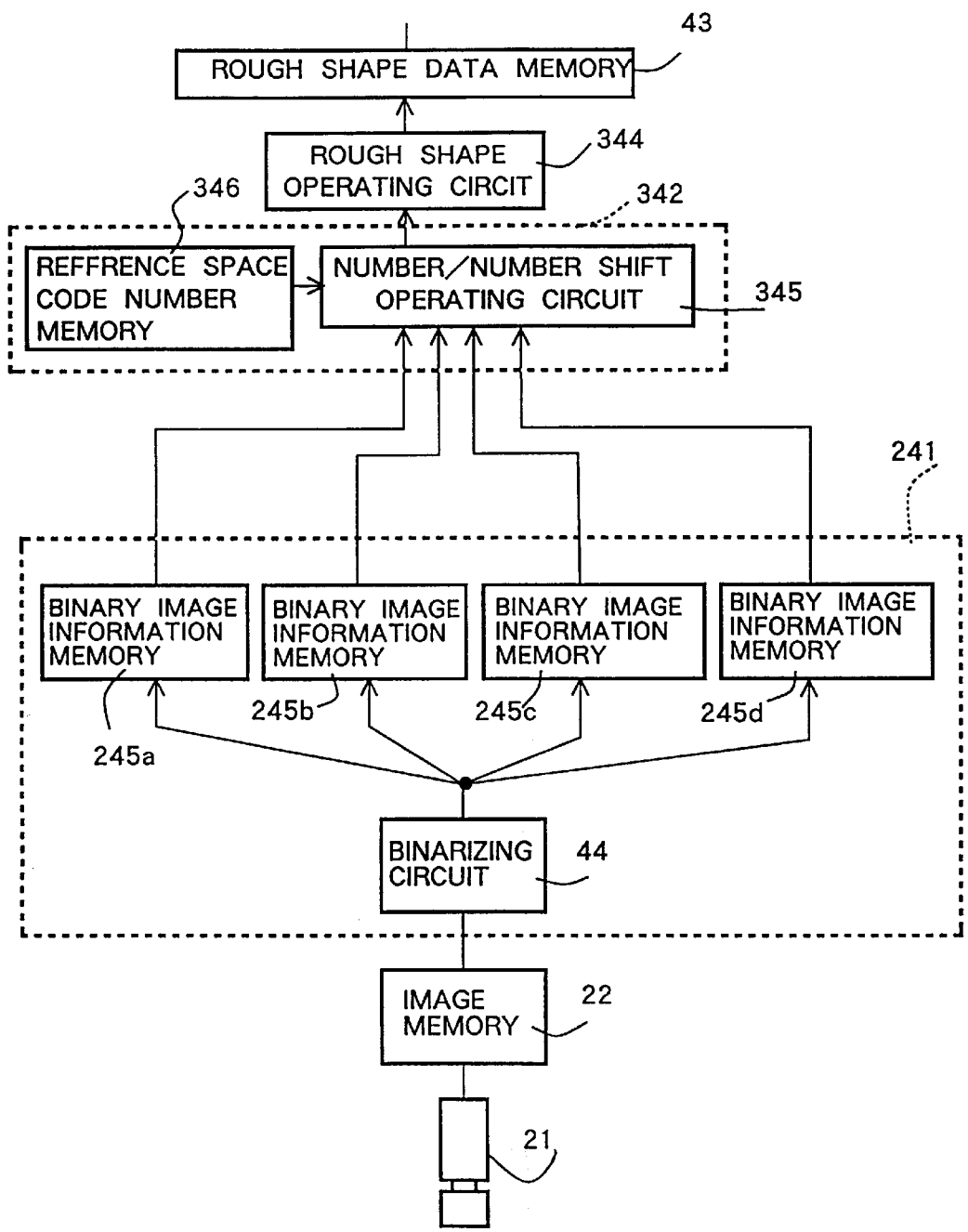
FIG. 24 shows details of space-coding shape operating means according to Embodiment 3.

As shown in FIG. 24, the space code number shift operating circuit 342 has a reference space code number memory 346 for storing the reference space code number Scb; and a number/number shift operating circuit 345 for operating the space code number Sc from the binary image information and for calculating the amount of number shift NC between the space code number Sc and the reference space code number Scb for each pixel.

In the same manner as the second embodiment, the space-coded image information capturing circuit 241 has the binarizing circuit 44 and the four binary image information memories 245a–245d (the binary image memories shown in the drawing).

The phase-shifting shape operating means 350 includes the same phase-shifted image information capturing memory 51 as the first and second embodiments (the P-type capturing memory shown in the drawing); a phase shift operating circuit 352; a precise shape operating circuit 354; and the same precise shape data memory 53 as the first embodiment (the precise shape memory shown in the drawing).

The phase-shifted image information capturing memory 51 captures and stores the image information from the pickup means 20. The phase shift operating circuit 352 operates the phase $\theta_M$ from the image information for each pixel and calculates the amount of phase shift NP between the phase $\theta_M$ and the reference phase $\theta_M b$. The precise shape operating circuit 354 calculates the precise shape of the object M to be measured from the amount of phase shift NP. The precise shape data memory 53 stores the calculated precise shape data.

Figure 25:
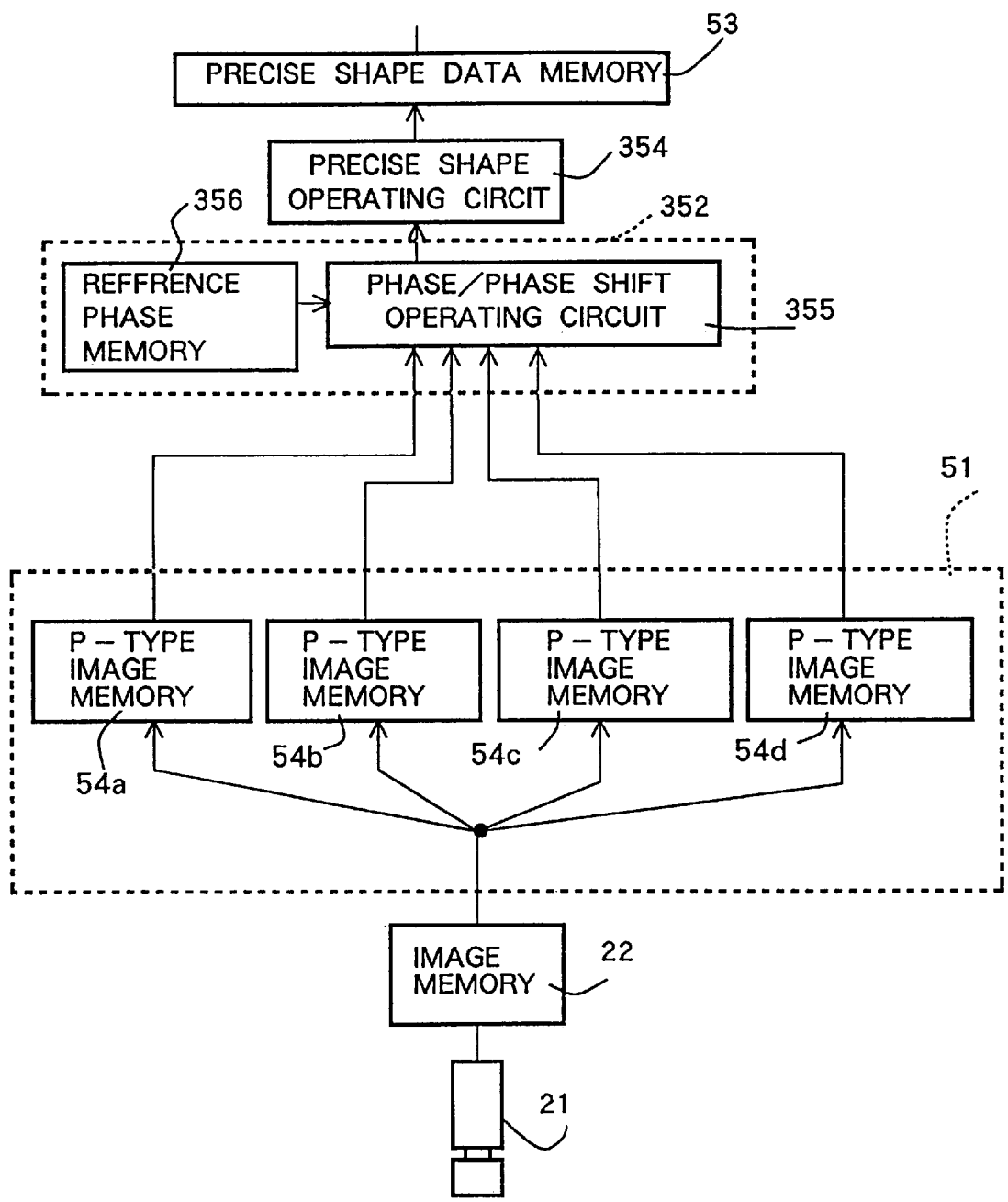
FIG. 25 shows details of phase-shifting shape operating means according to Embodiment 3.

As shown in FIG. 25, the phase shift operating circuit 352 has a reference phase memory 356 for storing the reference phase $\theta_M b$; and a phase/phase shift operating circuit 355 for operating the phase $\theta_M$ from the image information and for calculating the amount of phase shift NP between the phase $\theta_M$ and the reference phase $\theta_M b$ for each pixel.

According to this shape measuring device 300, the space code number Sc and the phase $\theta_M$ are obtained for each pixel by the space coding method and the phase shift method. The rough shape and the precise shape are easily obtained from the amount of number shift NC and the amount of phase shift NP, respectively, without the complicated/time-consuming calculation of tan. The rough shape and the precise shape are added to each other, whereby the shape of the object to be measured can be easily measured in the wide dynamic range at the high resolving power.

In this embodiment, in the same manner as the first and second embodiments, the addition of the rough and precise shape data for each pixel is sufficient to obtain the shape. Of course, there is no need for the correction for solving the discontinuity of the height data caused due to the phase shift method. Moreover, in the same manner as the second embodiment, even if the object M to be measured is placed on any position on the reference plane L, the uniform resolving power can be achieved. Therefore, the shape of each portion of the object M to be measured can be measured at the uniform and high resolving power.

In this embodiment, the reference space code number Scb and the reference phase $\theta_M b$ are previously stored in the memories 346 and 356. Alternatively, the reference space code number Scb and the reference phase $\theta_M b$ may be obtained from the image information which is obtained by illuminating the reference plane L with the light beam before or after measuring the object M to be measured.

Embodiment 4

A fourth embodiment will be described in connection with the accompanying drawings.

This embodiment is substantially the same as the third embodiment in that the shape of the object to be measured is operated by the use of the amount of space code number shift NC and the amount of phase shift NP. However, this embodiment is different from the third embodiment in the relationship between the subspace having one space code number and the sine-wave like pattern and in the method of calculating the height of the object to be measured. Therefore, the differences will be mainly described and the same part will be omitted or briefly described.

Figure 26:
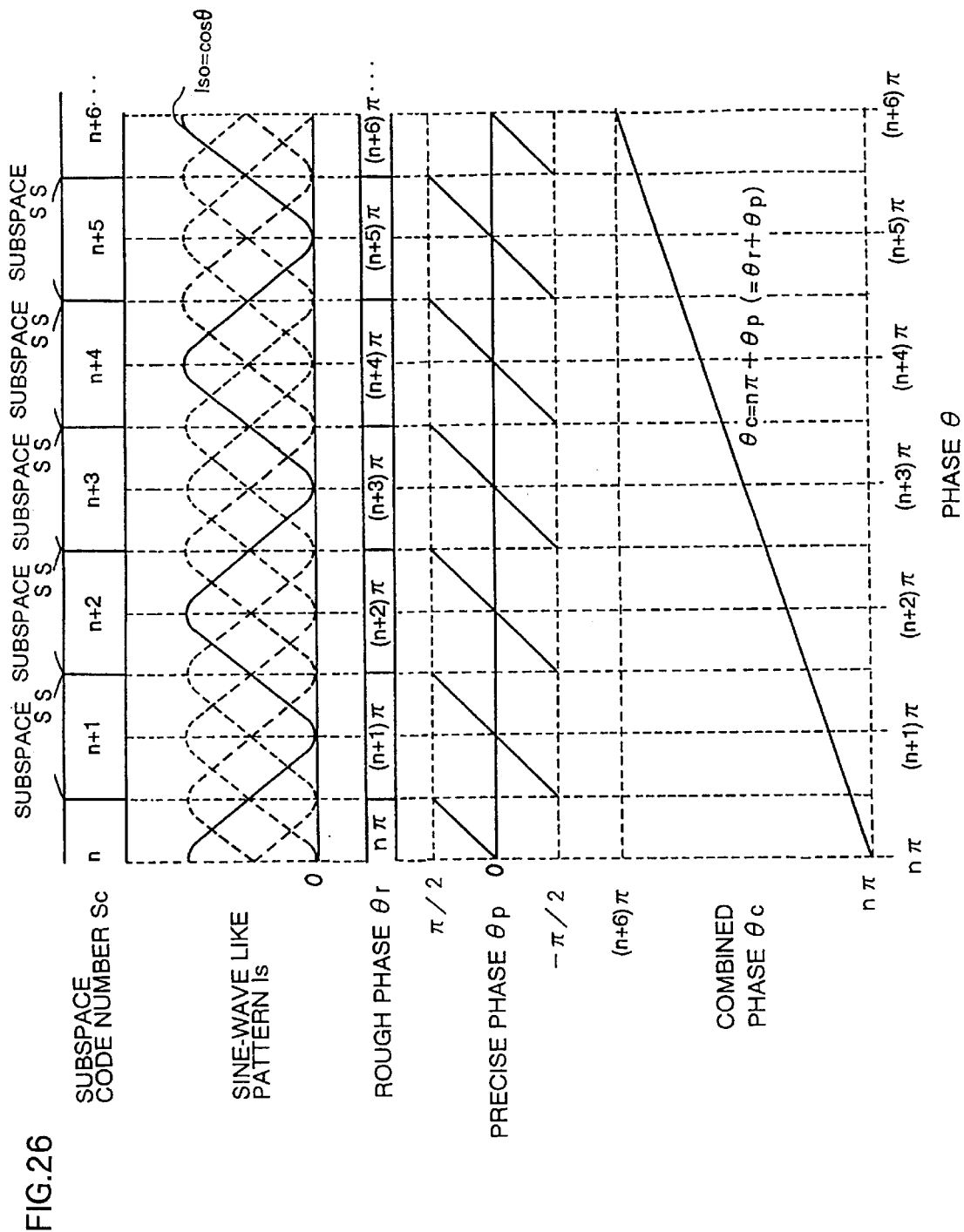
FIG. 26 shows the relation between space code number and sine-wave like pattern and the relation among rough phase θr calculated from space code number, precise phase θp calculated from the sine-wave like pattern, and combined phase θc according to Embodiment 4.

In the first to third embodiments, the subspace SS which one space code number Sc is given to coincides with the subspace illuminated with the light beam of 1 cycle of the sine-wave like pattern. On the other hand, in this embodiment, as shown in FIG. 26, the subspace SS which one space code number Sc is given to coincides with the subspace illuminated with the light beam of ½ cycle of the sine-wave like pattern. In this way, the phase coupling problem is also solved. The measurement results of the space coding method and the phase shift method can be easily combined.

Furthermore, in this embodiment, the relationship between the phase of the sine-wave like pattern and the subspace SS formed by the space coding method is selected in the following manner. That is, assuming that one of four types of sine-wave like patterns is expressed as $IS_0 = \cos \theta$, the borders SSW between the subspaces SS are located at the positions of $\theta = -\pi/2, \pi/2, 3\pi/2, 5\pi/2, \ldots$. In this manner, the phase $\theta_M$ calculated by the above equation (2) is calculated in the range of $-\pi/2$ to $\pi/2$.

The above equation (2) includes the calculation of arctan for calculating the phase $\theta_M$. Function $\tan \theta$ is expressed by $\tan \theta = \tan(\theta + \pi)$. As can be readily understood from a graph representing this function, there are two phases taking the same value in the range of one cycle, namely, in the range of $\theta = -\pi$ to $\pi$ (or 0 to $2\pi$). Therefore, only the calculation of arctan cannot determine which phase of the two phases from $-\pi$ to $\pi$ is the actual value. Accordingly, in the first to third embodiments, for actually calculating the phase $\theta_M$ by equation (2), independently of the calculation of arctan, it is necessary to determine whether I3-I1 and I0-I2 are positive or negative and to determine which quadrant of the first to fourth quadrants the phase $\theta_M$ is present in.

On the other hand, in this embodiment, the phase $\theta_M$ is calculated in the range of $\theta_M = -\pi/2$ to $\pi/2$, whereby the phase $\theta_M$ is uniquely determined in this range. Thus, it is not necessary to determine which quadrant the phase $\theta_M$ belongs to as described above. Therefore, the phase $\theta_M$ can be more easily determined.

The space code number Sc is related to the phase θ of the sine-wave like pattern as described above, whereby the space code number Sc can be converted into the phase. As shown in FIG. 26, assuming that the space code number Sc=0, 1, 2... n, n+1, ..., the space code number n can be converted into the phase θ (rough phase θr) by equation θr=nπ. On the other hand, in the subspaces SS, the phase $\theta_M$ (precise phase θp) can be determined in the range of θ=−π/2 to π/2 in accordance with the above equation (2) by the phase shift method. Therefore, in the same manner as the second embodiment, the space code number Sc determined by the space coding method is converted into the rough phase θr. Thus, the rough phase θr is only added to the precise phase θp determined by the phase shift method, whereby the results of both the methods can be combined and thus the combined phase θc (=θr+θp=nπ+θp) can be also obtained. When n=0 and θp=0, the combined phase θc is equal to 0. Thus, the relational equation is simple.

In the third embodiment, the height Z is not determined by equation (1) directly from the combined phase θc, the rough phase θr and the precise phase θp. That is, the reference space code number Scb and the reference phase $\theta_M b$ are used so as to determine the amount of number shift NC and the amount of phase shift NP. Then, the rough and precise shapes can be easily determined by equations (7) and (9). The rough and precise shapes are added to each other, whereby the shape of the object to be measured is determined.

In the fourth embodiment, the amount of number shift NC and the amount of phase shift NP are also determined from the combined phase θc, the rough phase θr and the precise phase θp. Unlike the third embodiment, the amount of number shift NC is converted into an amount of converted phase shift ND. The amount of converted phase shift ND is added to the amount of phase shift NP so as to determine an amount of combined phase shift NPD (=ND+NP). The amount of combined phase shift NPD is applied to equation (9) so as to determine the shape. In short, NP is replaced by NPD in the above equation (9) so as to formulate the following equation (10).

$$Z = NPD \cdot P \cdot W \cdot hm^2 / (360 \cdot V \cdot f \cdot m + NPD \cdot P \cdot W \cdot hm) \quad (10)$$

From equation (10), the shape is determined. Thus, the shape of the object to be measured can be easily determined by the simple equation (10). Moreover, since it is unnecessary to determine the rough shape from the amount of number shift NC, the calculation is easier compared to the third embodiment.

As can be readily understood from FIG. 26, when the value of the space code number Sc is changed from n to n+1, the value of the rough phase θr is changed from nπ to (n+1)π. Thus, the amount of number shift NC may be converted into the amount of converted phase shift ND by ND=π·NC. Therefore, NPD=ND+NP=π·NC+NP. The above equation (10) is expressed by the following equation.
[Equation 11]

Figure 27:
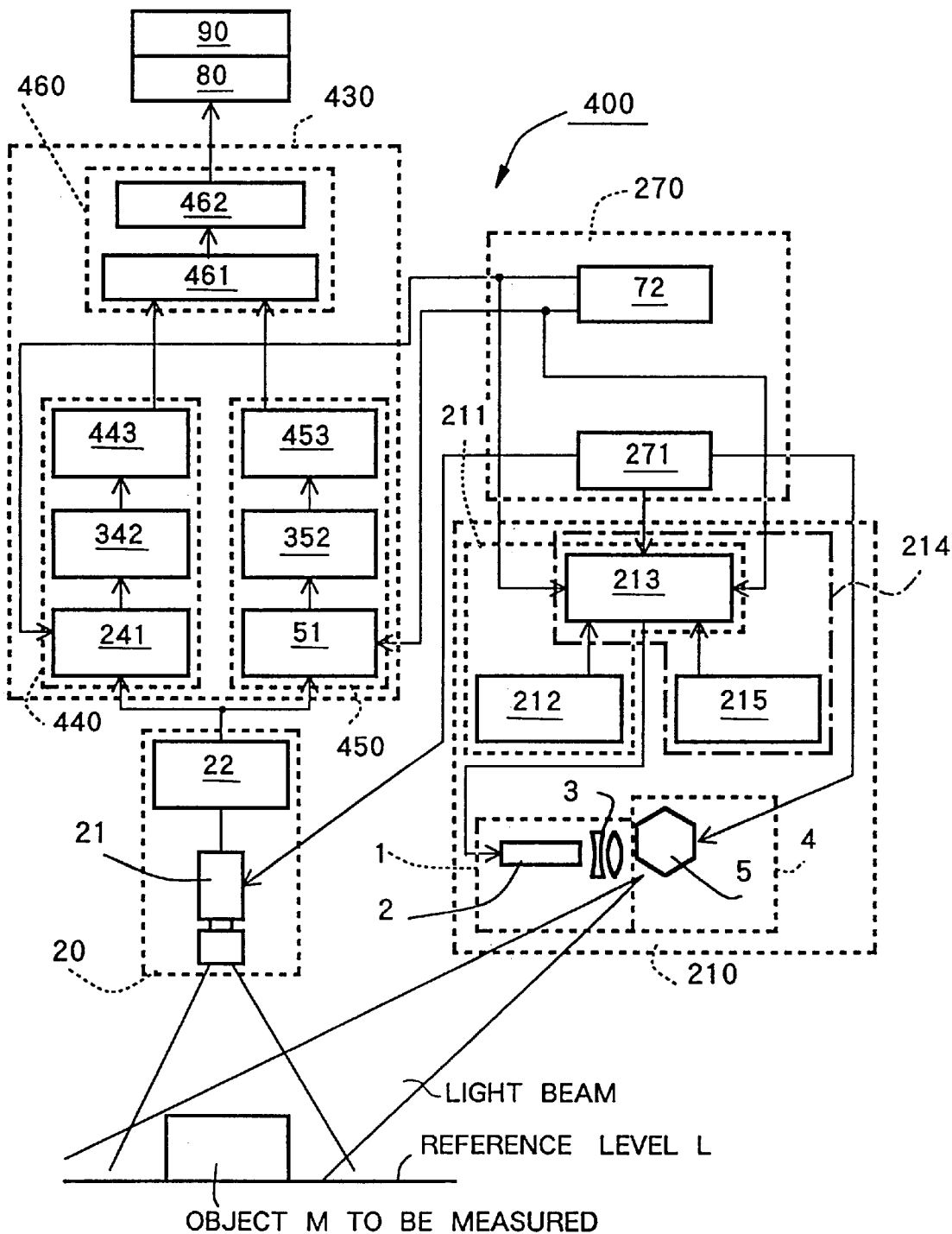
FIG. 27 shows a shape measuring device according to Embodiment 4.

Next, FIG. 27 shows a shape measuring device 400 according to this embodiment. Although this shape measuring device 400 has substantially the same constitution as the shape measuring device 300 (see FIG. 23) of the third embodiment, it is different from the device 300 in image information operating means 430. The image information operating means 430 has space-coding shift operating means 440 for calculating the amount of number shift NC of the object M to be measured; phase-shifting shift operating means 450 for calculating the amount of phase shift NP of the object M to be measured; and shape combinig/operating means 460 for combining the amount of number shift NC and the amount of phase shift NP and for calculating the shape of the object M to be measured.

In greater detail, the space-coding shift operating means 440 includes the same space-coded image information capturing circuit 241 as the second and third embodiments (the S-type capturing circuit shown in the drawing); the same space code number shift operating circuit 342 as the third embodiment (the number shift operating circuit shown in the drawing); and a number shift data memory 443 (a number shift memory shown in the drawing).

The space-coded image information capturing circuit 241 captures the image information from the pickup means 20, converts the image information into the light/darkness binary image information and stores the binary image information. The space code number shift operating circuit 342 operates the space code number Sc from the binary image information for each pixel and calculates the amount of space code number shift NC between the space code number Sc and the reference space code number Scb. The number shift data memory 443 stores the calculated number shift data.

Figure 28:
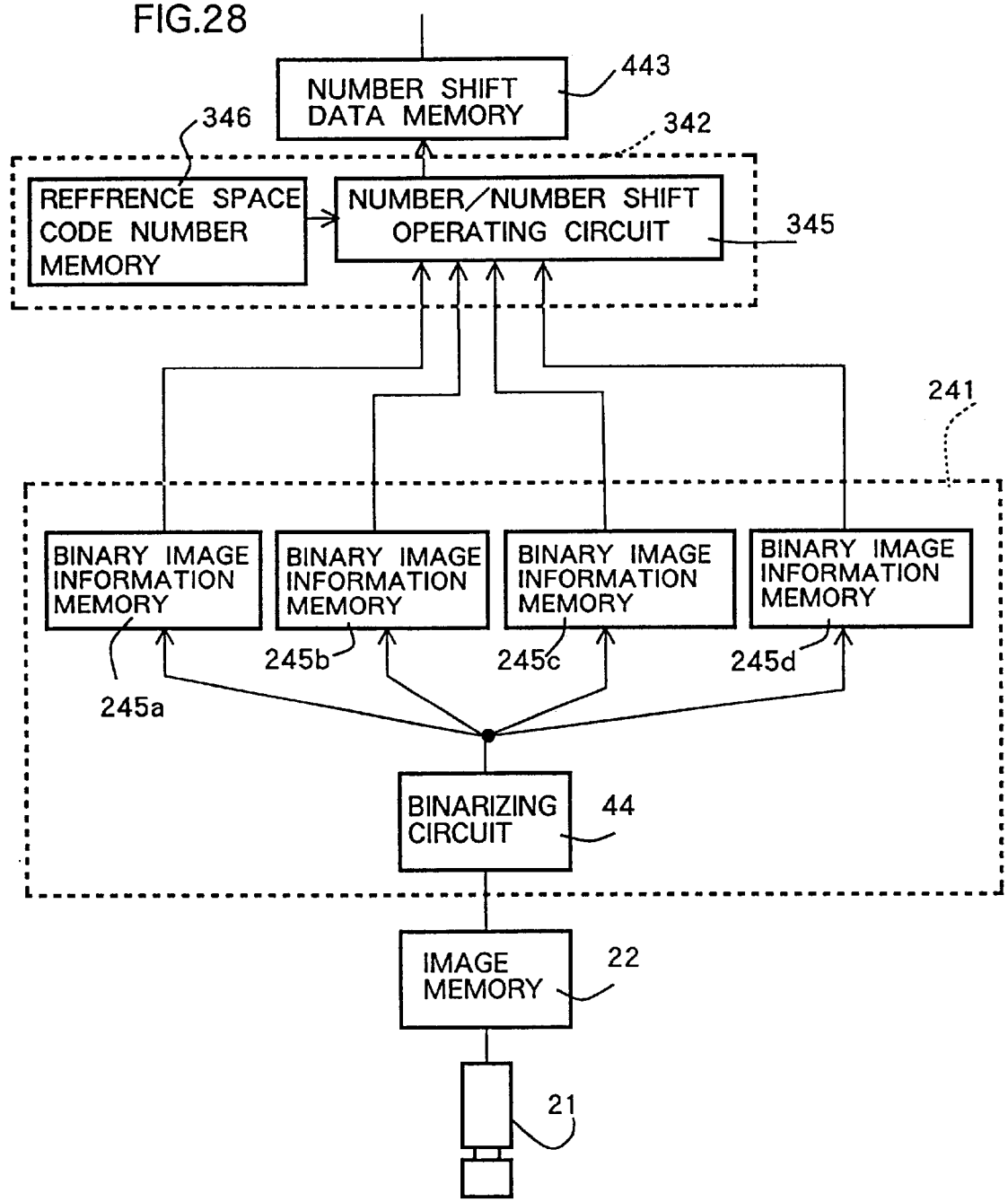
FIG. 28 shows details of space-coding shape operating means according to Embodiment 4.

As shown in FIG. 28, in the same manner as the third embodiment, the space code number shift operating circuit 342 has the reference space code number memory 346 and the number/number shift operating circuit 345. In the same manner as the second and third embodiments, the space-coded image information capturing circuit 241 has the binarizing circuit 44 and the four binary image information memories 245a–245d (the binary image memories shown in the drawing).

The phase-shifting shift operating means 450 includes the same phase-shifted image information capturing memory 51 as the first to third embodiments (the P-type capturing memory shown in the drawing); the same phase shift operating circuit 352 as the third embodiment; and a phase shift data memory 453 (a phase shift memory shown in the drawing).

The phase-shifted image information capturing memory 51 captures and stores the image information from the pickup means 20. The phase shift operating circuit 352 operates the phase $\theta_M$ from the image information for each pixel and calculates the amount of phase shift NP between the phase $\theta_M$ and the reference phase $\theta_M b$. The phase shift data memory 453 stores the calculated phase shift data.

Figure 29:
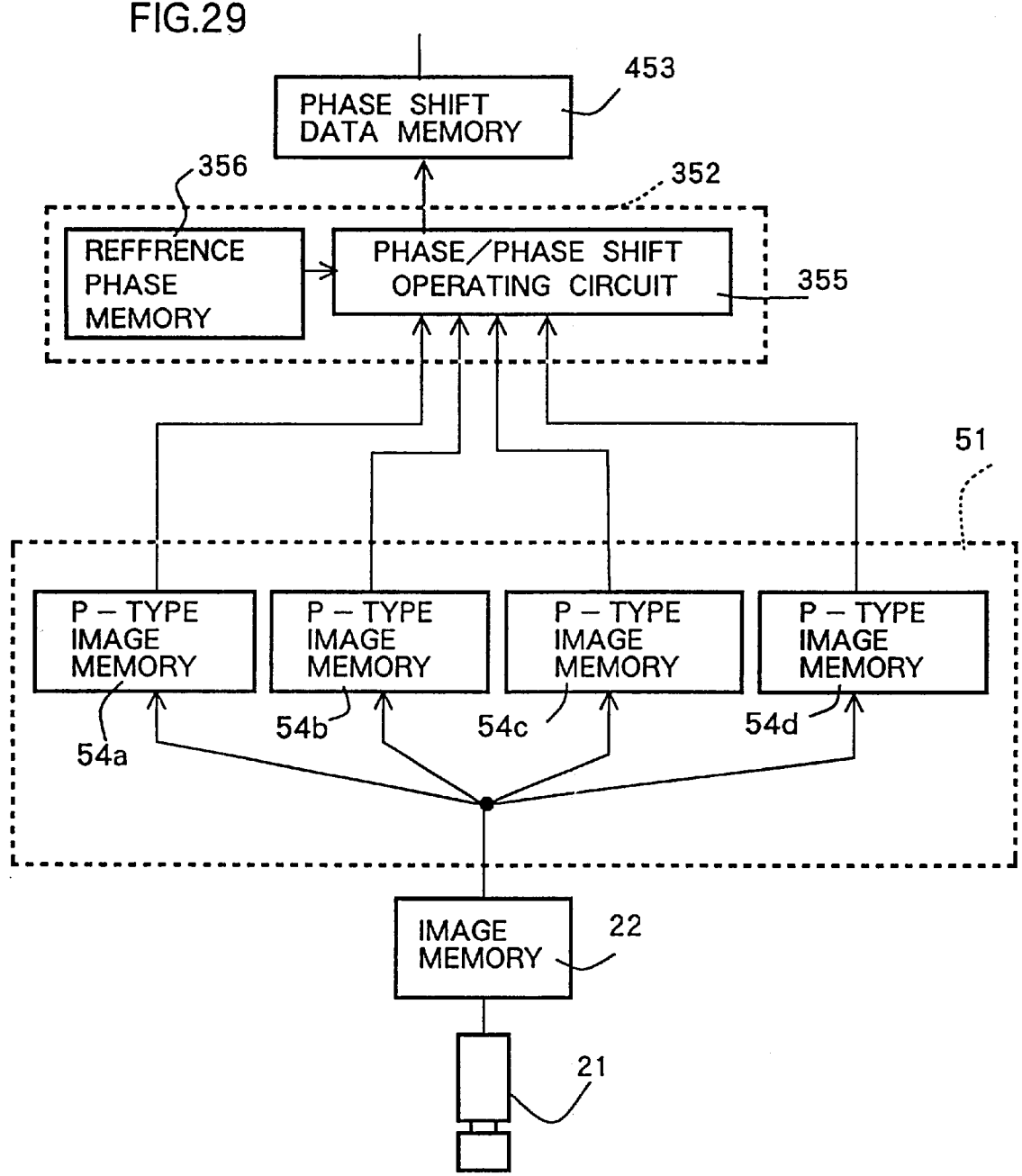
FIG. 29 shows details of phase-shifting shape operating means according to Embodiment 4.

As shown in FIG. 29, in the same manner as the third embodiment, the phase shift operating circuit 352 has the reference phase memory 356 and the phase/phase shift operating circuit 355.

The shape combining/operating means 460 has a shift combining circuit 461 for, for each pixel, converting the amount of number shift NC into the amount of converted phase shift ND, adding the amount of converted phase shift ND to the amount of phase shift NP and determining the amount of combined phase shift NPD; and a shape operating circuit 462 for determining the shape of the object to be measured in accordance with the above equation (10).

In the above description, the shape combining/operating means 460 comprises two circuits (the shift combining circuit 461 and the shape operating circuit 462). Alternatively, the above equation (11) may be used so as to determine the shape of the object to be measured from the amount of number shift NC and the amount of phase shift NP at one time.

According to this shape measuring device 400, the space code number Sc and the phase $\theta_M$ are obtained for each pixel. The amount of number shift NC and the amount of phase shift NP are calculated. The shape of the object to be measured can be easily obtained without the complicated/time-consuming calculation of tan. Furthermore, the amount of number shift NC is converted into the amount of converted phase shift ND. Thus, the shape of the object to be measured can be more easily measured in the wide dynamic range at the high resolving power, compared to the third embodiment.

In this embodiment, in the same manner as the first to third embodiments, there is no need for the correction for solving the discontinuity of the height data caused due to the phase shift method. Moreover, in the same manner as the second and third embodiments, even if the object M to be measured is placed on any position on the reference plane L, the uniform resolving power can be achieved. Therefore, the shape of each portion of the object M to be measured can be measured at the uniform and high resolving power.

In the first to fourth embodiments, the third approach is better than the first and second approaches in order that the integrated illumination intensity Is is distributed like the sine wave.

Embodiment 5

The measurement using both of the space coding method and the phase shift method has been described in the first to fourth embodiments. In this embodiment, the shape of the object M to be measured is measured by the phase shift method.

Figure 30:
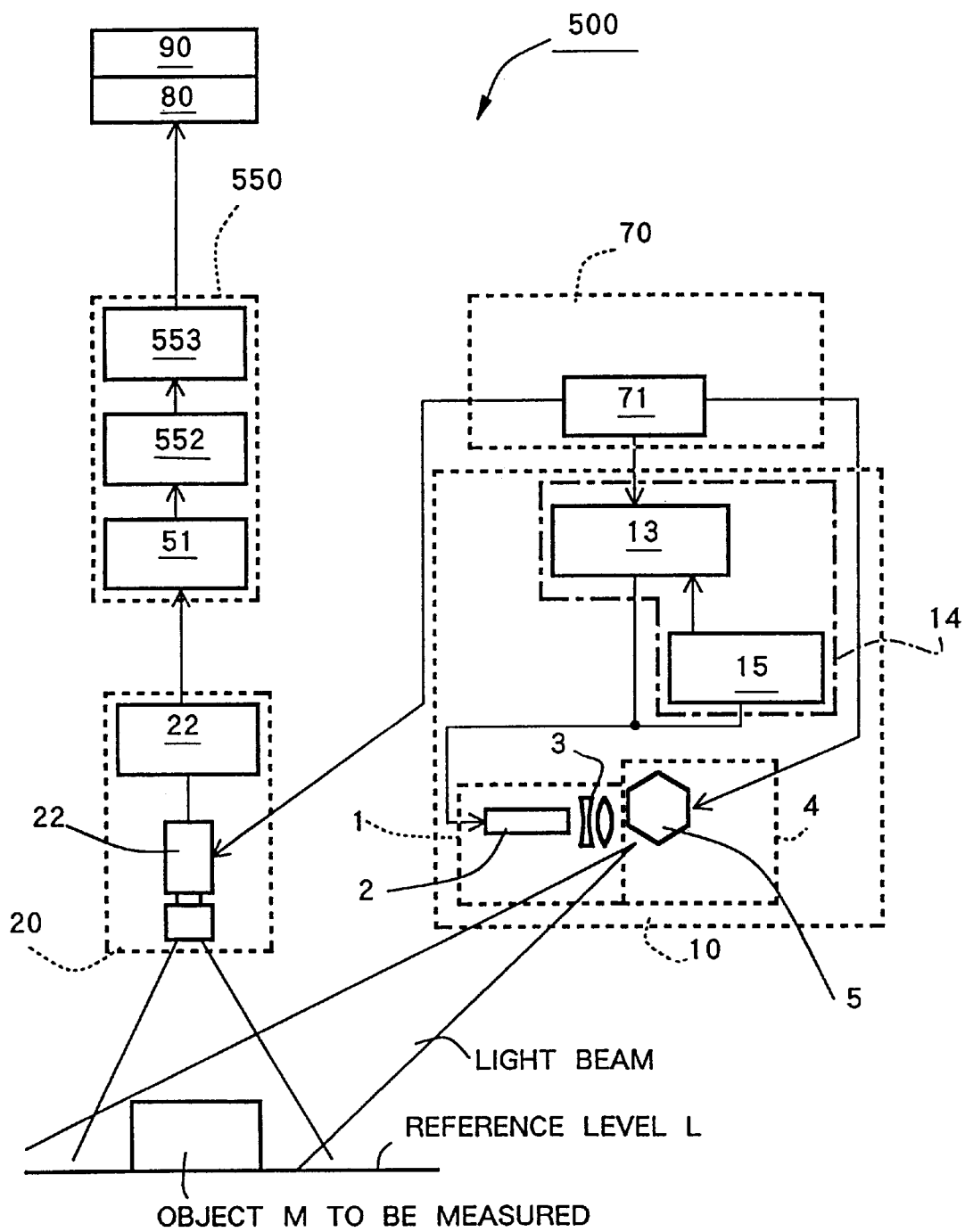
FIG. 30 shows system of a shape measuring device according to Embodiment 5.

FIG. 30 illustrates a shape measuring device 500 according to a fifth embodiment of the present invention. The shape measuring device 500 of this embodiment has substantially the same constitution as the shape measuring device of the first embodiment. In this embodiment, the measurement is not performed by the space coding method, and the rough and precise shape data are not combined. Therefore, the space-coding light beam control data memory 12, the space-coding shape operating means 40, the shape combining/operating means 60 and the selector 72 are eliminated. As described below, the shape is operated in a slightly different manner. Thus, there are provided a phase-shifting operating circuit 552 (a P-type operating circuit shown in the drawing) and a shape data memory 553 (a shape memory shown in the drawing). That is, the shape measuring device 500 has the light beam illuminating means 10 for illuminating the object M to be measured placed on the reference plane L with the light beam; the pickup means 20 for picking up the optical image formed by illuminating the object M to be measured with the light beam; phase-shifting image information operating means 550 for calculating the height and shape of the object M to be measured from the picked-up image information; and the control section 70.

The phase-shifting image information operating means 550 includes the phase-shifted image information capturing memory 51 (the P-type capturing memory shown in the drawing) for capturing and storing the image information from the pickup means 20; the phase-shifting operating circuit 552 for calculating the precise shape of the object to be measured from the lightness value of the image information by the phase shift method, for coupling the discontinuous data and for calculating the shape of the object to be measured; and the shape data memory 553 for storing the calculated shape data.

The control section 70 includes the synchronous circuit 71.

Each portion of the shape measuring device 500 of this embodiment is operated in substantially the same manner as each portion of the shape measuring device 100 of the first embodiment. Therefore, the same part is omitted and only the difference will be described below.

Figure 31:
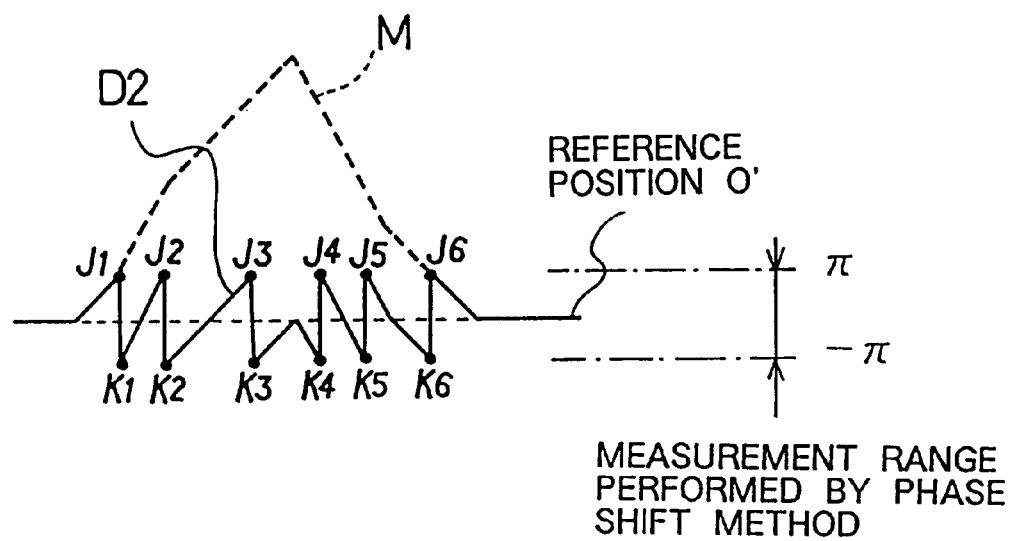
FIG. 31 shows how to correct precise shape data.
Figure 31:
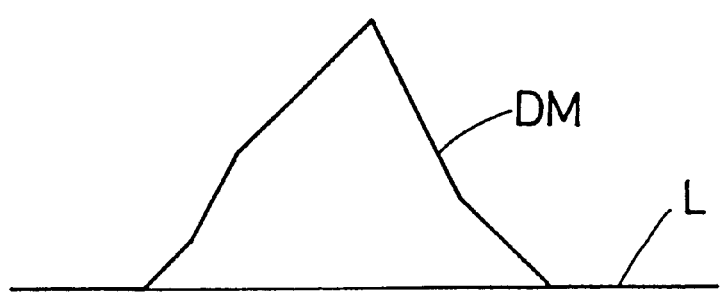

The phase-shifted image information is stored in the phase-shifted image information capturing memory 51, and then the phase-shifting operating circuit 552 reads four fields of phase-shifted image information stored in the memory 51. First, the shape (precise shape) of the object M to be measured is calculated in accordance with the phase shift method and the principle of triangulation in the same manner as the first embodiment. As described in the first embodiment, the calculated precise shape data D2 is discontinuous on the points on which the phase is $\pi$ and $-\pi$ (see FIG. 31(a)). As shown in FIG. 31(a), assuming that the object M to be measured has a smooth/continuous shape, discontinuous points J1–J6 and K1–K6 of the calculated precise shape data D2 are considered to have the same height, so that they are corrected. That is, the corresponding points (for example, J1 and K1, J2 and K2, . . . ) are considered to have the same height, so that the data D2 are coupled. In this manner, as shown in FIG. 31(b), the shape data DM of the object M to be measured can be obtained.

According to this embodiment, if the shape (height) of the object M to be measured has the discontinuous portion, the correction is difficult. However, the measurement is facilitated because there is no need for the measurement by the space coding method. The object can be also measured at the high resolving power.

In this embodiment, in the same manner as the first embodiment, the subareas are scanned six times within the time period for picking up one frame and illuminated with the pulse lighting four times at maximum in order that the integrated illumination intensity Is has the sine-wave like pattern. In this way, the integrated illumination intensity Is is changed at 25 (=4×6+1) steps. Alternatively, the integrated illumination intensity Is may be changed at other steps in accordance with the first and second approaches described in the first embodiment.

Embodiment 6

A sixth embodiment of the present invention will be described in connection with the accompanying drawings.

In this embodiment, in the same manner as the second embodiment, the subspaces SS have the equal width on the reference plane L belonging to the subspaces SS illuminated with the light beam of one cycle of the sine-wave like pattern (see FIG. 20). That is, the subspaces SS are illuminated with the light beam so that the pattern of the light beam illuminating the reference plane L may have a constant wavelength on any portion on the reference plane L. In this case, as described above, even if the object to be measured is placed on any position on the reference plane L, the resolving power is kept constant.

Figure 32:
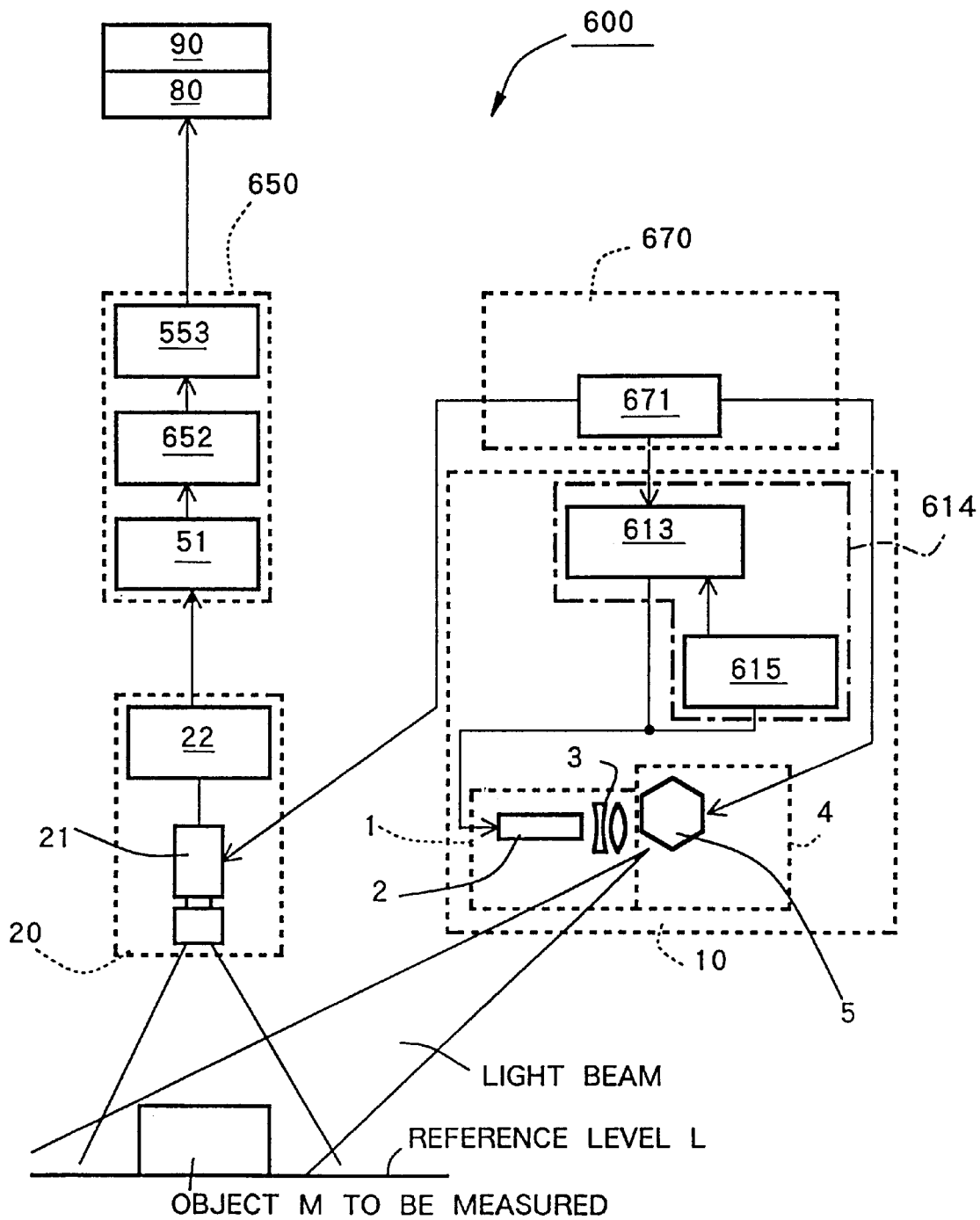
FIG. 32 shows system of a shape measuring device according to Embodiment 6.
Figure 33:
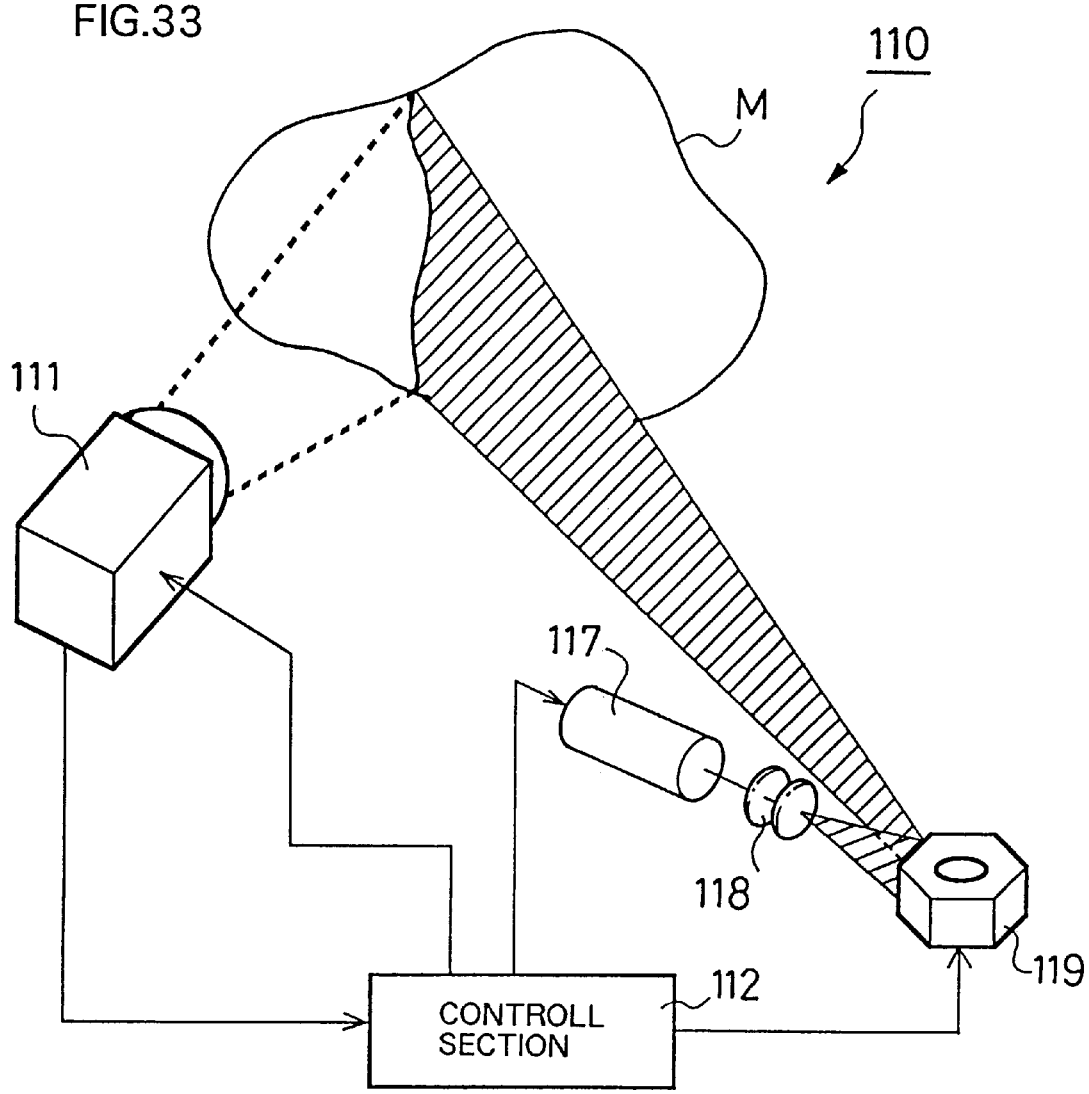
FIG. 33 shows the structure of a conventional shape measuring device which uses space coding method.
Figure 34:
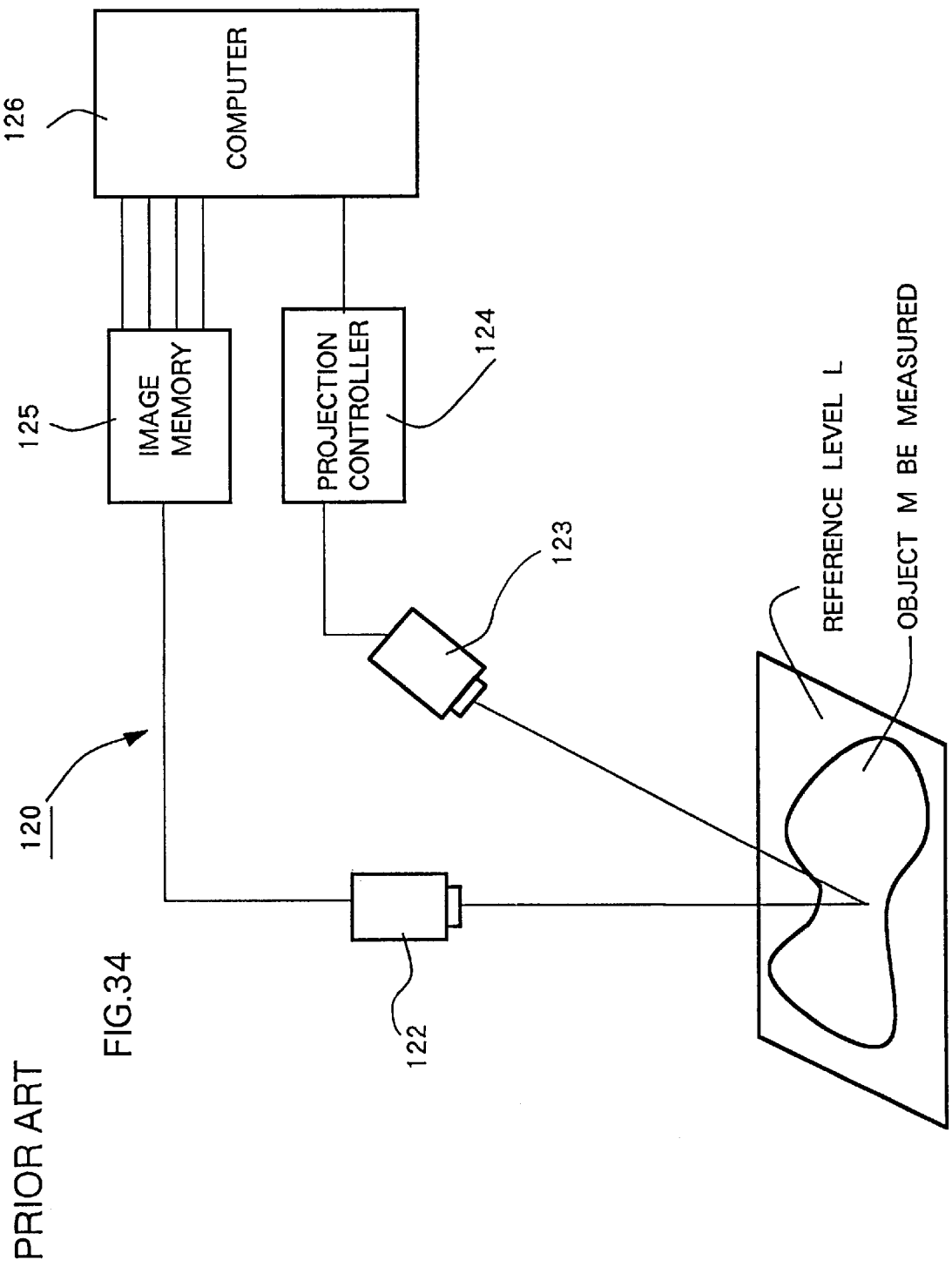
FIG. 34 shows the structure of a conventional shape measuring device which uses phase shifting method.
Figure 35:
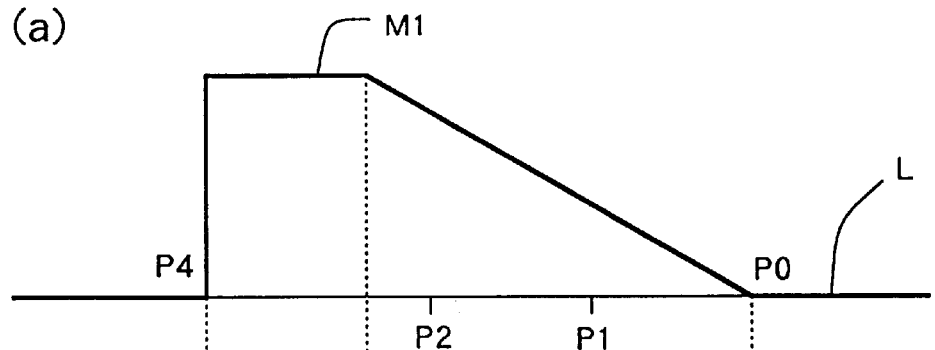
FIG. 35 shows shape data when an object to be measured is measured by space coding method and phase shifting method.
Figure 35:
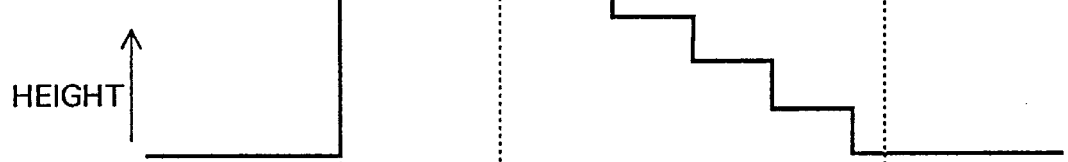
Figure 35:
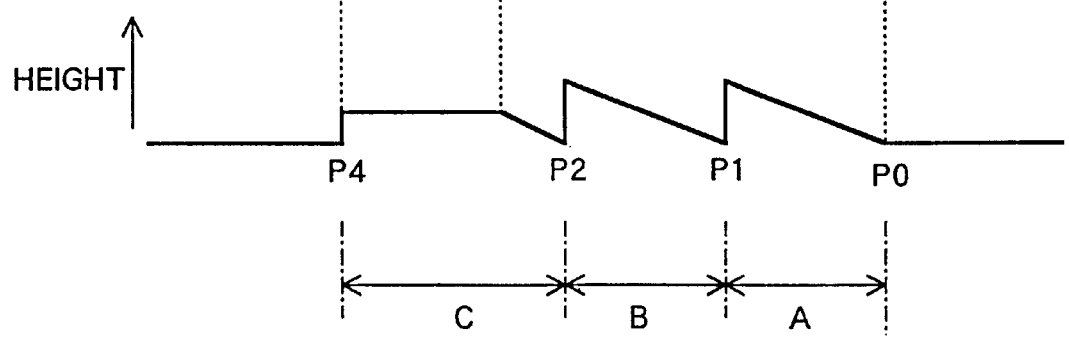

For this purpose, a shape measuring device 600 of this embodiment shown in FIG. 32 has substantially the same constitution as the shape measuring device 500 of the fifth embodiment. However, in the same manner as the second embodiment, phase-shifting light beam controlling means 614 (a laser controller 613 and a phase-shifting light beam control data memory 615) and a synchronous circuit 671 of a control section 670 are different from those of the shape measuring device 500.

In phase-shifting image information operating means 650, a phase-shifting operating circuit (P-type operating circuit) 652 determines the phase $\theta_M$ from the above equation (2) by the phase shift method, determines the height Z from equation (1) in accordance with the principle of triangulation, and corrects the discontinuous point in the same manner as the fifth embodiment. As described above, the thus determined height data (shape data) has the constant resolving power regardless of the position. Thus, the shape of each portion of the object M to be measured can be measured at the uniform and high resolving power.

In this embodiment, the height Z is calculated by the use of equation (1) directly from the determined phase $\theta_M$. However, in the same manner as the third and fourth embodiments, the phase $\theta_M b$, which should be operated when the reference plane L is illuminated with the light beam in the absence of the object M to be measured, is stored as the reference phase for each pixel. The actual phase $\theta_M$ is compared to the reference phase $\theta_M b$ so that the amount of phase shift NP is calculated, whereby the height Z may be calculated from the amount of phase shift NP by the above equation (9). In such a manner, the height Z can be easily calculated without the complicated calculation of tan.

Although the present invention has been described above in the first to sixth embodiments, the present invention is not limited to the above embodiments. It will be understood that the present invention can be appropriately changed and applied without departing from the spirit and scope of the present invention.

For example, in the above embodiments, the subspace which one space code number is given to coincides with the subspace illuminated with the light beam of 1 or ½ cycle of the sine-wave like pattern. Alternatively, the subspace may correspond to the subspace illuminated with the light beam of other cycle, i.e., 1 cycle or less, of the sine-wave like pattern. For example, ¼ cycle or the like may be used. Moreover, although the laser light source is used in the above embodiments, other light source may be used as long as it can ensure a sufficient quantity of light.

Furthermore, in the second to fifth embodiments, in the same manner as the first embodiment, when the space code number and the amount of number shift or the phase and the amount of phase shift are determined for each pixel, the rough and precise shapes or the shape of the object to be measured may be determined by the use of the previously prepared data table.

What is claimed is:

1. A shape measuring device comprising:
    light beam illuminating means for illuminating an object to be measured with a first set of light beams each having distribution of integrated illumination intensity of a stripe pattern in accordance with a predetermined code and with a second set of light beams having distribution of integrated illumination intensity of sine-wave like patterns in random order, said distributions of integrated illumination intensity being possessed, respectively, by the first and second sets of light beams illuminating within a time period for picking up one field or one frame;
    pickup means for picking up, by an integrating pickup member, an optical image formed on a surface of said object to be measured by said light beams; and
    image information operating means for calculating a shape of said object to be measured by operating image information of a plurality of fields or a plurality of frames outputted from said pickup means,
    wherein said image information operating means calculates the shape of said object to be measured from space-coded image information and phase-shifted image information, said space-coded image information is obtained by illuminating said object to be measured with said first set of light beams in accordance with said predetermined codes thereof, and said phase-shifted image information is obtained by illuminating said object to be measured with the sine-wave like pattern of said second set of light beams.

2. The shape measuring device according to claim 1, wherein, assuming that $0 < J \leq 1$ where J is a numerical value, said first set of light beams and said second set of light beams have such a relationship that a subspace to which one space code number is given by said first set of light beams coincides with the subspace illuminated with J cycle of said sine-wave like patterns of said second set of light beams.

3. The shape measuring device according to claim 2, wherein said J is set to 1.

4. The shape measuring device according to claim 3, wherein, assuming that one of four types of sine-wave like patterns is expressed as $IS_0 = \cos \theta$, the relationship between phases of said sine-wave like patterns and subspaces given space code numbers by said first set of light beams is selected so that borders between said subspaces are located at positions of $\theta = 0, 2\pi, 4\pi, \ldots$.

5. The shape measuring device according to claim 2, wherein said J is set to ½.

6. The shape measuring device according to claim 5, wherein, assuming that one of four types of sine-wave like patterns is expressed as $IS_0 = \cos \theta$, the relationship between the phases of said sine-wave like patterns and subspaces given space code numbers by said first set of light beams is selected so that the borders between said subspaces are located at the positions of $\theta = -\pi/2, \pi/2, 3\pi/2, \ldots$.

7. The shape measuring device according to claim 2, wherein said subspace, to which said one space code number is given and which is illuminated with said light beam of said J cycle of said sine-wave like pattern, is adapted to have an equal central angle of a generally fan-shaped cross section.

8. The shape measuring device according to claim 2, wherein a height from a reference plane perpendicular to an optical axis of said integrating pickup member to a center of illumination of said light beam is equal to the height from said reference plane to a principal point of an objective lens of said integrating pickup member, and
    said subspace, to which said one space code number is given and which is illuminated with said light beam of said J cycle of said sine-wave like pattern, is adapted to have an equal width on said reference plane belonging to said subspace.

9. The shape measuring device according to claim 8, wherein said image information operating means includes:
    means for operating an amount of space code number shift for calculating the amount of space code number shift for each pixel from space-coded image information and a reference space code number, said space-coded image information being obtained by illuminating said object to be measured with said first set of light beams, said reference space code number being observed by the pixels during illuminating said reference plane with said first set of light beams in the absence of said object to be measured;
    means for operating an amount of phase shift for calculating the amount of phase shift for each pixel from phase-shifted image information and a reference phase, said phase-shifted image information being obtained by illuminating said object to be measured with said second set of light beams, said reference phase being observed by the pixels during illuminating said reference plane with said second set of light beams in the absence of said object to be measured; and
    shape operating means for calculating the shape of said object to be measured from said amount of space code number shift and said amount of phase shift.

10. The shape measuring device according to claim 9, wherein said shape operating means includes means for operating an amount of combined phase shift/a shape, for calculating the shape of said object to be measured from the amount of combined phase shift obtained by combining, for each pixel, said amount of space code number shift and said amount of phase shift.

11. The shape measuring device according to claim 9, wherein said shape operating means includes:

means for operating an amount of space code number shift/a rough shape, for calculating the rough shape of said object to be measured from said amount of space code number shift;

means for operating an amount of phase shift/a precise shape, for calculating the precise shape of said object to be measured from said amount of phase shift; and phase combining means for calculating the shape of said object to be measured by combining said rough shape and said precise shape.

12. The shape measuring device according to claim 2, wherein said image information operating means includes:

rough phase operating means for calculating, for each pixel, a rough phase equivalent to the phase of said second set of light beams of said sine-wave like pattern from said space-coded image information;

precise phase operating means for calculating a precise phase for each pixel from said phase-shifted image information;

combined phase operating means for calculating a combined phase for each pixel by combining, for each pixel, said rough phase and said precise phase; and combined phase/shape operating means for calculating the shape of said object to be measured from said combined phase.

13. The shape measuring device according to claim 2, wherein said image information operating means includes:

space-coding shape operating means for calculating the rough shape of said object to be measured from said space coded image information obtained by illuminating said object to be measured with said first set of light beams;

phase-shifting shape operating means for calculating the precise shape of said object to be measured from said phase-shifted image information obtained by illuminating said object to be measured with said second set of light beams; and shape combining/operating means for combining the rough shape calculated by said space-coding shape operating means and the precise shape calculated by said phase-shifting shape operating means and for calculating the shape of said object to be measured.

14. The shape measuring device according to claim 1, wherein said light beam illuminating means includes:

a light source for generating a single-slit light beam;

single-slit light beam scanning means for illuminating the surface of said object to be measured with said single-slit light beam and for deflecting/scanning said single-slit light beam;

space-coding light beam controlling means for controlling said single-slit light beam so that the integrated illumination intensity of said single-slit light beam illuminating within the time period for picking up one field or one frame is distributed like a stripe in accordance with a predetermined code; and phase-shifting light beam controlling means for controlling said single-slit light beam so that the integrated illumination intensity of said single-slit light beam illuminating within the time period for picking up one field or one frame is distributed like a sine wave.

15. The shape measuring device according to claim 14, wherein said phase-shifting light beam controlling means controls how long said single-slit light beam is switched on while scanning a subarea on said reference plane and thereby adjusts the integrated illumination intensity in the subarea.

16. The shape measuring device according to claim 14, wherein said single-slit light beam scanning means allows said single-slit light beam to perform plural scans within the time period for picking up one field or one frame, and said phase-shifting light beam controlling means controls how many times said single-slit light beam is switched on while scanning the subarea on said reference plane, whereby the integrated illumination intensity in the subarea is adjusted.

17. The shape measuring device according to claim 16, wherein said single-slit light beam scanning means deflects/scans said slit light beam by a rotary polygon mirror.

18. The shape measuring device according to claim 14, wherein said single-slit light beam scanning means allows said single-slit light beam to perform plural scans during the time period for picking up one field or one frame, and said phase-shifting light beam controlling means controls how long and how many times said single-slit light beam is switched on while scanning the subarea on said reference plane, whereby the integrated illumination intensity in the subarea is adjusted.

19. The shape measuring device according to claim 18, wherein said single-slit light beam scanning means deflects/scans said single-slit light beam by the rotary polygon mirror.

20. The shape measuring device according to claim 14, wherein said phase-shifting light beam controlling means controls said single-slit light beam so that said single-slit light beam has the distribution of integrated illumination intensity in which the phases of said sine wave differ by ¼ cycle in each field or each frame, and said phase-shifting shape operating means calculates the precise shape of said object to be measured by the use of said phase-shifted image information of at least four fields or four frames differing from one another in the phases of said sine wave.

21. A shape measuring device comprising:

a light source for generating a single-slit light beam;

single-slit light beam scanning means for illuminating the surface of said object to be measured with said single-slit light beam and for deflecting/scanning said single-slit light beam;

phase-shifting light beam controlling means for controlling said single-slit light beam so that the integrated illumination intensity of said single-slit light beam illuminating within the time period for picking up one-field or one frame is distributed like a sine wave;

pickup means for picking up, by the integrating pickup member, the optical image formed on the surface of said object to be measured by said single-slit light beam; and phase-shifting shape operating means for calculating the shape of said object to be measured from phase-shifted image information obtained by illuminating said object to be measured with a set of said single-slit light beam controlled by said phase-shifting light beam controlling means.

22. The shape measuring device according to claim 21, wherein the height from the reference plane perpendicular to the optical axis of said integrating pickup member to the center of illumination of said single-slit light beam is equal to the height from said reference plane to the principal point of the objective lens of said integrating pickup member, and said phase-shifting light beam controlling means controls said single-slit light beam so that the distribution of integrated illumination intensity of said single-slit light beam illuminating said reference plane has a sine-wave like pattern of a constant wavelength on said reference plane.

23. The shape measuring device according to claim 21, wherein said phase-shifting light beam controlling means controls said single-slit light beam so that said single-slit light beam has the distribution of integrated illumination intensity in which the phases of said sine wave differ by ¼ cycle in each field or each frame, and said phase-shifting shape operating means calculates the shape of said object to be measured by the use of said phase-shifted image information of at least four fields or four frames differing from one another in the phases of said sine wave.

24. The shape measuring device according to claim 21, wherein said phase-shifting light beam controlling means controls how long said single-slit light beam is switched on while scanning the subarea on said reference plane and thereby adjusts the integrated illumination intensity in the subarea.

25. The shape measuring device according to claim 21, wherein said single-slit light beam scanning means allows said single-slit light beam to perform plural scans within the time period for picking up one field or one frame, and said phase-shifting light beam controlling means controls how many times said single-slit light beam is switched on while scanning the subarea on said reference plane, whereby the integrated illumination intensity in the subarea is adjusted.

26. The shape measuring device according to claim 21, wherein said single-slit light beam scanning means allows said single-slit light beam to perform plural scans during the time period for picking up one field or one frame, and said phase-shifting light beam controlling means adjusts how long and how many times said single-slit light beam is switched on while scanning the subarea on said reference plane, whereby the integrated illumination intensity in the subarea is adjusted.

* * * * *

UNITED STATES PATENT AND TRADEMARK OFFICE
CERTIFICATE OF CORRECTION

PATENT NO. : 6,075,605
DATED : June 13, 2000
INVENTOR(S) : Ikuo FUTAMURA et al.

It is certified that error appears in the above-identified patent and that said Letters Patent is hereby corrected as shown below:

Claim 4, col. 50, line 15:
"↓" should read -- θ --

Signed and Sealed this

Third Day of April, 2001

Attest:

NICHOLAS P. GODICI

*Attesting Officer*     *Acting Director of the United States Patent and Trademark Office*